(12) United States Patent
Kato et al.

(10) Patent No.: US 6,616,815 B2
(45) Date of Patent: *Sep. 9, 2003

(54) METHOD OF DECOMPOSING HALOGENATED ALIPHATIC HYDROCARBON COMPOUNDS OR AROMATIC COMPOUNDS AND APPARATUS TO BE USED FOR THE SAME AS WELL AS METHOD OF CLARIFYING EXHAUST GAS AND APPARATUS TO BE USED FOR THE SAME

(75) Inventors: Kinya Kato, Atsugi (JP); Yasutsugu Yamada, Yokohama (JP); Etsuko Sugawa, Atsugi (JP); Masanori Sakuranaga, Atsugi (JP); Akira Kuriyama, Atsugi (JP); Takeshi Imamura, Chigasaki (JP); Yuji Kawabata, Isehara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,711

(22) Filed: Jun. 18, 1999

(65) Prior Publication Data

US 2002/0130030 A1 Sep. 19, 2002

(30) Foreign Application Priority Data

Jun. 22, 1998 (JP) ............................................. 10-174835
Nov. 11, 1998 (JP) ............................................. 10-320476
Feb. 18, 1999 (JP) ............................................. 11-039956

(51) Int. Cl.$^7$ ............................... C07B 63/00; C07C 7/00
(52) U.S. Cl. ............................... 204/158.21; 204/158.2; 204/157.15; 204/157.3
(58) Field of Search ......................... 204/157.15, 157.3, 204/158.2, 158.21; 205/357, 359; 422/186.3

(56) References Cited

U.S. PATENT DOCUMENTS

3,649,493 A  *  3/1972  Meiners et al. ............ 204/157.5
4,009,099 A         2/1977  Jeris ................................ 210/3

(List continued on next page.)

FOREIGN PATENT DOCUMENTS

DE     43 30518 A1     3/1995
DE     44 00308 A1     7/1995

(List continued on next page.)

OTHER PUBLICATIONS

G. Huybrechts et al., "Gas–Phase Chlorine–Photosynthesized Oxidation of Trichloroethylene," 62 *Trans. Faraday Soc.*, 2191–2199 (1962).

(List continued on next page.)

*Primary Examiner*—James J. Seidleck
*Assistant Examiner*—Thao Tran
(74) *Attorney, Agent, or Firm*—Fitzpatrick, Cella, Harper & Scinto

(57) ABSTRACT

A method for decomposing halogenated aliphatic hydrocarbon compounds or aromatic compounds characterized by contacting the compound to be decomposed with functional water under light irradiation, wherein the functional water is characterized by a hydrogen ion concentration (pH) of 1–4, an oxidation-reduction potential of 800–1500 mV (working electrode: platinum, reference electrode: silver-silver chloride) and a chlorine concentration of 5–150 mg/l, and the irradiation is carried out with light of a wavelength of 300 nm or more, with an intensity of 10 mW/cm$^2$ or less. This method is carried out at room temperature under the atmospheric pressure. An apparatus for the method is also provided.

22 Claims, 21 Drawing Sheets

U.S. PATENT DOCUMENTS

| | | | | |
|---|---|---|---|---|
| 4,236,992 | A | | 12/1980 | Themy .................... 204/278 |
| 4,361,471 | A | * | 11/1982 | Kosarek .................. 210/748 |
| 4,555,323 | A | | 11/1985 | Collier ................... 204/258 |
| 4,761,208 | A | | 8/1988 | Gram et al. .............. 204/95 |
| 4,927,621 | A | | 5/1990 | Repman et al. ........... 423/488 |
| 5,039,383 | A | | 8/1991 | Sponitz et al. ........... 204/128 |
| 5,260,036 | A | | 11/1993 | Weigold et al. .......... 422/186.3 |
| 5,308,507 | A | * | 5/1994 | Robson ................... 210/748 |
| 5,340,555 | A | | 8/1994 | Mashio et al. ........... 423/240 R |
| 5,370,740 | A | * | 12/1994 | Chao et al. .............. 134/1 |
| 5,393,394 | A | | 2/1995 | Ikeda et al. ............. 204/158.2 |
| 5,460,792 | A | | 10/1995 | Rosenbaum .............. 423/245.3 |
| 5,494,574 | A | | 2/1996 | Unterman et al. ........ 210/150 |
| 5,525,008 | A | | 6/1996 | Wilson ................... 405/128 |
| 5,582,741 | A | | 12/1996 | Kenmoku et al. ......... 210/748 |
| 5,611,642 | A | | 3/1997 | Wilson ................... 405/128 |
| 5,616,234 | A | | 4/1997 | Rhees et al. ............. 205/500 |
| 5,714,665 | A | * | 2/1998 | Ohtake et al. ........... 588/204 |
| 5,832,361 | A | | 11/1998 | Foret ..................... 422/186 |
| 5,980,727 | A | * | 11/1999 | Putz et al. .............. 205/688 |

FOREIGN PATENT DOCUMENTS

| | | |
|---|---|---|
| EP | WO 94/02423 | 2/1994 |
| EP | 0 841 305 A2 | 5/1998 |
| JP | 49-45027 | 4/1974 |
| JP | 49045027 A * | 4/1974 |
| JP | 51023467 A * | 2/1976 |
| JP | 52-47459 | 12/1977 |
| JP | 57-166175 | 10/1982 |
| JP | 60-261590 | 12/1985 |
| JP | 62-191095 | 8/1987 |
| JP | 63-218293 | 9/1988 |
| JP | 1-180293 | 7/1989 |
| JP | 2-243338 | 9/1990 |
| JP | 3-38297 | 2/1991 |
| JP | 3-074507 | 3/1991 |
| JP | 5-115722 | 5/1993 |
| JP | 5-149127 | 6/1993 |
| JP | 6-31135 | 2/1994 |
| JP | 6-182151 | 7/1994 |
| JP | 6-246133 | 9/1994 |
| JP | 6-277442 | 10/1994 |
| JP | 7-000819 | 1/1995 |
| JP | 7-51675 | 2/1995 |
| JP | 7-144137 | 6/1995 |
| JP | 8-000759 | 1/1996 |
| JP | 8-104665 | 4/1996 |
| JP | 8-141367 | 6/1996 |
| JP | 8-243351 | 9/1996 |
| JP | 8-257570 | 10/1996 |
| JP | 8-281271 | 10/1996 |
| JP | 9-10554 | 1/1997 |
| JP | 9-19505 | 1/1997 |
| JP | 9-234338 | 9/1997 |
| WO | WO 94/03399 | 2/1994 |

OTHER PUBLICATIONS

K.L. Müller et al., "Die Phtochemische Durch Chlor Sensibilisierte Oxydation von Trichloräthylen zu Dichloracetylchlorid," B37, *H.Z. Phys. Chem.* 365–373 (1937).

Ute Heinz, "Biodegradation of Dichloracetic Acid by Entrapped and Absorptive Immobilized Xanobacter Autotrophicus GJ10," 40 *Appl. Microbial. Biotechnol.* 158–164 (1993).

Nakanishi, "Present Status of Groundwater/Soil Contamination and Their Management" *Research Institute of Environment Technology*, 1995 (pp. 220–227) and translation.

Patent Abstracts of Japan, vol. 018, No. 043 (C–1156), Jan. 24, 1994 (JP 05 269374A).

Database WPI, Section Ch, Week 197615, Derwent, Class E37, AN 1976–27312X (JP51023467A).

Water Processing Technology, vol. 37, No. 5 (1996).

Chinese Office Action dated Sep. 27, 2002 (with English translation).

* cited by examiner

METHOD OF DECOMPOSING HALOGENATED ALIPHATIC HYDROCARBON COMPOUNDS OR AROMATIC COMPOUNDS AND APPARATUS TO BE USED FOR THE SAME AS WELL AS METHOD OF CLARIFYING EXHAUST GAS AND APPARATUS TO BE USED FOR THE SAME

BACKGROUND OF THE INVENTION

1. Field of the Invention

This invention relates to a method of decomposing halogenated aliphatic hydrocarbon compounds or aromatic compounds and also to an apparatus to be used for such a method. The invention also relates to a method of clarifying exhaust gas and an apparatus to be used for such a method.

2. Related Background Art

With developing industries, a large amount of aromatic compounds and halogenated aliphatic hydrocarbon compounds has been used, and the disposal of such compounds has become a serious problem. In particular, halogenated aliphatic hydrocarbon compounds causes great concern over environmental pollution, thus extensive research has been conducted for safe disposal of these compounds. For example, chlorofluorocarbons (CFCs), a kind of halogenated aliphatic hydrocarbon, have been used for sprays and as coolants in a huge amount, becoming a global problem as a cause of ozone holes in the ozone layer. Likewise, trichloroethylene (TCE), tetrachloroethylene (PCE) and other chlorinated aliphatic hydrocarbons have been abundantly used in various industries as cleansing solvents for metal parts, semiconductor parts and textiles and also as reaction solvents. However, their toxicity, such as mutagenicity and carcinogenicity have been pointed out, and it is required to ban their use completely, and to make the already used solvents harmless. Additionally, the compounds already released into the natural environment have been contaminating river water, ground water and soil. Therefore, development of new technologies for economical and efficient removal of the contaminants from the environment are in great need, and a variety of new technologies have been proposed for such applications.

For example, a combustion process has been proposed to decompose chlorinated aliphatic hydrocarbon compounds. Although this process is relatively simple, there is a new concern that decomposition products of chlorinated aliphatic hydrocarbons, i.e., hydrogen chloride and chlorine, would react with other organic compounds during combustion process to produce more toxic substances such as polybiphenyl chloride and dioxin. Additionally, the high temperature treatment is a drawback in view of energy consumption.

Also techniques of using an oxidizing agent or a catalyst for decomposing chlorinated aliphatic hydrocarbon compounds have been proposed. Specific examples include a process of decomposing harmful hydrocarbons by means of ozone (Japanese Patent Application Laid-Open No. 3-38297), a process of wet oxidation decomposition at high temperature under high pressure and a process of oxidization decomposition with hydrogen peroxide or a salt of iron (Japanese Patent Application Laid-Open No. 60-261590).

It is also proposed a process using sodium hypochlorite as an oxidizing agent (U.S. Pat. No. 5,611,642), or a combination use of sodium hypochlorite and UV irradiation (U.S. Pat. No. 5,582,741). It is also proposed a process where a suspension of a photocatalyst (fine particles of an oxide semiconductor such as titanium oxide) in liquid chlorinated aliphatic hydrocarbons is prepared under alkaline conditions and decomposing the latter by light irradiation (Japanese Patent Application Laid-Open No. 7-144137). A catalytic oxidation degradation process using an oxide such as platinum oxide, alumina and zirconium oxide is also proposed (H. Ichikawa et al., Japanese Patent Application Laid Open No. 6-31135).

Also, a photolysis process of decomposing chlorinated aliphatic hydrocarbon compounds by irradiating with UV light in a gaseous phase without an oxidizing agent is proposed (H. Seki et al, "Contaminated Groundwater and Soil: Present Condition and Countermeasure", ed. by Kansai Branch of Japan Water Environment Society and Environmental Technology Research Institute, 1995; Japanese Patent Application Laid-Open No. 8-243351).

It is known that chlorinated aliphatic hydrocarbons such as TCE and PCE are decomposed by microorganisms aerobically or anaerobically, and it has been tried to decompose such compounds and purify the natural environment by such a microbial process.

Japanese Patent Application Laid-Open No. 9-10554 and U.S. Pat. No. 5,340,555 describe a process of decomposing fluorinated aliphatic hydrocarbon compounds by means of a catalyst.

Japanese Patent Application Laid-Open No. 8-141367 discloses a process of decomposing CFCs by mixing them with fuel such as alcohol or ether and burning them in the presence of a catalyst.

U.S. Pat. No. 5,393,394 discloses a process of decomposing CFCs by exposing them to ultraviolet light either directly or after dissolving them into a solvent. Japanese Patent Application Laid-Open No. 3-074507 describes a method of reductively decomposing CFCs in mild conditions of room temperature and atmospheric pressure by contacting CFCs with an electrode in an electrolytic vessel.

As proposed techniques for decomposing the other organic compounds, e.g., hardly decomposable aromatic compounds such as those having a biphenyl bond and/or a biphenyl skeleton, there are (1) combustion, (2) decomposition by UV or radiation exposure and (3) decomposition using microorganisms. As a method for decomposing biphenyl compounds under mild conditions of room temperature and atmospheric pressure, there is a process wherein such compounds are decomposed by irradiating them with UV light directly or after dissolving them into a solvent. For example, Japanese Patent Publication No. 52-47459 discloses a method of rendering polychlorinated biphenyl harmless by dissolving it into alkaline alcohol, removing oxygen from the solution and then exposing the solution to ionizing radiation or UV light. Other known techniques for rendering PCB harmless include those described in Japanese Patent No. 919505 and Japanese Patent Applications Laid-Open Nos. 49-45027 and 57-166175.

Japanese Patent Application Laid-Open No. 7-000819 discloses a method for removing polychlorinated biphenyl etc. by utilizing the photocatalytic activity of titanium oxide. Japanese Patent Application Laid-Open No. 8-000759 describes a photodecomposition apparatus and method for degrading polychlorinated biphenyl, where water and alkali metals are removed as the photolysis-inhibiting factors by applying a DC voltage to an electrode provided in a reaction cell during the process of photodecomposition of PCB by UV light.

SUMMARY OF THE INVENTION

As listed above, a number of methods for decomposing halogenated aliphatic hydrocarbon compounds or aromatic compounds have been proposed to date. However, the inventors of the present invention have found that most of these methods require a complicated apparatus for decomposition, and or a further decomposition process of the decomposition products. Thus, there is still a strong demand for eco-friendly technology for decomposing halogenated aliphatic hydrocarbon compounds or aromatic compounds.

The present invention was made based on the inventors' new finding.

An object of the present invention is to provide a method of efficiently decomposing halogenated aliphatic hydrocarbon compounds or aromatic compounds in an eco-friendly manner with less possibility of producing decomposition products that will cause another environmental contamination, as well as an apparatus to be used for such a method.

Another object of the present invention is to provide a method for efficiently purifying an exhaust containing halogenated aliphatic hydrocarbon compounds or aromatic compounds and an apparatus to be used for such a method.

In a study for achieving the above objects, the inventors of the present invention found that functional water, e.g., acidic water, which is obtained through electrolysis of water and of which sterilizing effect (Japanese Patent Application Laid-Open No. 1-180293) and cleansing effect for the surface of semiconductor wafers (Japanese Patent Application Laid-Open No. 7-51675) have been reported, can remarkably accelerate the decomposition of halogenated aliphatic hydrocarbon compounds or aromatic compounds under light irradiation. The present invention is based on this finding.

Thus, according to an aspect of the present invention, there is provided a method for decomposing halogenated aliphatic hydrocarbon compounds or aromatic compounds, which comprises a step of contacting a medium containing at least one of halogenated aliphatic hydrocarbon compounds and aromatic compounds with functional water under irradiation with light, where the functional water is produced through electrolysis of water containing one or more electrolytes.

The reason why the presence of functional water can accelerate the decomposition of various halogenated aliphatic hydrocarbon compounds or aromatic compounds under irradiation with light is not clear. However, the inventors presume that the functional water produced by electrolysis of water containing one or more electrolytes such as sodium chloride typically contains hypochlorous acid or hypochlorite, which by turn generate chlorine radicals, hydroxyl radicals or superoxides by light irradiation to promote the above decomposition reaction.

According to another aspect of the invention, there is provided a method of decomposing halogenated aliphatic hydrocarbon compounds or aromatic compounds, characterized by a step of contacting a medium containing at least one of halogenated aliphatic hydrocarbon compounds and aromatic compounds with functional water containing hypochlorous acid, under light irradiation.

According to still another aspect of the invention, there is provided a method for purifying an exhaust gas, characterized by a step of contacting exhaust gas containing at least one of halogenated aliphatic hydrocarbon compounds and aromatic compounds with functional water generated by electrolysis of water containing one or more electrolytes, under irradiation, to decompose the halogenated aliphatic hydrocarbon compounds or the aromatic compounds.

According to a further aspect of the invention, there is provided a method for purifying an exhaust gas, characterized by a step of contacting the exhaust gas containing at least one of halogenated aliphatic hydrocarbon compounds and aromatic compounds with functional water containing hypochlorous acid, under light irradiation.

According to a further aspect of the invention, there is provided an apparatus for decomposing halogenated aliphatic hydrocarbon compounds or aromatic compounds, which comprises a container equipped with a pair of electrodes and a power source for applying a voltage to the electrodes, means for supplying the container with water containing one or more electrolytes, an irradiation means and means for supplying a medium containing at least one of halogenated aliphatic hydrocarbon compounds and aromatic compounds.

According to another aspect of the invention, there is provided an apparatus for decomposing halogenated aliphatic hydrocarbon compounds or aromatic compounds, which comprises a decomposition treatment vessel, means for feeding functional water generated by electrolysis of water, means for feeding the container with a medium containing at least one of halogenated aliphatic hydrocarbon compounds and aromatic compounds, and means for irradiating the decomposition vessel with light.

According to another aspect of the invention, there is provided an apparatus for decomposing halogenated aliphatic hydrocarbon compounds or aromatic compounds, which comprises a container for functional water which contains hypochlorous acid, means for supplying the container with a medium containing at least one of halogenated aliphatic hydrocarbon compounds and aromatic compounds, and means for irradiating the container.

According to still another aspect of the invention, there is provided an apparatus for purifying exhaust gas containing at least one of halogenated aliphatic hydrocarbon compounds and aromatic compounds, which comprises a reaction container provided with inlet and discharge ports for an exhaust gas and functional water and filled with a filler between the inlet ports and the discharge ports, means for introducing the exhaust gas into the reaction container, means for introducing the functional water into the reaction container and means for irradiating the inside of the reaction container, where the functional water is obtainable by electrolyzing water containing one or more electrolytes.

According to still another aspect of the invention, there is provided an apparatus for purifying an exhaust gas containing at least one of halogenated aliphatic hydrocarbon compounds and aromatic compounds, which comprises a reaction container provided with inlet and discharge ports for the exhaust gas and functional water and packed with a filler between the inlet and discharge ports, means for introducing the exhaust gas into the reaction container, means for introducing functional water containing hypochlorous acid into the reaction container and means for irradiating the inside of the reaction container.

Japanese Patent Application Laid-Open No. 8-281271 discloses a process for decomposing one or more dyestuffs contained in dyeing water in an electrolytic vessel by means of hypochlorous acid and/or hypochlorite ion generated by electrolysis.

"Water Treatment Technologies", vol. 37, No. 5 (1996), p.33 describes a process of treating waste dyeing water, utilizing an electrochemical reaction. More specifically, it describes an indirect electrolytic method for decomposing dye molecules, where an oxidizing agent is generated by electrolysis, which then decomposes the dye by its oxidizing activity. The oxidizing agent is mostly hypochlorous acid which is formed by the reaction between chlorine gas generated at the anode and hydroxy ions generated at the cathode during electrolysis of the waste water to which sodium chloride was added. However, neither of the article nor the patent document cited above describes that halogenated aliphatic hydrocarbon compounds and aromatic compounds can be decomposed by any of the proposed methods. Furthermore, none of them even suggests irradiation can accelerate the decomposition of such compounds.

DETAILED DESCRIPTION OF THE PREFERRED EMBODIMENTS

Figure 1:
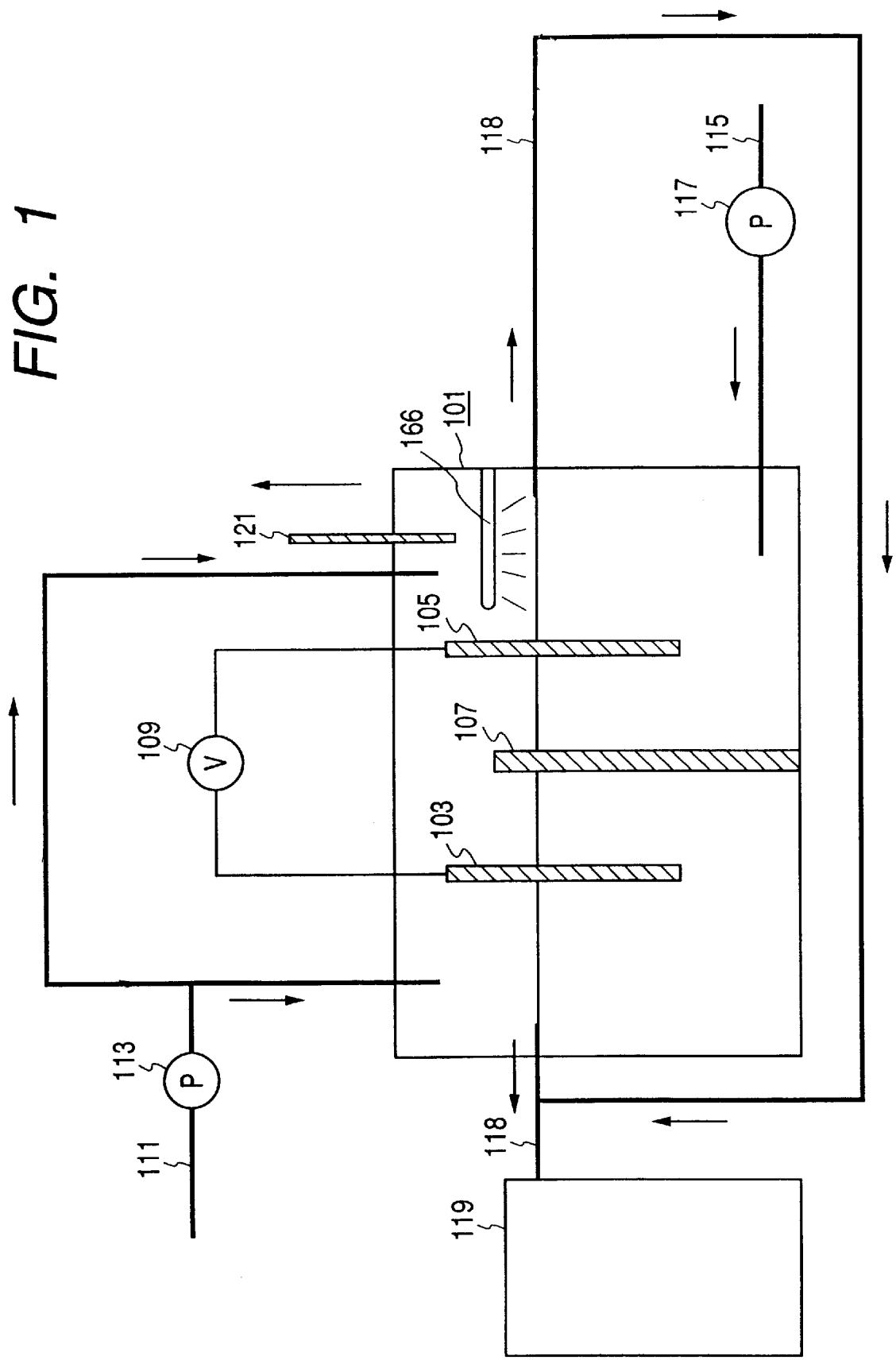
FIG. 1 is a schematic diagram of an embodiment of apparatus for decomposing halogenated aliphatic hydrocarbon compounds or aromatic compounds according to the invention.

A method of decomposing halogenated aliphatic hydrocarbon compounds or aromatic compounds according to an aspect of the invention is characterized by a step of contact between halogenated aliphatic hydrocarbon compounds or aromatic compounds to be decomposed and functional water produced by electrolysis of water under light irradiation. A method of decomposing halogenated aliphatic hydrocarbon compounds or aromatic compounds according to another aspect of the invention is characterized by a step of contact between functional water containing hypochlorous acid and a medium containing halogenated aliphatic hydrocarbon compounds or aromatic compounds under light irradiation.
Functional Water—Acidic Water Functional water can be obtained near the anode when one or more electrolytes (e.g. sodium chloride and potassium chloride) are dissolved into the source water and the solution is subjected to electrolysis in a water tank provided with a pair of electrodes. Functional water as used herein refers to a water showing a pH value between 1 and 4, an oxidation-reduction potential between 800 mV and 1,500 mV when measured by using platinum and silver-silver chloride as the working and the reference electrodes respectively, and a chlorine concentration between 5 mg/liter and 150 mg/liter.

For preparing functional water having the above characteristic properties, the concentration of electrolyte, for example, sodium chloride, in the source water prior to electrolysis is preferably between 20 mg/l and 2,000 mg/l and the electrolytic current is preferably between 2 A and 20 A. To obtain such functional water, any commercially available strongly acidic electrolytic water generator (e.g., OASYS Bio HALF: trade name, a product of Asahi Glass Engineering, or Strong Electrolytic Water Generator Model FW-200: trade name, a product of Amano) may be used.

Undesired mixing of the acidic water produced around the anode and the alkaline water produced around the cathode can be prevented by providing a diaphragm between the paired electrodes, to effectively obtain acidic water that can efficiently decompose the halogenated aliphatic hydrocarbon compounds or the aromatic compounds. Such a diaphragm may suitably be an ion exchange membrane.

(Neutral Water)

It may be also usable functional water showing an oxidation-reduction potential between 300 mV and 1,100 mV, a chlorine concentration between 2 mg/l and 100 mg/l and a pH value between 4 and 10, depending on the compound to be decomposed and the concentration thereof, for example, functional water obtained around the anode of an electrolytic apparatus that does not have a diaphragm. Such functional water may also be obtained by mixing the acidic water and the alkaline water produced by electrolysis in an electrolytic system having a diaphragm between the paired electrodes. If such is the case, the mixing ratio of acidic water and alkaline water is preferably between 1:0 and 1:1 by volume.

Synthetic Functional Water

Functional water can be also prepared by dissolving one or more agents into source water in place of electrolysis, which is as effective as functional water prepared by electrolysis in decomposing halogenated aliphatic hydrocarbon compounds or aromatic compounds. For example, such synthetic functional water contains 0.001 N–0.1 N hydrochloric acid, 0.005 N–0.02 N sodium chloride and 0.0001 N–0.1 N sodium hypochlorite. Also, functional water with a pH value higher than 4 may be prepared by dissolving one or more agents in place of electrolysis. For example, such synthetic functional water contain 0.001 N to 0.1 N hydrochloric acid, 0.001 N to 0.1 N sodium hydroxide and 0.0001 M to 0.01 M sodium hypochlorite. Addition of hypochlorite only, for example sodium hypochlorite at a concentration between 0.0001 M and 0.1 M, may produce functional water. Functional water with a pH value not higher than 4.0 and a chloride concentration not lower than 2 mg/l may be prepared by using hydrochloric acid and hypochlorite. Hydrochloric acid may be replaced by some other inorganic acid or by an organic acid. Inorganic acids that can be used for the purpose of the invention include hydrofluoric acid, sulfuric acid, phosphoric acid and boric acid, whereas organic acids that can be used for the purpose of the invention include acetic acid, formic acid, malic acid, citric acid and oxalic acid. A commercially available weak acidic water generating powder (e.g., Kino-san 21X: trade name, a product of Clean Chemical) typically containing $N_3C_3O_3NaCl_2$ may also be used for preparing functional water. As seen from the Examples, functional water prepared by using such an agent has an ability of decomposing halogenated aliphatic hydrocarbon compounds or aromatic compounds under light irradiation, as with the functional water prepared by electrolysis, although the capability may vary in efficiency. Source water as used herein refers to tap water, river water or sea water. Such water typically shows a pH value between 6 and 8 and a chlorine concentration of less than 1 mg/l at maximum and hence does not have any ability of decomposing halogenated aliphatic hydrocarbon compounds or aromatic compounds.

Halogenated Aliphatic Hydrocarbon Compounds or Aromatic Compounds to be Decomposed Examples of halogenated aliphatic hydrocarbon compounds to be decomposed by a method according to the invention include aliphatic hydrocarbon compounds substituted by at least either chlorine or fluorine atom. Specific examples include 1 to 4 chlorine atom-substituted methane, 1 to 6 chlorine atom-substituted ethane, 1 to 4 chlorine atom-substituted ethylene, 1 to 2 chlorine atom-substituted acetylene, 1 to 8 chlorine atom-substituted propane, 1 to 6 chlorine atom-substituted propylene, 1 to 4 chlorine atom-substituted allene (propadiene), 1 to 4 chlorine atom-substituted allylene (methylacetylene), 1 to 10 chlorine atom-substituted butane, 1 to 8 chlorine atom-substituted 1-, 2- or iso-butene and 1 to 6 chlorine atom-substituted 1,3-butadiene.

More specifically, examples of such chlorine-substituted products include trichloromethane, dichloromethane, 1,1-dichloroethylene, cis-1,2-dichloroethylene, trans-1,2-dichloroethylene, trichloroethylene, tetrachloroethylene, trichlorofluoromethane (CFC-11), dichlorofluoromethane (CFC-12), chlorotrifluoromethane (CFC-13), bromotrifluoromethane (CFC-13B1), carbon tetrafluoride (CFC-14), dichlorofluoromethane (CFC-21), chlorodifluoromethane (CFC-22), trifluoromethane (CFC-23), 1,2-difluoro-1,1,2,2-tetrachloroethane, 1,1,2-trichloro-1,2,2-trifluoroethane (CFC-113), 1,2-dibromo-1-chloro-1,2,2-trifluoroethane (CFC-113B2), 1,2-dichloro-1,1,2,2-tetrafluoroethane (CFC-114), 1,2-dibromo-1,1,2,2-tetrafluoroethane (CFC-114B2), 2,2-dichloro-1,1,1-trifluoroethane (CFC-123), chlorodifluoroethane (CFC-142), 1,1-difluoroethane (CFC-152), tetrafluoroethane, chloropentafluoroethane and hexafluoroethane (CFC-116). Additionally, azeotropic mixtures of any of the above listed compounds (e.g., CFC-500 and CFC-502), vinylfluoride, vinylidenefluoride, hexafluoropropylene, tetrafluoroethylene, chlorotrifluoroethylene and propylene hexafluoride may also be decomposed by a method according to the invention. Still additionally, halogenated aliphatic hydrocarbon compounds of not more than three carbon atoms substituted with at least one halogen atom selected from fluorine, chlorine and bromine may also be decomposed by a method according to the invention.

Specific examples of aromatic compounds that can be decomposed by a method according to the invention include benzene, phenol and benzene chlorides such as chlorobenzene, 1,4-dichlorobenzene (p-dichlorobenzene), 1,2,3-trichlorobenzene, 1,2,4-trichlorobenzene, 1,3,5-trichlorobenzene, tetrachlorobenzene and hexachlorobenzene. Additionally, halogenated cyclic hydrocarbons or aromatic hydrocarbons such as benzene trifluoride, perfluorobenzene and perfluoromethyldecalin can be decomposed by a method according to the invention. Specific examples of compounds having a biphenyl structure that can be decomposed by a method according to the invention include biphenyl, dehydrodivanillic acid, 2-chlorobiphenyl, 3-chlorobiphenyl, 4-chlorobiphenyl, 2,2'-dichlorobiphenyl, 3,3'-dichlorobiphenyl, 4,4'-dichlorobiphenyl, 2,4'-dichlorobiphenyl, 2,3-dichlorobiphenyl, 2,4-dichlorobiphenyl, 2,5-dichlorobiphenyl, 2,6-dichlorobiphenyl, 3,4-dichlorobiphenyl, 3,5-dichlorobiphenyl, 2,4,4'-trichlorobiphenyl, 2,2',5-trichlorobiphenyl, 2,3',5-trichlorobiphenyl, 2,4',5-trichlorobiphenyl, 2',3,4-trichlorobiphenyl, 2,3,4-trichlorobiphenyl, 2,3,6-trichlorobiphenyl, 2,4,5-trichlorobiphenyl and 2,4,6-trichlorobiphenyl. Additionally, compounds obtained by replacing any of the chlorine atoms of any of the above listed biphenyl compounds with a fluorine or bromine atom may also be decomposed by a method according to the invention.

After the decomposition of any of the above listed compounds, no generation of environmentally harmful products can be observed in the functional water by mass spectrum.

Light Source

Irradiation light for decomposing halogenated aliphatic hydrocarbon compounds or aromatic compounds (herein after referred to as the target substance) in functional water preferably has a wavelength between 300 and 500 nm, more preferably between 350 and 450 nm. From the viewpoint of decomposition efficiency, the intensity of irradiation to a mixture of functional water and the target substance to be decomposed is preferably between 10 $\mu W/cm^2$ and 10 $mW/cm^2$, more preferably between 50 $\mu W/cm^2$ and 5 $mW/cm^2$. For example, light from a light source with a peak wavelength of 365 nm and an intensity of several hundreds $\mu W/cm^2$ (as measured in a wavelength range between 300 nm and 400 nm) is sufficient for decomposing the target substance in practical applications.

Either natural light (e.g., sun light) or artificial light (from a mercury lamp, a black lamp or a color fluorescent lamp) can be used for the purpose of the invention.

Mixture of functional water and the target substance can be irradiated either directly or through a transparent container typically made of glass or a plastic material. Functional water can be irradiated after or during the production process thereof. Anyhow, in order to accelerate the decomposition remarkably, irradiation is desirably carried out while the target substance is in contact with the functional water. In the embodiments of the present invention using functional water, it is not necessary to use beams that may adversely affect the human body (e.g., UV light of a wavelength of 250 nm).

The decomposition is promoted when any of the above listed different types of functional water is irradiated with light. As described above, functional water produced by electrolysis of water containing electrolytes such as sodium chloride contains hypochlorous acid or hypochlorite ions, which probably induce generation of chlorine radicals, hydroxyl radicals and/or superoxides to promote the decomposition reaction of the target substance. The quantity of hypochlorous acid in the functional water, which is generated by electrolysis around the anode and thought to be participating in the decomposition process of the target substance, can be determined by pH and the chlorine concentration. Additionally, functional water generated by electrolysis can be diluted by pure water or some other diluent to be used for decomposing the target substance.

For example, TCE-contaminated water (up to about 10 ppm) can be purified to less than 0.03 ppm within four hours using a five-hold or more dilution with water of functional water of an oxidation-reduction potential of 1,150 mV and a residual chlorine concentration of 54 mg/l.

Alternatively, functional water of the same characteristic properties as such a diluted functional water may be prepared directly.

Next, an apparatus to be used for decomposing the target substance by using functional water according to the invention will be described. In the embodiment of the present invention, the contact between functional water and the target substance and irradiation are sufficiently carried out at ordinary temperature and pressure, so that special facility and/or environment is not necessary. For example, it will be sufficient for the purpose of the invention that the target substance or a medium containing it is directly introduced into a vessel containing functional water, followed by irradiation with light. Alternatively, the target substance is introduced into a vessel a water tank where functional water is being prepared under irradiation. For the purpose of the invention, a constitution of an apparatus for decomposing the target substance can be as described in 1) or 2) below.

1)—Target substance to be decomposed are directly introduced into an electrolytic water-generating unit, and the acidic water mixed with the target substance is irradiated with light- FIG. 1 is a schematic block diagram of an embodiment of the apparatus for decomposing the target substance according to the invention. In FIG. 1, reference numeral 101 denotes a water tank. The water tank 101 is provided with an anode 105, a cathode 103, a diaphragm 107 which may be made of ion exchange membrane, a power source 109 connected to the electrodes, a set of a pipe 111 and a pump 113 for supplying electrolyte-containing water into the water tank and another set of a pipe 115 and a pump 117 for supplying the target substance or a medium containing it. Reference numeral 119 denotes a tank for collecting functional water which has lost its activity after the reaction with the target substance. Electrolyte-containing water is supplied to fill the water tank 101 fully. When power is supplied to the electrodes 103 and 105 for electrolysis, acidic water is generated around the anode 105. The target substance can be supplied continuously at a desired flow rate to the compartment of the anode 105 of the water tank 101 through the pipe 115, while the functional water is irradiated with light from a light source 166 arranged at the water tank 101. Then, the target substance comes in contact with the functional water and decomposed in an accelerated manner by irradiation. The functional water that has lost its activity as a result of the reaction with the target substance is discharged into the tank 119 from the water tank 101 by way of a water discharge pipe 118. The gaseous decomposition product is discharged through a gas discharge pipe 121. If the gaseous decomposition product is not discharged, a discharge pipe 121 is not necessary. Note that the water discharged into the tank 119 may be recycled to the water tank 101, with newly dissolved electrolyte.

As the diaphragm, suitably used is an ion exchange membrane which restrain the movement of the electrolyte solution around the cathode 103 or the anode 105 respectively toward the other electrode, and makes irreversible the movement of positive ions (e.g., $Na^+$, $Ca^{2+}$, $Mg^{2+}$, $K^+$, etc.) from the anode side toward the cathode side and that of negative ions (e.g., $Cl^-$, $SO_4^{2-}$, $HCO_3^-$, etc.) from the cathode side toward the anode side. In other words, by using ion exchange membrane for the diaphragm, functional water having the properties discussed later can be efficiently produced around the anode.

When the medium containing the target substance is water, preferably the quantity of the water dissolving the electrolytes or the concentration of the electrolytes and the quantity of the medium containing the target substance should be controlled so that the electrolytic solution in the water tank 101 may not be excessively diluted by the medium to maintain the properties of the acidic water produced by electrolysis within the above listed ranges. For the same reason, if the target substance to be decomposed is an easily gasifiable substance (e.g., trichloroethylene, tetrachloroethylene, etc.) contained in an aqueous medium or water, preferably the target substance is gasified in advance by exposing it to air and the gaseous substance is introduced into the water tank instead of directly introducing the medium into the water tank. When the functional water is aerated with the gasified target substance, it is preferable to produce functional water continuously in the water tank 101 or to supply the functional water thereto constantly, because chlorine in the functional water may escape from the tank 101 as a chlorine gas to change the properties of the functional water.

Figure 2:
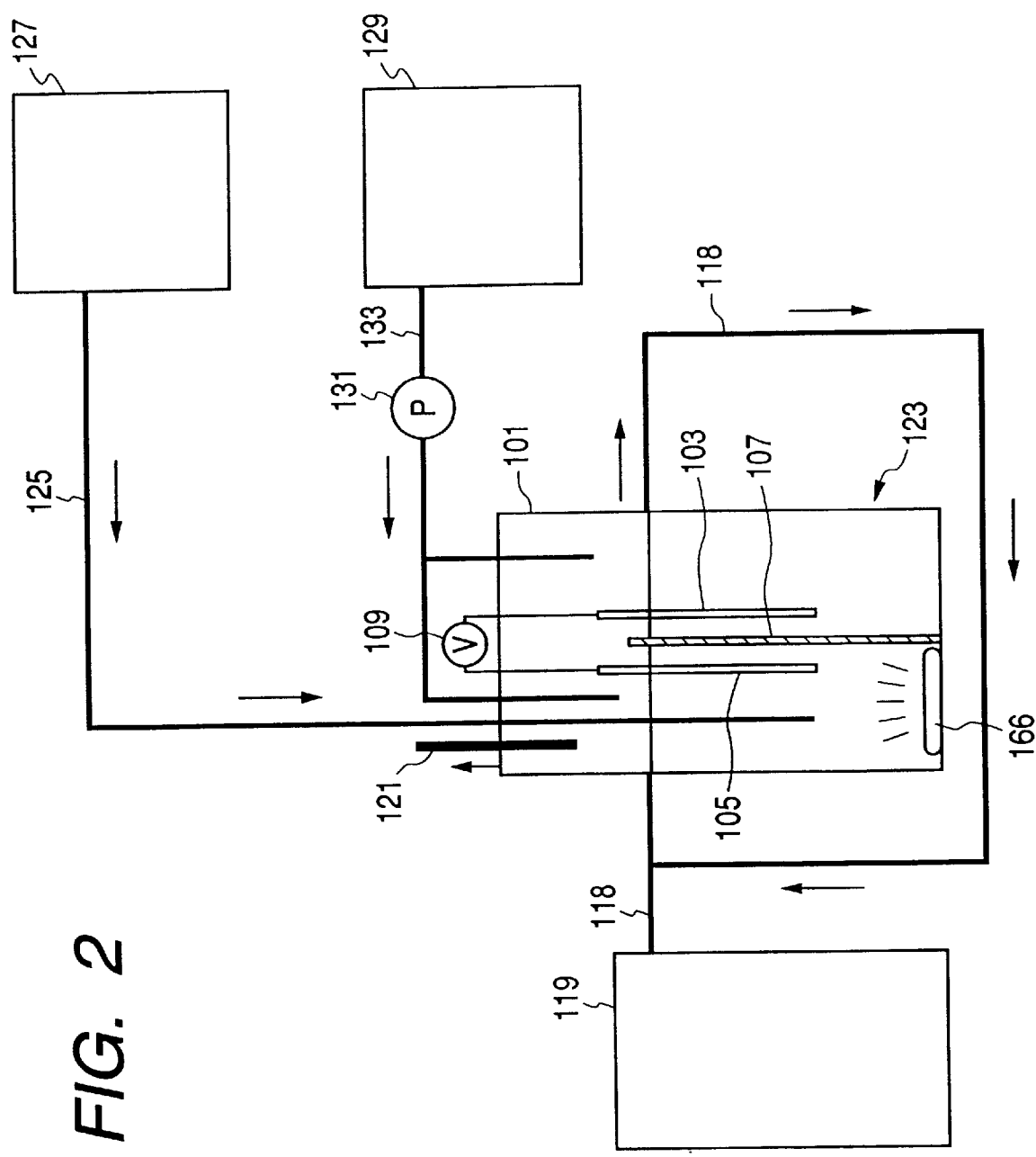
FIG. 2 is a schematic diagram of another embodiment of apparatus for decomposing halogenated aliphatic hydrocarbon compounds or aromatic compounds according to the invention.

FIG. 2 is a schematic block diagram of an embodiment of the apparatus for decomposing a gaseous target substance according to the invention. In FIG. 2, 123 denotes a functional water-generating unit, of which structure is almost the same as that of FIG. 1, and the functional water-generating unit 123 is provided with a light irradiation unit 166, an inlet pipe 125 for introducing the target substance into the unit 123, a gas supply unit 127 for supplying air containing the target substance, a tank for storing an aqueous electrolyte solution, a set of pipe 131 and pump 133 for supplying the aqueous electrolyte solution from tank 129 to the functional water-generating unit 123 and a gas discharge port for discharging the gas in which target substance was decomposed.

Figure 3:
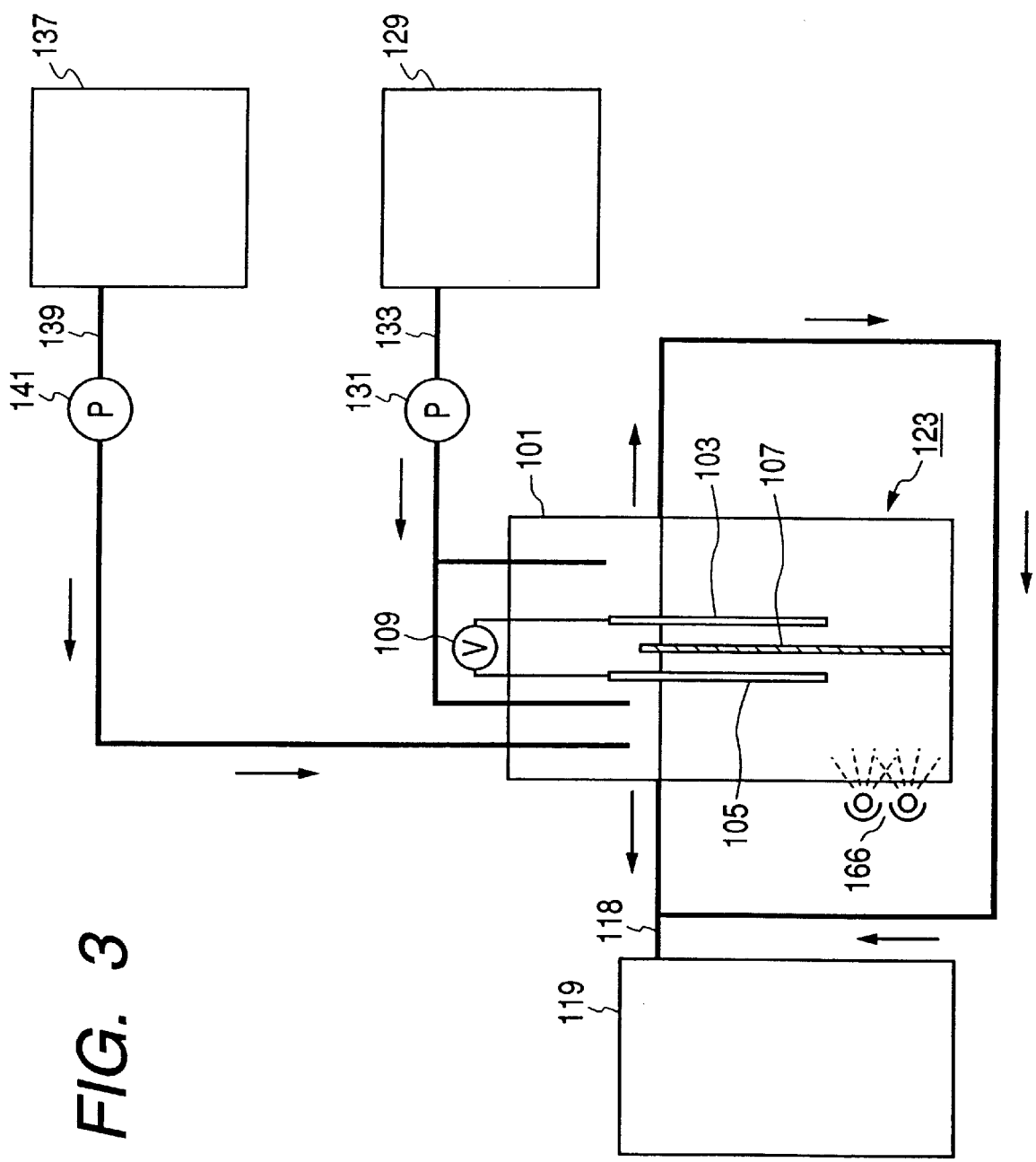
FIG. 3 is a schematic diagram of still another embodiment of apparatus for decomposing halogenated aliphatic hydrocarbon compounds or aromatic compounds according to the invention.

FIG. 3 is a schematic diagram of an embodiment of the apparatus for decomposing a target substance according to the invention where the target substance is in a liquid state or dissolved in a liquid medium. Referring to FIG. 3, the embodiment is provided with a tank 137 for storing liquid target substance or a liquid medium containing a target substance dissolved in it, a set of pipe 139 and pump 141 for supplying the stored liquid to the functional water-generating unit 123.

Figure 4:
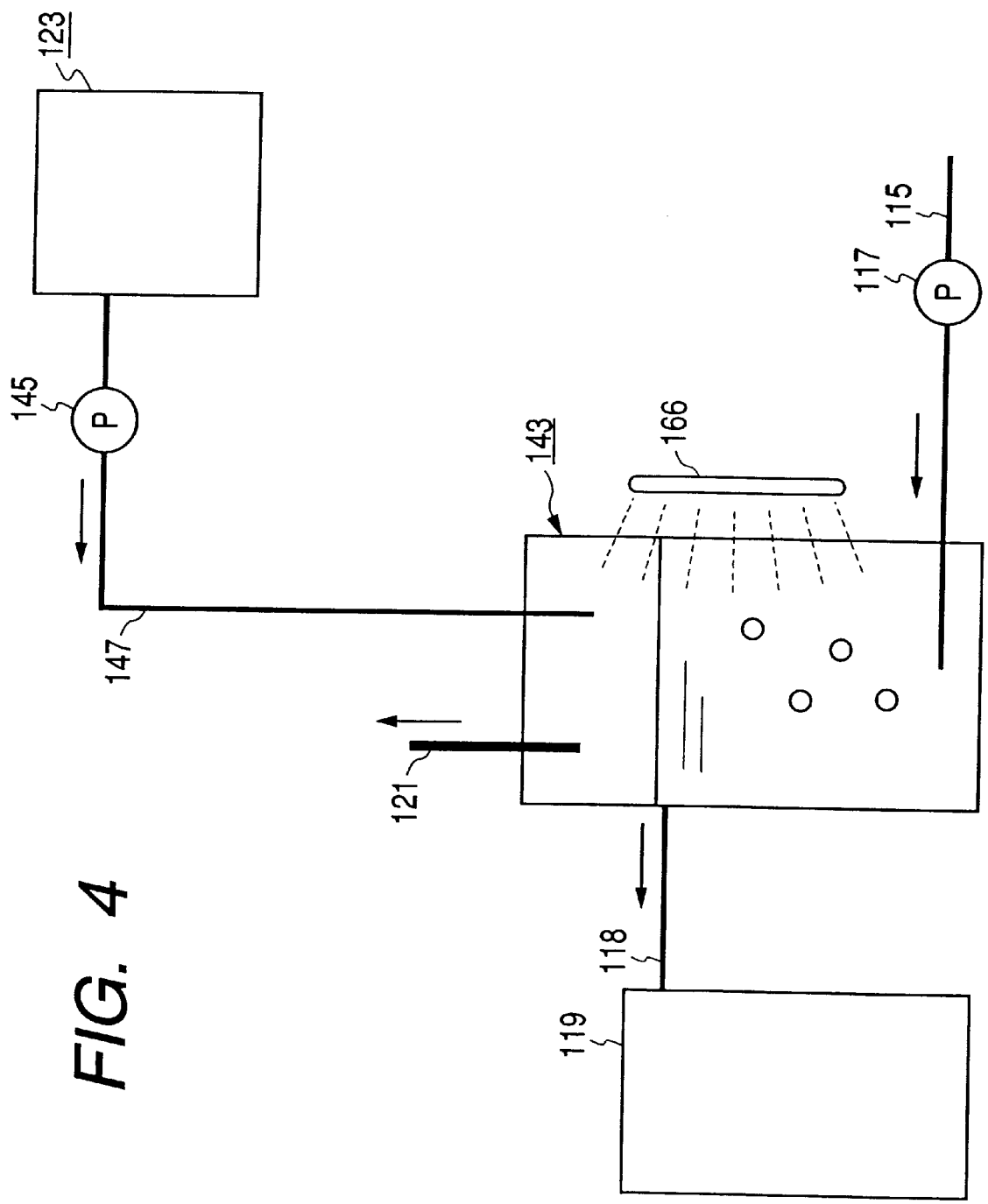
FIG. 4 is a schematic diagram of still another embodiment of apparatus for decomposing halogenated aliphatic hydrocarbon compounds or aromatic compounds according to the invention.

2)—Functional water is produced in an electrolytic water production apparatus and transferred into a decomposition treatment tank where a target substance comes into contact with the functional water under irradiation- FIG. 4 is a schematic diagram of one embodiment of the apparatus for decomposing a target substance according to the invention. Referring to FIG. 4, functional water produced at the anode side of the functional water-generating unit 123 is supplied continuously to decomposition treatment tank 143 at a desired flow rate by way of a pump 145 and a pipe 147. A target substance, for example, gaseous chlorinated aliphatic hydrocarbon compounds, is also supplied continuously to the decomposition treatment tank 143 at a desired flow rate by way of a feed pipe 115 and a pump 117, while the inside of the decomposition treatment tank 143 is irradiated by means of a light irradiation unit 166. The target substance contacts the functional water contact in the decomposition treatment tank 143 and decomposition is accelerated by irradiation. The functional water used in the treatment is then discharged from the decomposition treatment tank 143 into a tank 119. The purified gas is discharged through a discharge pipe 121. Since in this constitution, functional water is produced in the functional water-generating unit 123 and then comes in contact with the target substance in the decomposition treatment tank 143 under irradiation, the functional water-generating unit is prevented from contamination with the target substance. Part or all of the functional water used in the decomposition treatment may be fed back to the functional water-generating unit 123 to produce functional water again.

Figure 5:
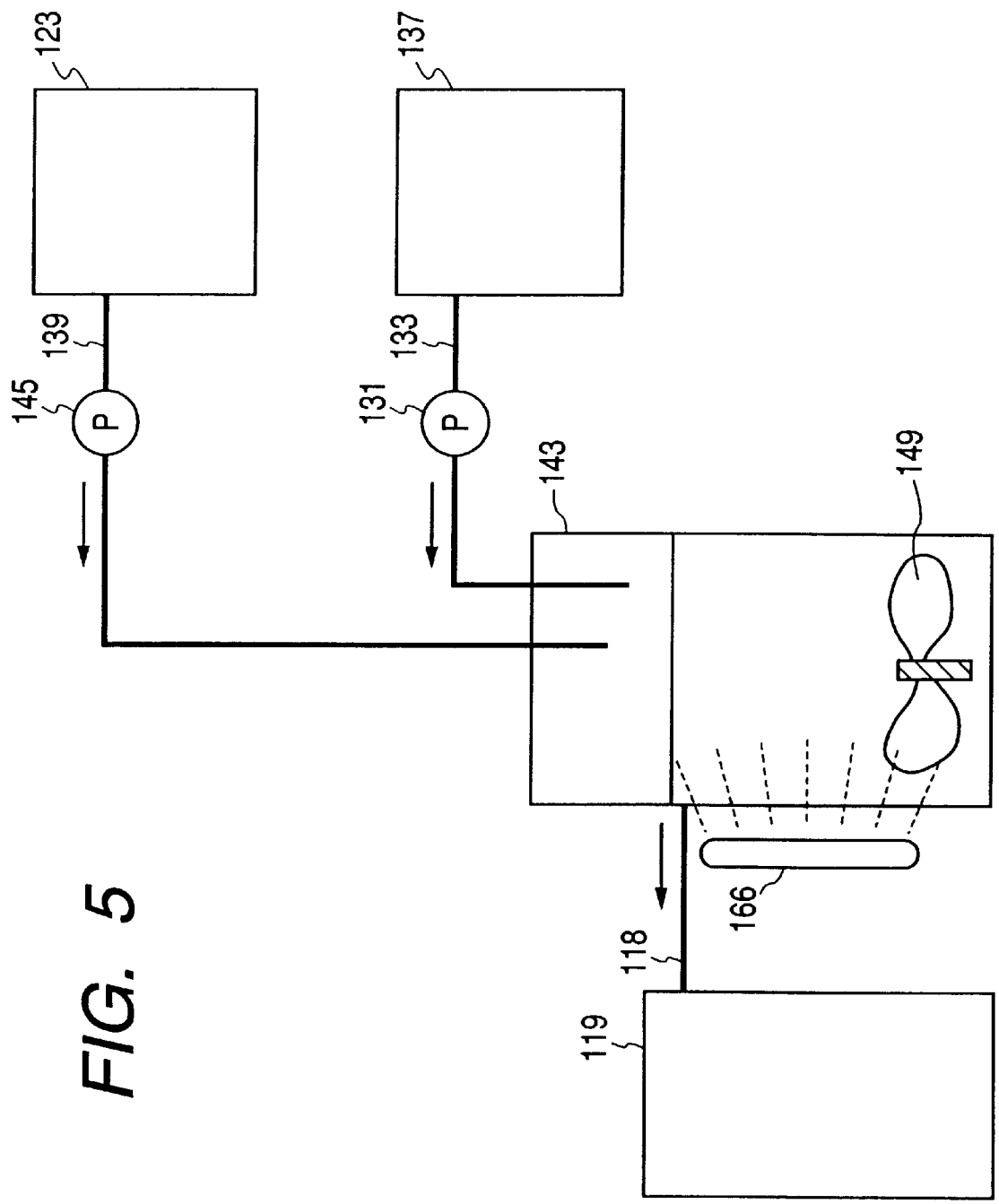
FIG. 5 is a schematic diagram of still another embodiment of apparatus for decomposing halogenated aliphatic hydrocarbon compounds or aromatic compounds according to the invention.

FIG. 5 is a schematic block diagram of still another embodiment of the apparatus for decomposing a target substance according to the invention. Referring to FIG. 5, functional water produced in a functional water-generating unit 123 is supplied to a decomposition treatment tank 143 by way of a pump 145 and a pipe 139. The target substance is fed from a tank 137 storing a liquid medium containing the target substance in a dissolved state to the decomposition treatment tank 143 by way of a pump 131 and a pipe 133. They are then agitated by means of an agitator 149 in the decomposition treatment tank 143, while the inside of the decomposition treatment tank 143 is irradiated by an irradiation unit 166. As a result, the target substance comes in contact with the functional water to be decomposed and decomposition is accelerated by irradiation. The agitating means provided in the decomposition treatment tank 143 improves the contact efficiency between the target substance and functional water, so the decomposition efficiency of the target substance.

Figure 6:
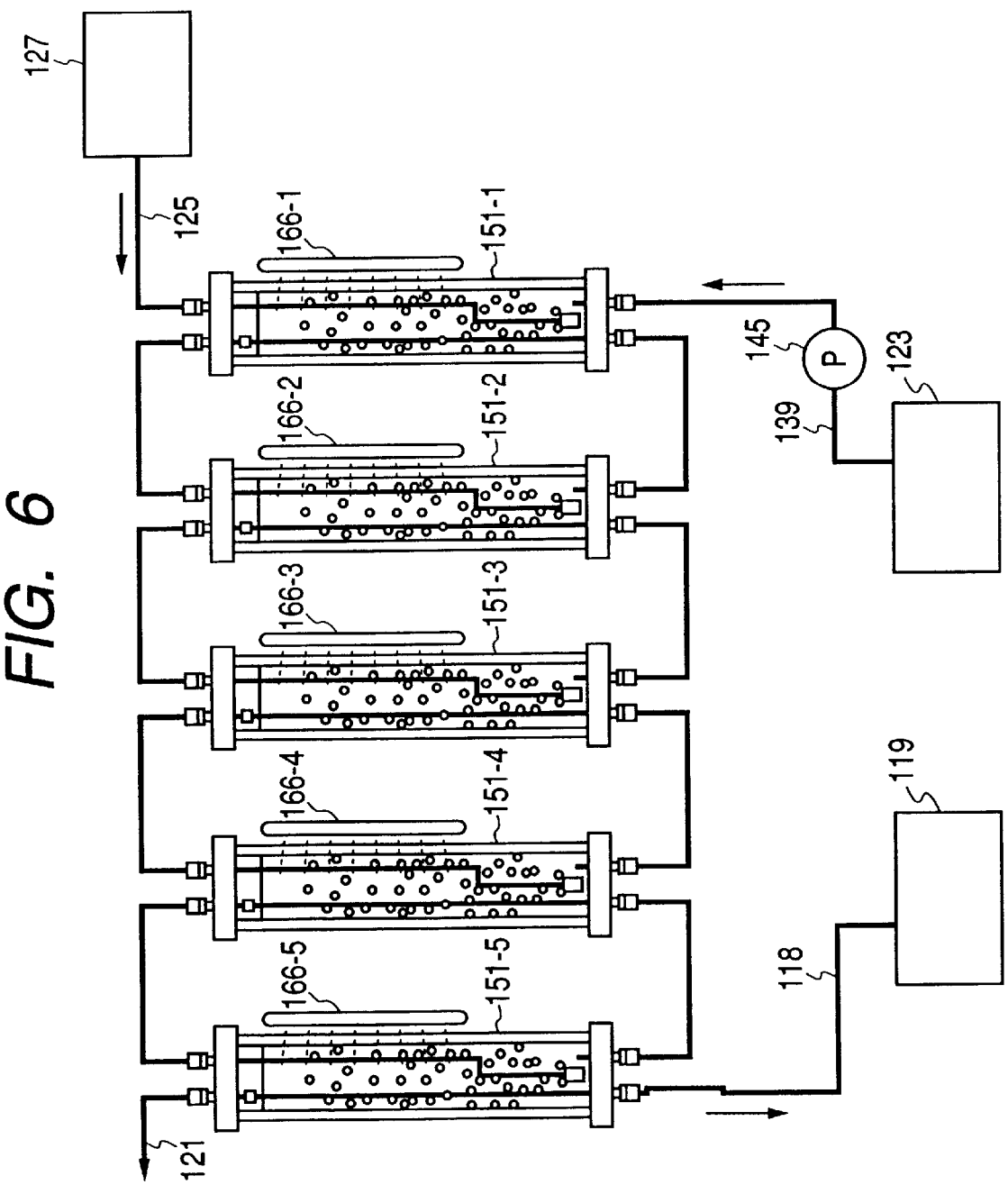
FIG. 6 is a schematic diagram of an embodiment of apparatus for decomposing gaseous halogenated aliphatic hydrocarbon compounds or aromatic compounds according to the invention.

FIG. 6 is a schematic block diagram of still another embodiment of the apparatus for decomposing a target substance according to the invention, directed to an easily gasifiable target substance such as trichloroethylene. Referring to FIG. 6, the embodiment comprises a functional water-generating unit 123, column-shaped decomposition tanks 151-1 through 151-5 for decomposing the target substance, light irradiation units 166-1 through 166-5 and a pipe 139 and pump 145 for supplying acidic water produced by the functional water-generating unit 123 to the decomposition container 151-1. As shown in FIG. 6, the five decomposition tanks 151-1 through 151-5 are connected in tandem so that the target substance may contact acidic water for a prolonged period of time and any residual target substance that has not been decomposed in the upstream tank(s) 151-1 through 151-4 may be brought into contact with additional acidic water in the downstream tank(s) 151-2 through 151-5 under irradiation until they become completely decomposed. It may be appreciated that the number of decomposition tanks to be connected may be appropriately selected depending on the concentration and the degradability of the target substance involved.

Figure 7:
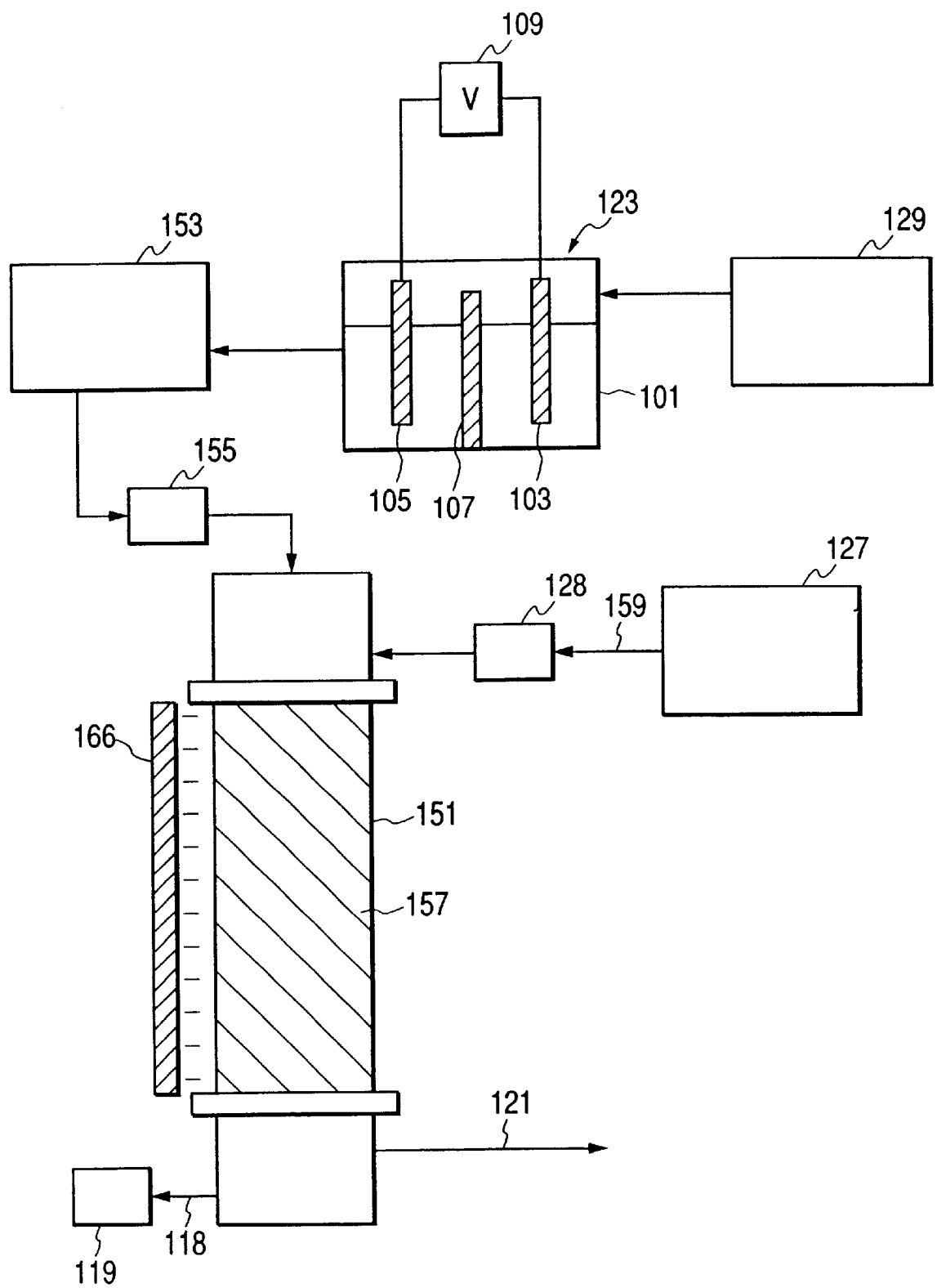
FIG. 7 is a schematic diagram of another embodiment of apparatus for decomposing gaseous halogenated aliphatic hydrocarbon compounds or aromatic compounds according to the invention.

If the target substance to be treated is in a gaseous state, an arrangement as shown in FIG. 7 may be used to reduce the length of the reaction vessel and increase the area and the period of contact between functional water and the target substance. Referring to FIG. 7, the embodiment comprises a reaction column 151 that is packed with a filler 157 that can adsorb halogenated aliphatic hydrocarbon compounds or aromatic compounds. The embodiment also comprises a light irradiation unit 166 adapted to irradiate the inside of the reaction column 151, means 159 which is a pipe provided with a blower 128 for introducing gasified target substance into the reaction column 151, a functional water-generating unit 123 and a storage tank 153 for storing the functional water produced by the functional-water generating unit 123. The functional water stored in the storage tank 153 is fed dropwise into the reaction column 151 from the top by means of a pump 155. The gaseous target substance is also introduced into the reaction column 151 from the top of the reaction column 151. The functional water flows down along the filler in the reaction column 151 and the gaseous target substance absorbed by the filler is decomposed in an accelerated manner while being irradiated. Any filler may be used in this embodiment so long as it can provide an increased contact area for functional water and a target substance. It may be in porous, hollow or spherical shape made of an inorganic material, or a plastic resin. Any particular filler used in the chemical industry, the pharmaceutical industry, the food industry and/or waste water treatment systems may be used for the purpose of the invention.

In FIGS. 4, 5, 6 and 7, functional water supplied from the functional water generating unit 123 may be acidic water obtained around the anode or a mixture of the acidic water and the alkaline water obtained around the cathode.

Also in FIGS. 4, 5, 6 and 7, the functional water-generating unit 123 may be replaced by a unit for supplying an aqueous solution of hypochlorous acid or hypochlorite.

Treatment of Exhaust Gas

The above described embodiments of apparatus according to the invention can decompose gaseous target substance, and applicable to a process for purifying exhaust gas discharged from of various industrial plants or refuse incineration plants.

Combustion gas discharged from industrial plants and refuse incineration systems typically contains various halogenated aliphatic hydrocarbon compounds and aromatic compounds as well as soot and smoke. Since fine dust may cause diseases in the respiratory tract, and benzpyrene and dioxin are strongly carcinogenic and mutagenic, it is a very important technical problem to purify exhaust gas and remove such harmful substances therefrom. In known processes for removing harmful substances, typically used are tandemly connected exhaust gas treatment apparatuses for dust collection, denitrification, desulfurization, dechlorination and so on, where halogenated aliphatic hydrocarbon compounds and aromatic compounds are removed individually and stepwise. For instance, Japanese Patent Application Laid-Open No. 5-115722 describes a purification method for halogenated aliphatic hydrocarbon compounds and aromatic compounds, using exhaust gas filters typically made of zeolite or ceramic of improved mechanical strength, shock-resistance and capture efficiency for the harmful substance. While such known processes can collect relatively large particles, they cannot practically remove molecular halogenated aliphatic hydrocarbon compounds nor aromatic compounds because they simply rely on a filtering effect for purifying the exhaust gas.

On the other hand, there are proposed a number of apparatuses for purifying exhaust gas containing halogenated aliphatic hydrocarbon compounds and aromatic compounds by contacting it with a catalyst. For example, Japanese Patent Application Laid-Open No. 5-149127 discloses a method and an apparatus for rendering soot and harmful compounds such as halogenated aliphatic hydrocarbon compounds or aromatic compounds contained in exhaust gas harmless by means of an oxidation catalyst and a heater therefor. The size of such an apparatus depends on the volume of exhaust gas to be treated and the quantity of the target substance contained in it. Therefore, systems equipped with a heating apparatus become considerably large in size with high running cost, since exhaust gas is discharged at a rate of 50 to 500 $m^3/h$ from a refuse incineration furnace or from a facility to extract contaminated gas from soil. Japanese Patent Application Laid-Open No. 6-246133 describes a method of heating and decomposing aliphatic hydrocarbon compounds or aromatic compounds by generating a corona discharge in exhaust gas. This method also can decompose low to high molecular weight halogenated aliphatic hydrocarbon compounds or aromatic compound as well as soot particles, to make them harmless. However, as mentioned with the above decomposition method, the concentration of harmful substances contained in the exhaust gas changes with time and even when the pollutant concentration of the exhaust gas is low, it is necessary to continue heating or corona discharge for a considerably long period. Therefore, there is a problem in the efficiency of energy consumption. Additionally, it is difficult for any of the above processes of oxidizing halogenated aliphatic hydrocarbon compounds or aromatic compounds to treat the high concentration of these substances, unless a number of apparatuses are arranged in parallel or in tandem to alleviate the load to each apparatus.

Methods and apparatuses for treating exhaust gas using microorganisms have also been proposed for purifying exhaust gas economically with a relatively small environmental load. For instance, U.S. Pat. No. 4,009,099 describes a method for purifying exhaust gas by decomposing gaseous contaminants as well as soot particles by means of microorganisms. U.S. Pat. No. 5,494,574 describes a method for purifying polluted water or gas containing harmful halogenated aliphatic hydrocarbon compounds or aromatic compounds by circulating a filler to which microorganisms are fixed in the reaction tank, while polluted water or gas passes through the tank. However, these methods have problems to be solved that the potential of the microorganisms limits the types of halogenated aliphatic hydrocarbon compounds or aromatic compounds that can be decomposed and the decomposition process takes a relatively long time.

Contrary to the above described known techniques, the method of the present invention can efficiently decompose halogenated aliphatic hydrocarbon compounds or aromatic compounds simply by bringing them into contact with functional water and irradiating them with light. Therefore, this will be a very effective technology for purifying exhaust gas, since certain target substance contained in exhaust gas can be reliably decomposed simply by contacting the exhaust gas with functional water and irradiating them with light. When a method of decomposing a target substance according to the invention is used for purifying exhaust gas, an apparatus having a constitution as shown in FIG. 7 or in FIG. 8 which will be described hereinafter, may suitably be employed.

Figure 8:
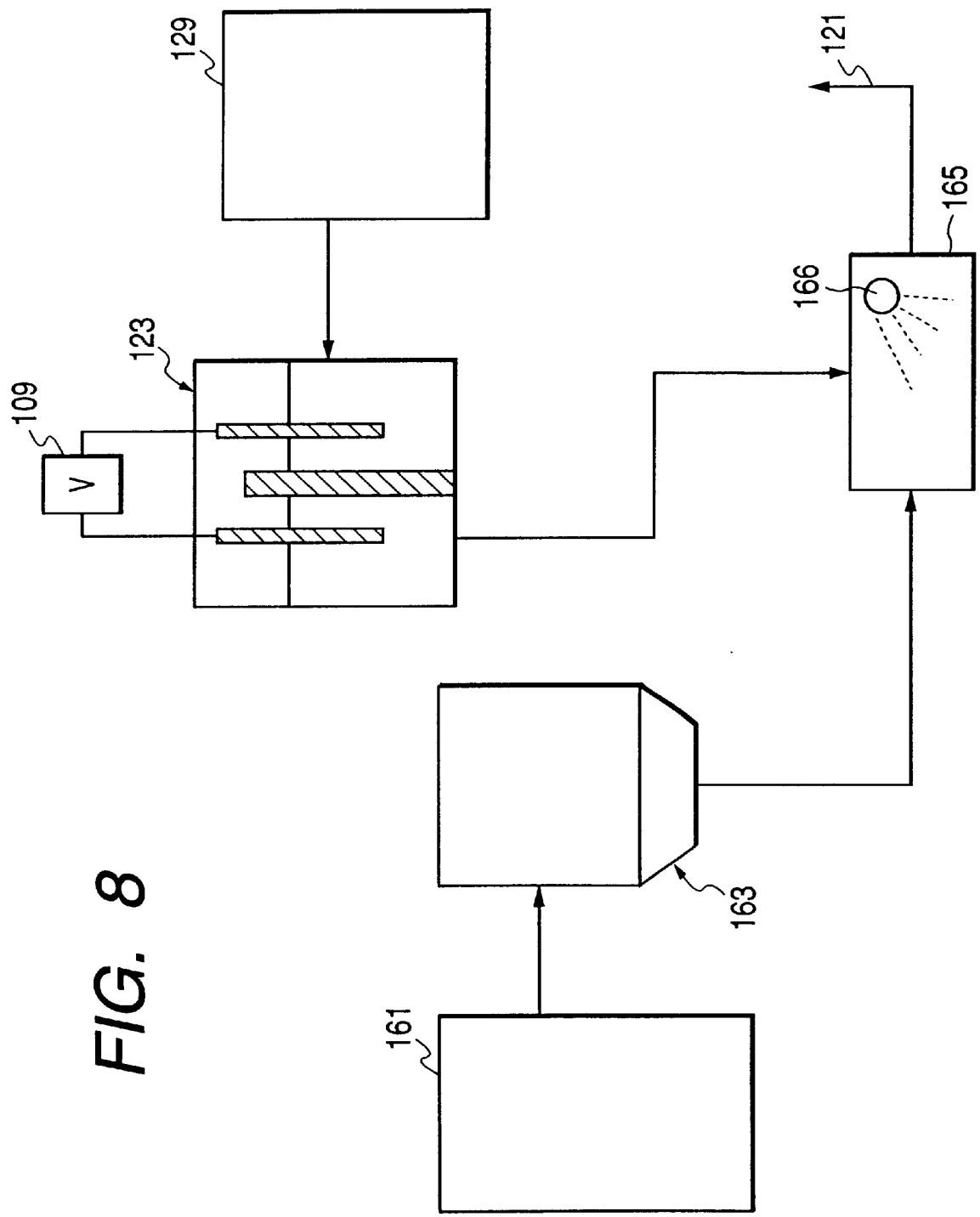
FIG. 8 is a schematic diagram of an embodiment of purification apparatus for exhaust gas according to the invention.

FIG. 8 shows a refuse incinerator 161, a device 163 (e.g., electric dust collector) for removing soot from exhaust gas emitted from the incinerator 161, a functional water-generating unit 123, a reaction tank 165 where functional water and the exhaust gas from which powdery dust has been removed react, and a light irradiation unit 166 for irradiating the inside of the reaction tank. There is also provided a storage means 129 for storing an aqueous solution of electrolytes necessary for producing functional water (obtained by dissolving water-soluble electrolytes into source water). The soot removing device 163 is to remove soot particles contained in a large amount in exhaust gas discharged from the incinerator 161, and the collected soot particles can be taken out from the device. Functional water produced around the anode of the functional water-generating unit 123 is supplied to the reaction tank 165, where exhaust gas and functional water can efficiently contact each other. A light irradiation unit 166 is provided Inside or outside provided inside or outside of the tank 165 to promote decomposition of the target substance. The reaction tank 165 is also provided with a gas discharge means 121 for discharging purified exhaust gas from which the target substance has been removed.

Next, the process is explained. Firstly, exhaust gas coming from the refuse incinerator 161 is introduced into the dust collector 163, where most of the soot particles contained in the exhaust gas are removed. Aqueous solution of electrolytes is supplied from the storage tank 129 to the functional water-generating means 123 to be electrolyzed there. Functional water produced around the anode of the means 123 is supplied to the reaction tank 165. Exhaust gas and functional water come into contact in the reaction tank 165 and irradiated with light by the light irradiation unit 166 so that the target substance contained in the exhaust gas are decomposed. Then, the treated exhaust gas is discharged from the gas discharge port 121 and the functional water used for treating the target substance is also discharged from a water discharge port 118.

When an exhaust gas treatment apparatus having a configuration as described above was actually used for treating exhaust gas from a waste incinerator, 99 to 99.7% of the target substance contained in the exhaust gas was decomposed. Thus, the excellent purifying potential for exhaust gas of the apparatus is clear.

When an apparatus having a configuration as illustrated in FIG. 7 or 8 is used for purifying exhaust gas, part or all of the used functional water discharged from the reaction tank 165 may be used for production of functional water again, although the modified arrangement is not shown. That is, part or all of the used functional water discharged from the reaction tank 165 will be fed back to the electrolytic water-generating means 129. Additionally, in the configuration of FIG. 7 or 8, the used functional water is discharged from the water discharge port 118, but it may be subjected to a filtering and/or precipitation process when it contains solid matter such as soot particles in an large amount.

When exhaust gas is purified by means of an apparatus as shown in FIG. 7, the rates at which functional water and exhaust gas are supplied are preferably regulated so that the voluminal percentage of exhaust gas in the reaction column exceeds 0.5, in order to increase the gas/liquid contact area and the average retention time of exhaust gas.

Functional water supplied from the functional water generating unit 123 of FIG. 7 or 8 may be either acidic water obtained at the anode side or a mixture of acidic water obtained at the anode side and alkaline water obtained at the cathode side. The unit 123 can be means to supply functional water prepared by dissolving a chemical agent.

Figure 9:
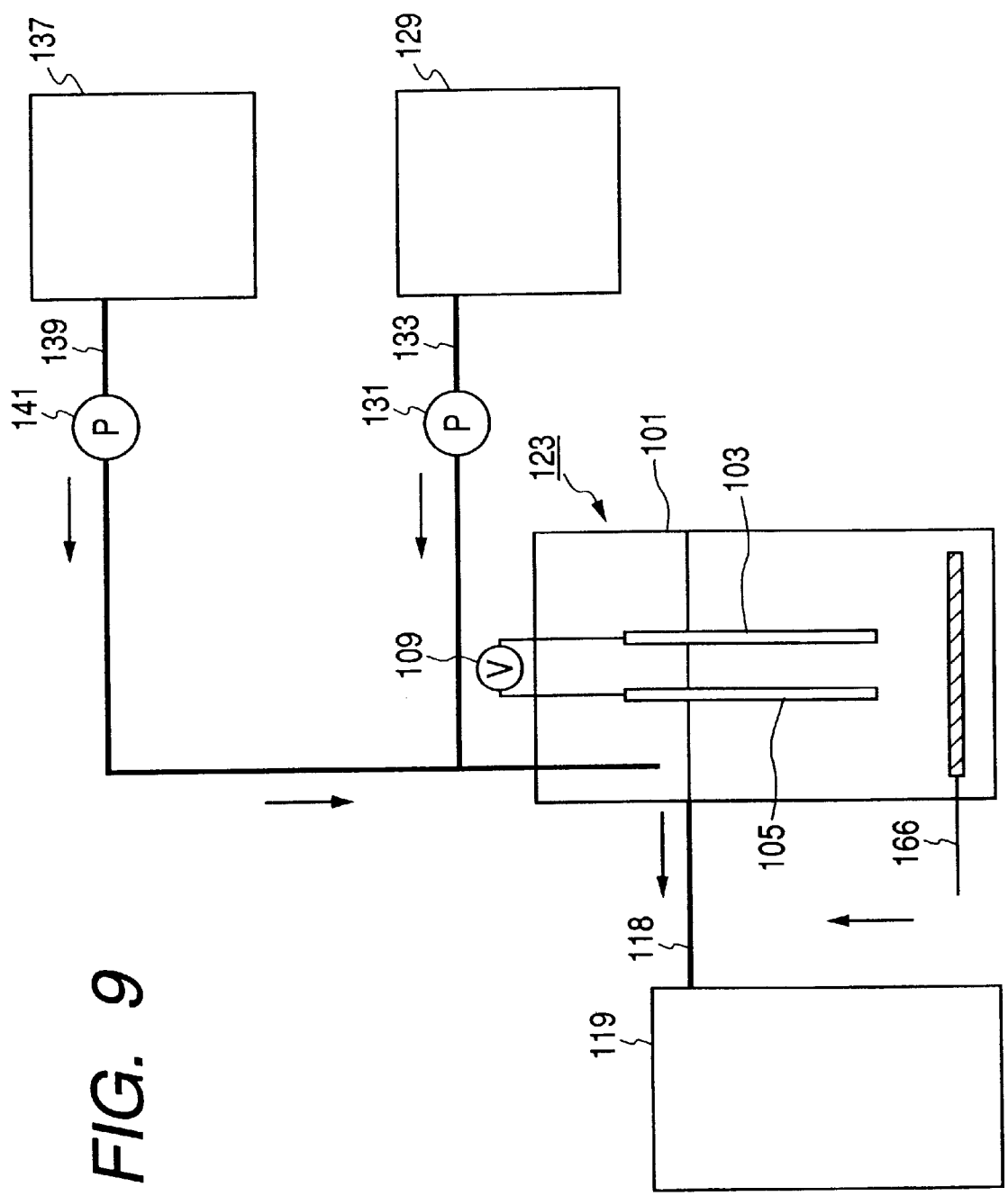
FIG. 9 is a schematic diagram of another embodiment of apparatus for decomposing halogenated aliphatic hydrocarbon compounds or aromatic compounds according to the invention.

While apparatus for decomposing target substance by using functional water and light irradiation have been described above, the diaphragm of ion exchange membrane may be removed from the water tank as shown in FIG. 9 to simplify the apparatus at the cost of the decomposition potential thereof. In other words, functional water produced from an apparatus not having a diaphragm can also be used to decompose target substance.

While various embodiments of the invention have been described above, the present invention is by no means limited to the above embodiments.

For example, an exhaust gas treatment apparatus of the invention can be applied not only to treat exhaust gas from refuse incinerator but also to other common exhaust gases such as exhaust gas of automobiles.

As described above, according to the invention, halogenated aliphatic hydrocarbon compounds or aromatic compounds can be decomposed economically, safely and stably at ordinary temperature and pressure.

Additionally, exhaust gas containing various halogenated aliphatic hydrocarbon compounds or aromatic compounds can be purified in a simple manner.

Now, the present invention will be described by way of examples, although they do not limit the scope of the present invention by any means.

—Decomposition of Halogenated Aliphatic Hydrocarbon Compounds by Means of Electrolytic Function Water and Light-

EXAMPLE 1

Decomposition of Trichloroethylene by Means of Functional Electrolytic Water and Light Irradiation To begin with, functional water was prepared using a strongly acidic functional water generating apparatus (Strong Electrolytic Water Generator (Model FW-200): tradename, a product of Amano Co. Ltd.) having a diaphragm arranged between the anode and the cathode. Using this apparatus, water of various electrolyte concentrations and various electrolysis periods, acidic functional water was prepared at the anode side, of which pH value, of which oxidation-reduction potential were determined by means of a pH meter TCX-90i and KP900-2N (Tradename, a product of Toko Chemical Laboratories) and an electroconductivity meter TCX-90i and KM900-2N (Tradename, a product of Toko Chemical Laboratories) respectively, as well as the chlorine concentration of by a chlorine test paper (Advantec). As a result, the pH value varied between 1.0–4.0, oxidation-reduction potential of the functional water 800–1,500 mV, and the chlorine concentration between 5–150 mg/l, depending on the electrolytic current, electrolytic time, and electrolyte (sodium chloride) concentration (standard value: 1000 mg/l). Therefore, two types of functional water, one with a pH value of 2.6, an oxidation-reduction potential of 1,000 mV and a residual chlorine concentration of 35 mg/l (hereinafter referred to as functional water 1) and the other with a pH value of 2.1, an oxidation-reduction potential of 1,150 mV and a residual chlorine concentration of 54 mg/l (hereinafter referred to as functional water 2) were prepared for this example. Functional water 1 was obtained by using the electrolyte (sodium chloride) concentration of 1000 mg/l and electrolysis time of 5 minutes, whereas functional water 2 was obtained by using the electrolyte (sodium chloride) concentration of 1000 mg/l and electrolysis time of 11 minutes. Then a plurality of 27.5 ml vials were divided into two groups and each vial was provided with an aliquot (10 ml) of functional water 1 or functional water 2 according to the groups. They were then hermetically sealed by means of a teflon-lined butyl rubber cap and an aluminum seal. Then, TCE gas was introduced into each vial through the butyl rubber cap by means of a gas tight syringe to a concentration of 25 ppm on the assumption that it completely dissolves into the functional water in the vial. After that, each vial was irradiated with light from a black light fluorescent lamp (10 W, tradename: FL10BLB, a product of Toshiba). The intensity of irradiation was 0.1 to 0.4 mW/cm$^2$. The gas phase TCE in the vial was sampled by using a gas tight syringe, and analyzed by gas chromatography (GC-14B: tradename, a product of Shimadzu Seisakusho with an FID detector; DB-624 column: tradename, a product of J&W Inc.) to know the change of the TCE concentration with time in each vial. The gas phase TCE concentration was converted to the TCE concentration dissolved in the functional water. The obtained results are shown in FIG. 10.

Figure 10:
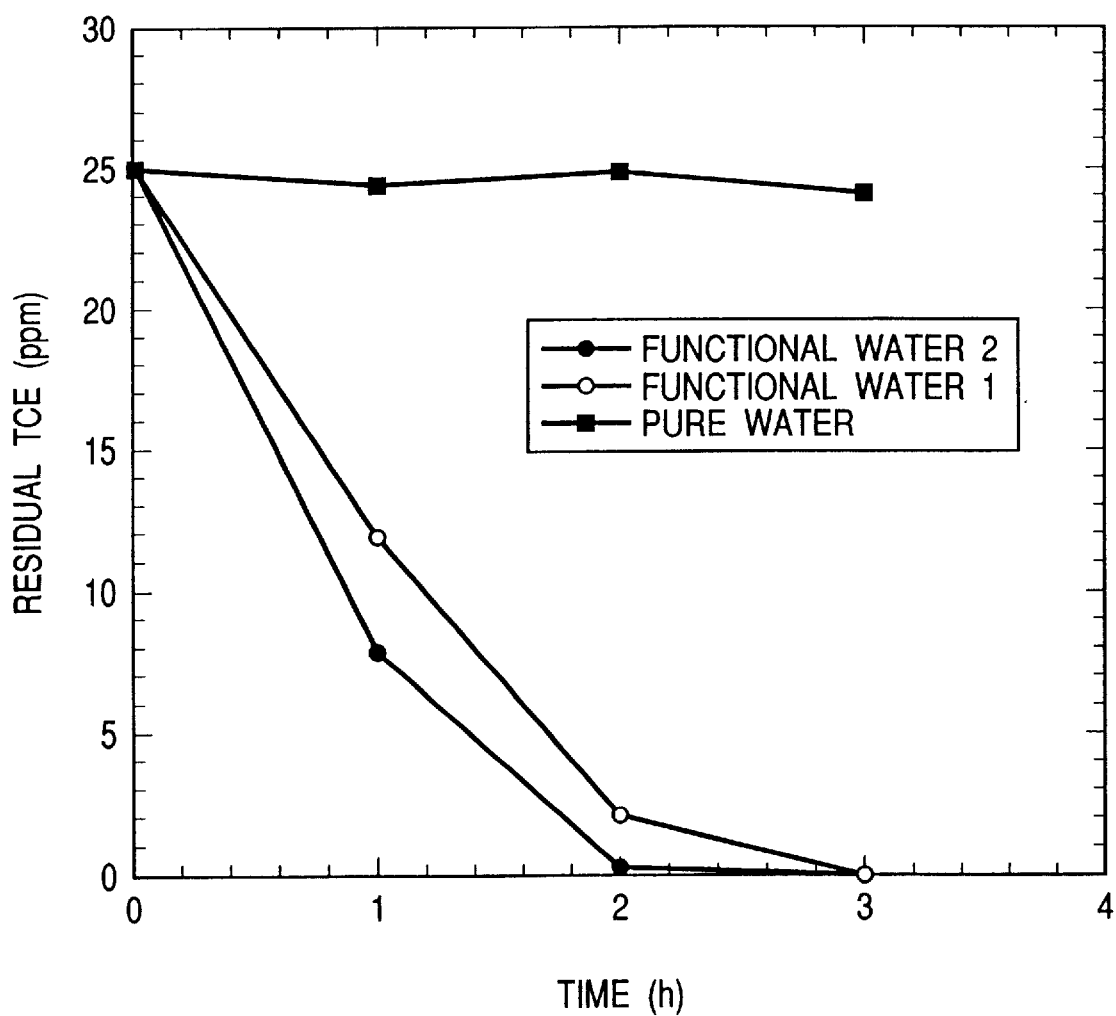
FIG. 10 is a graph showing the changes of the TCE concentrations with time under various conditions of Example 1.

As shown in FIG. 10, light irradiation of functional water 1 or functional water 2 can decompose TCE, but irradiation of pure water cannot. It was also found that TCE can be decomposed with different types of functional water (i.e., pH, redox potential and residual chlorine concentration).

Figure 11:
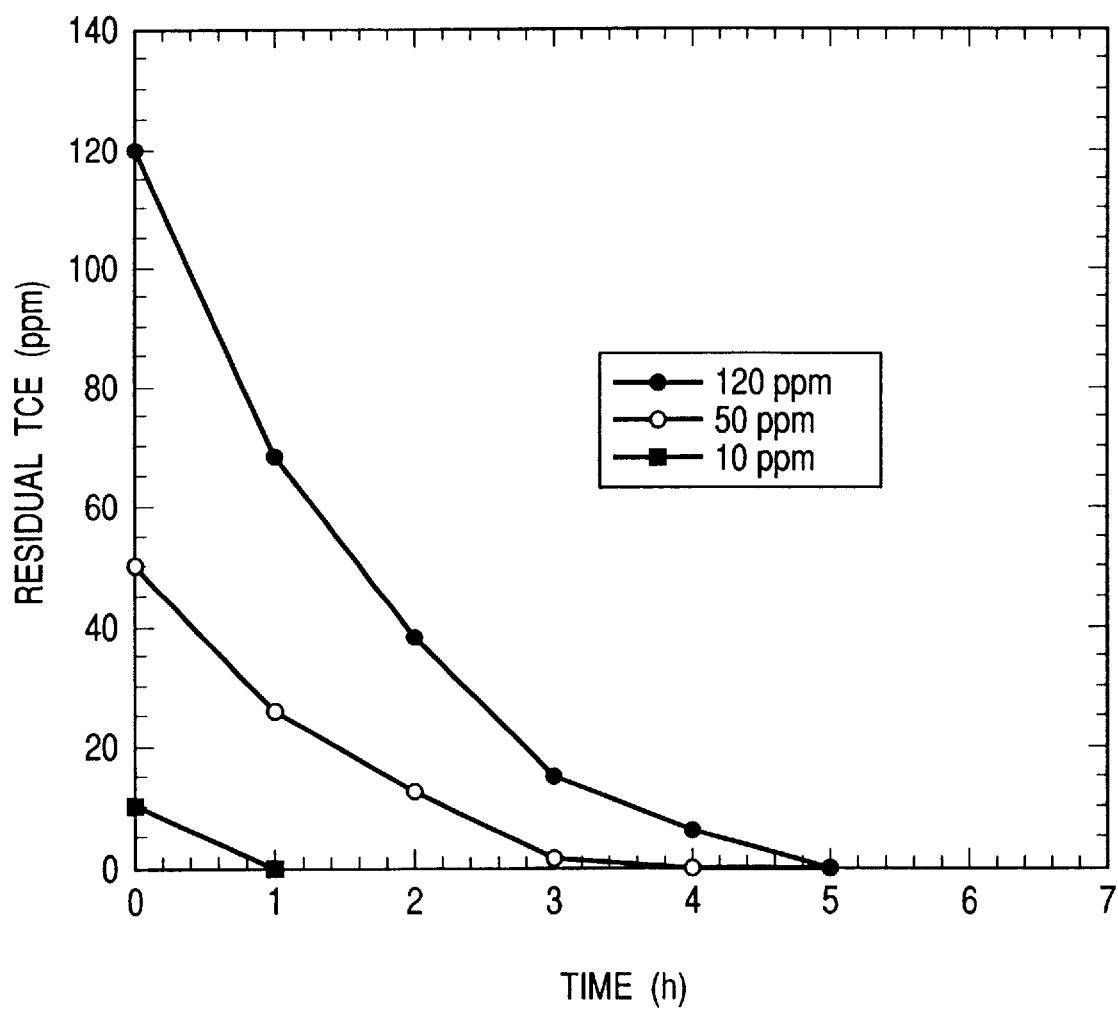
FIG. 11 is a graph showing the changes of the residual TCE concentrations with time observed in Example 1 with samples of different initial concentrations.

Next, an experiment was carried out in the same manner as above, except that the initial concentration of TCE in functional water 2 was 10 ppm, 50 ppm or 120 ppm to evaluate the TCE decomposition characteristics by functional water 2 and light irradiation. FIG. 11 shows the results. It was shown that not only TCE in a concentration of 10 ppm which is a typical environmental pollution level with TCE, but TCE of a concentration higher than 100 ppm can be decomposed. Further, TCE decomposition was examined using various functional water different in pH, oxidation-reduction potential and residual chlorine concentration. As a result, reduction of TCE concentration was observed with these functional water, to confirm the TCE decomposition by functional water and light irradiation.

EXAMPLE 2

Decomposition of Trichloroethylene by Functional Electrolytic Water and Light Irradiation Functional water was prepared as in Example 1. In this Example, function water having a pH value of 2.3, an oxidation-reduction potential of 1,050 mV and a residual chlorine concentration of 50 mg/l was prepared by electrolyzing water containing 1,000 mg/l of an electrolyte (sodium chloride) for 8 minutes.

Then, 50 ml of above functional water and then 100 ml of TCE-containing water (5 ppm) were put into a 200 ml vial, which was hermetically sealed with a teflon-lined butyl rubber cap and an aluminum seal. After slowly agitating the content three to four times, the vial was left under direct sun light from noon for two hours. The intensity of irradiation was between 0.4 and 1.2 mW/cm$^2$ when determined by a UV intensity integrating meter. Then, the gas phase in the vial was sampled by means of a gas-tight syringe and subjected to gas chromatography (GC-14B with an FID detector: a product of Shimadzu Seisakusho; DB-624 column: tradename, a product of J&W Inc.). As a result, the TCE concentration of the contaminated water was lower than the environmental standard level.

EXAMPLE 3
Decomposition of Trichloroethylene by Functional Electrolytic Water and Light Irradiation Functional water was prepared by using a strongly acidic electrolytic water generator (OASYS Bio HALF: tradename, a product of Asahi Glass Engineering). The functional water of this example had a pH value of 2.2, an oxidation-reduction potential of 1,100 mV and a residual chlorine concentration of 50 mg/l, obtained by electrolyzing water containing 1,000 mg/l of an electrolyte (sodium chloride). Then, a plurality of 27 ml vials were prepared, into which 10 ml of the functional water of 2-, 5-, 10- or 50-fold dilution was put. A vial containing pure water instead of functional water was also prepared as a control. The Each vial was hermetically sealed with a teflon-lined butyl rubber cap and an aluminum seal. Then, TCE gas was introduced into each vial through the butyl rubber cap by means of a gas tight syringe to a concentration of 10 ppm assuming that all TCE in the vial was completely dissolved into the water therein. After slowly agitating the content three to four times, all the vials were left under direct sun light from noon for four hours. The intensity of irradiation of light was between 0.4 and 1.2 mW/cm$^2$. Then, the gas phase in each vial was sampled by means of a gas tight syringe and subjected to gas chromatography (GC-14B with an FID detector: product of Shimadzu Seisakusho; DB-624 column is a product of J&W Inc.). As a result, the TCE concentration in the functional water of 2- and 5-fold dilution was undetectable after 4 hours, and that in the 10- and 50-fold dilutions were 1.1 ppm and 7.6 ppm respectively. No TCE decomposition was observed in the sample containing pure water instead of functional water.

EXAMPLE 4
Effect of Wavelength of Light on Decomposition of Trichloroethylene with Functional Electrolytic Water Functional water having a pH value of 2.2, an oxidation-reduction potential of 1,100 mV and a residual chlorine concentration of 50 mg/l was prepared by electrolyzing water containing an electrolyte (sodium chloride) of 1,000 mg/l as in Example 3. Then, a plurality of 27 ml glass vials were prepared and 10 ml of functional water was put in each vials, which were then hermetically sealed with a teflon-lined butyl rubber cap and an aluminum seal. Then, TCE gas was introduced into the vials through the butyl rubber cap by means of a gas tight syringe to a concentration of 10 ppm assuming that TCE was completely dissolved into the water therein. After slowly agitating the content three to four times, vials were covered with optical filters of which filtering characteristics were in 280 nm, 370 nm, 440 nm and 540 nm (UTF-50S-28U, SCF-50-37L, SCF-50-44L, SCF-50-54: products of Siguma Koki Kabushiki Kaisha) and left under direct sun light. The intensity of light of irradiation was between 0.4 and 1.2 mW/cm$^2$. The glass of these vials would not transmit the light of a wavelength shorter than 300 nm. After two hours, the TCE concentration of the gas phase in each vial was measured. More specifically, the gas phase in each vial was sampled by means of a gas tight syringe and subjected to gas chromatography (GC-14B with an FID detector: products of Shimadzu Seisakusho; column was DB-624 a product of J&W Inc.). The decomposed amount of TCE and the decomposition ratio was determined for each wavelength range. Table 1 shows the obtained results.

TABLE 1

| wavelength range | decomposition ratio |
|---|---|
| 300 nm–370 nm | 22.5% |
| 370 nm–440 nm | 93.2% |
| 440 nm–540 nm | 35.7% |
| 540 nm– | 5.3% |

As clearly seen from the above table, irradiation with light of a wavelength range between 300 nm and 550 nm, especially between 350 nm and 450 nm, is effective for decomposing TCE.

EXAMPLE 5
Effect of Intensity of Light on Decomposition of Trichloroethylene by Functional Electrolytic Water Functional water having a pH value of 2.3, an oxidation-reduction potential of 1,050 mV and a residual chlorine concentration of 38 mg/l was prepared by electrolyzing water containing an electrolyte (sodium chloride) of 1,000 mg/l as in Example 3. Then, a plurality of 27 ml vials were prepared and divided into three groups, to which 10 ml of one of three kinds of functional water, i.e., undiluted functional water, a two-fold dilution with pure water and a 5-fold dilution with tap water, were put respectively. Control samples containing pure water instead of functional water were also prepared. Then, all the vials were hermetically sealed by means of a teflon-lined butyl rubber cap and an aluminum seal. Thereafter, TCE gas was introduced into the vials through the butyl rubber cap by means of a gas tight syringe to a TCE concentration of 10 ppm, assuming that TCE was completely dissolved into the water therein. The content of each vial was slowly agitated three to four times.

A black light fluorescent lamp (tradename, FL10BLB: a product of Toshiba, 10 W), a light source for light having a peak at 365 nm (tradename: UVGL-58 Type Lamp, a product of UVP Inc.) and a color fluorescent lamp (blue) for light of a wavelength range between 380 and 600 nm (tradename: FL20S B, a product of Toshiba, 10 W) were used for irradiating the vials. The intensity of light of the black light fluorescent lamp was 1.2 mW/cm$^2$ and that of the UVGL-58 Type Lamp was 400 $\mu$W/cm$^2$, measured by using a UV intensity integrating meter (UV300: tradename, a product of TORAY). The intensity of light of the color fluorescent lamp (blue) was 57 $\mu$W/cm$^2$ measured by using a digital UV intensity meter (Model UVA-365: tradename, a product of NT Corporation).

After irradiating the vials with light for four hours, the TCE concentration of the gas phase in each vial was measured. More specifically, the gas phase of each vial was sampled by means of a gas tight syringe and subjected to gas chromatography to determine TCE concentrations (GC-14B with an FID detector, a product of Shimadzu Seisakusho, DB-624 column is a product of J&W Inc.).

As a result, among the samples irradiated by UVGL-58 type Lamp, TCE concentration of the samples containing undiluted functional water or twice diluted functional water became lower than the environmental standard level, but residual concentration of 1.25 ppm was observed with samples containing 5-fold diluted functional water. On the other hand, the TCE concentrations of all the samples containing functional water were lower than the standard level, when irradiated by a black light fluorescence lamp. With the samples irradiated by the blue florescence lamp, only samples containing undiluted functional water showed the reduction of TCE concentration to the environmental standard level. None of the control samples containing pure water, irradiated by any lamp, showed significant fall in the TCE concentration.

Figure 12:
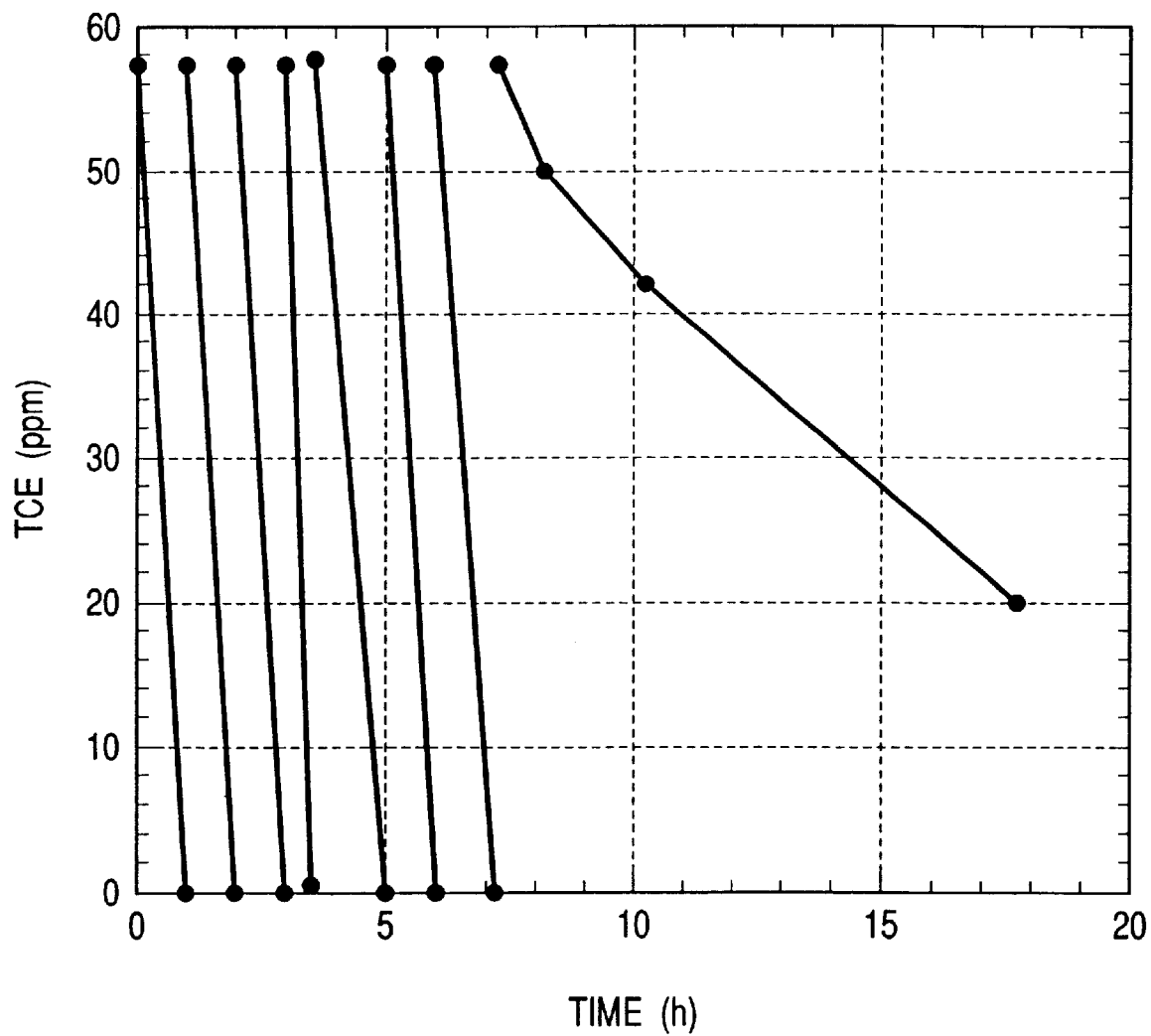
FIG. 12 is a graph showing the change of the TCE concentration with time in Example 6 where TCE was added repeatedly to the sample.

EXAMPLE 6
Decomposition of Repeatedly Added Trichloroethylene by Functional Electrolytic Water and Light Irradiation Functional water having a pH value of 2.2, an oxidation-reduction potential of 1,100 mV and a residual chlorine concentration of 50 mg/l was prepared by electrolyzing water containing an electrolyte (sodium chloride) at a concentration of 1,000 mg/l as in Example 3. Then, into a 27 ml vial, 10 ml of functional water was added and the vial was hermetically sealed with a teflon-lined butyl rubber cap and an aluminum seal. Then, TCE gas was introduced into the vial through the butyl rubber cap by means of a gas tight syringe to a TCE concentration of 50 to 60 ppm assuming that TCE was completely dissolved into the water therein. The vial was irradiated with light by using three black light fluorescent lamps (a product of Toshiba, FL10BLB). The intensity of irradiation was 2.0 mW/cm$^2$. During irradiation, the gas phase in the vial was sampled periodically by means of a gas tight syringe and subjected to gas chromatography (GC-14B: tradename, a product of Shimadzu Seisakusho (with an FID detector); DB-624 column: tradename, a product of J&W Inc.) to determine the TCE concentration in the gas phase. When the TCE concentration fell below 0.1 ppm after one hour of the light irradiation, TCE gas was again fed into the vial through the butyl rubber cap using a gas tight syringe to a TCE concentration of 50 to 60 ppm, and the light irradiation was continued. In this way, TCE gas was repeatedly introduced into the vial each time when the TCE concentration in the vial fell below 0.1 ppm to restore the TCE concentration of 50 to 60 ppm. FIG. 12 shows the results. Thus, it was proved that the functional water sustains the TCE degrading properties for a long period of time.

Figure 13:
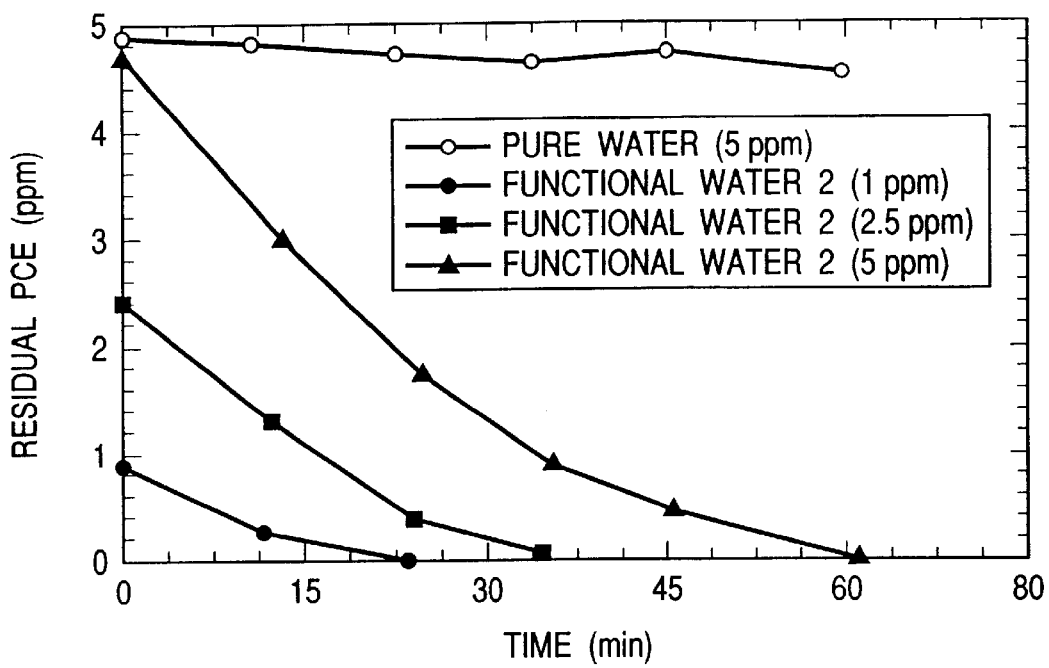
FIG. 13 is a graph showing the changes of the residual PCE concentrations with time in Example 7.

EXAMPLE 7
Decomposition of Tetrachloroethylene by Functional Electrolytic Water and Light Irradiation The procedure of Example 1 was followed except that tetrachloroethylene (PCE) in initial concentrations of 1.0 ppm, 2.5 ppm and 5.0 ppm were used in place of TCE, to see the capability of the functional water 1 in decomposing PCE under light irradiation. FIG. 13 shows the results. It was shown that the functional water can decompose PCE with light irradiation. In a control experiment using pure water, no PCE decomposition was observed. Thus, the reduction of the PCE concentration with time is due to functional water. In other experiments using various functional water different in pH, oxidation-reduction potential and residual chlorine concentration, the reduction of PCE concentration with time was also observed, thus, the effect of functional water and light irradiation for decomposing PCE was proved.

Figure 14:
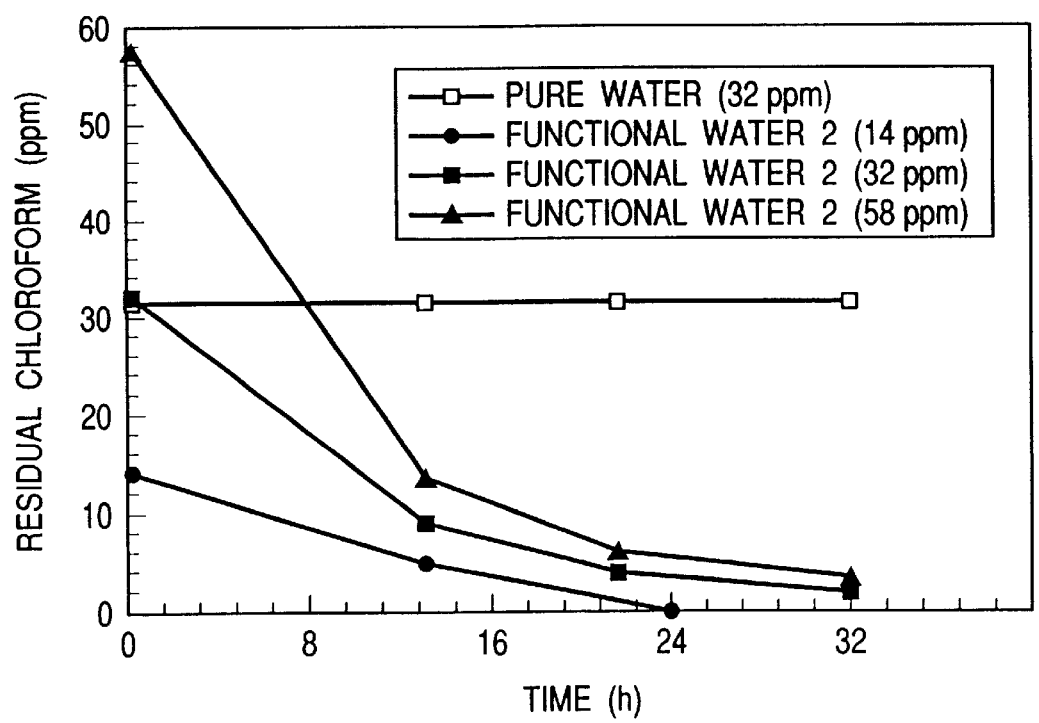
FIG. 14 is a graph showing the changes of the residual chloroform concentrations with time in Example 8.

EXAMPLE 8
Decomposition of Chloroform by Functional Electrolytic Water and Light Irradiation The procedure of Example 1 was followed except that chloroform in initial concentrations of 14 ppm, 32 ppm and 58 ppm were used in place of TCE, to see the capability of the functional water 2 in decomposing chloroform under light irradiation. FIG. 14 shows the results. It was shown that the functional water can decompose chloroform with light irradiation. In other experiments using various functional water different in pH, oxidation-reduction potential and residual chlorine concentration, the reduction of chloroform concentration with time was also observed, thus, the effect of functional water and light irradiation for decomposing chloroform was proved.

Figure 15:
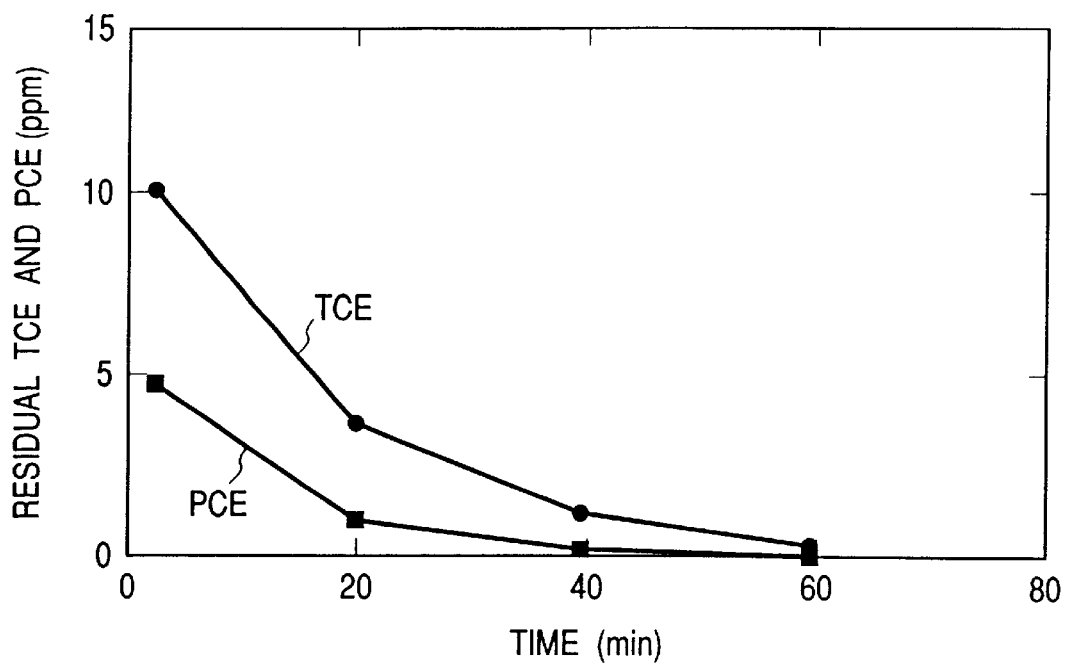
FIG. 15 is a graph showing the changes of the residual TCE and PCE concentrations with time in Example 9.

EXAMPLE 9
Decomposition of a Mixture of Trichloroethylene and Tetrachloroethylene by Functional Electrolytic Water and Light Irradiation The procedure of Example 1 was followed except that a mixture of TCE and PCE in place of TCE was used to evaluate the decomposition properties of functional water 2 for decomposing a mixture of TCE and PCE under light irradiation. To begin with, a mixture of gaseous TCE and PCE was introduced into a vial through a butyl rubber cap by means of a gas tight syringe to initial concentrations of 10 ppm and 5 ppm respectively, assuming that they completely dissolve into the water therein. FIG. 15 shows the result. It was shown that the functional water can decompose a mixture of TCE and PCE under light irradiation.

Figure 16:
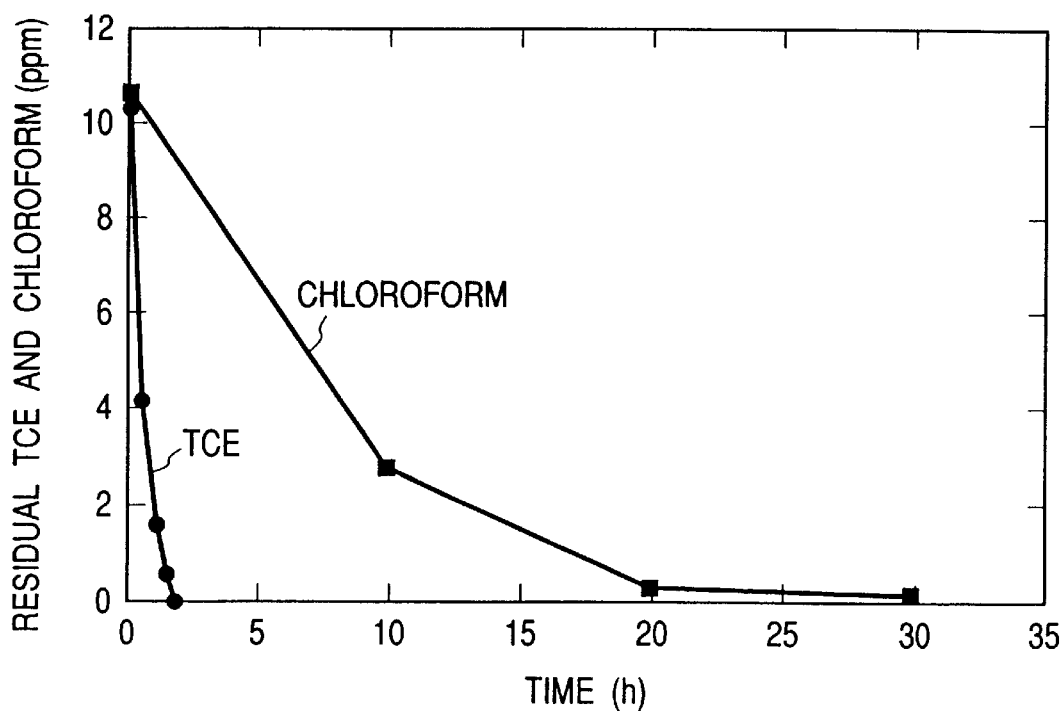
FIG. 16 is a graph showing the changes of the residual TCE and PCE concentrations with time in Example 10.

EXAMPLE 10
Decomposition of a Mixture of Trichloroethylene and Chloroform by Functional Electrolytic Water and Light Irradiation The procedure of Example 1 was followed except that a mixture of TCE and chloroform in place of TCE was used to evaluate the decomposition properties of functional water 2 for decomposing both of them under light irradiation. To begin with, a mixture of TCE and chloroform was introduced into a vial through a butyl rubber cap by means of a gas tight syringe to an initial concentration of 10 ppm respectively, assuming that they completely dissolve into the water therein. FIG. 16 shows the result. It was shown that the functional water can decompose a mixture of TCE and chloroform under light irradiation.

Figure 17:
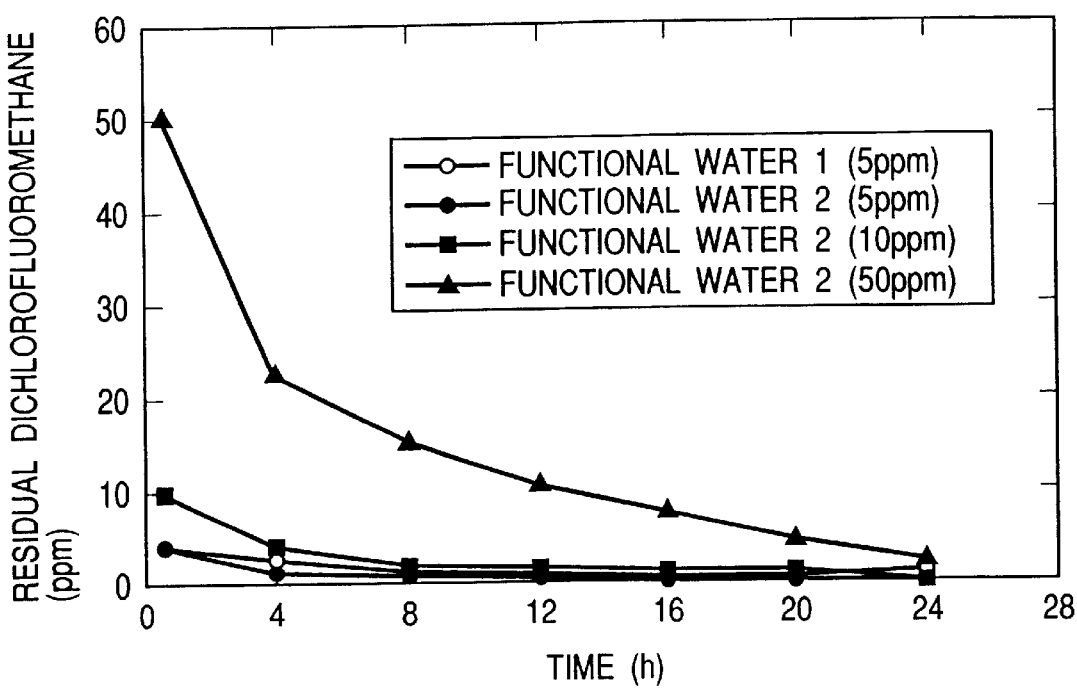
FIG. 17 is a graph showing the changes of the residual dichlorofluoromethane concentrations with time in Example 11.

EXAMPLE 11
Decomposition of Dichlorofluoromethane by Functional Electrolytic Water and Irradiation of Light The procedure of Example 1 was followed except that gaseous dichlorofluoromethane in an initial concentration of 5 ppm was used in place of TCE, to evaluate the decomposition properties of functional water 1. FIG. 17 shows the result. It was shown that functional water in combination with light irradiation can decompose dichlorofluoromethane within several to scores of hours under light irradiation. Then, a similar experiment was conducted by using functional water 2 and different initial concentrations of dichlorofluoromethane. FIG. 17 also shows the change of the dichlorofluoromethane concentrations starting from initial concentrations of 10 ppm and 50 ppm. Thus, it was found that functional water can decompose dichlorofluoromethane over a wide range of concentration. Additionally, dichlorofluoromethane-decomposing effect was evaluated with various functional water different in pH, oxidation-reduction potential and residual chlorine concentration, to confirm that the dichlorofluoromethane concentration is reduced by treating with functional water in combination with light irradiation.

Figure 18:
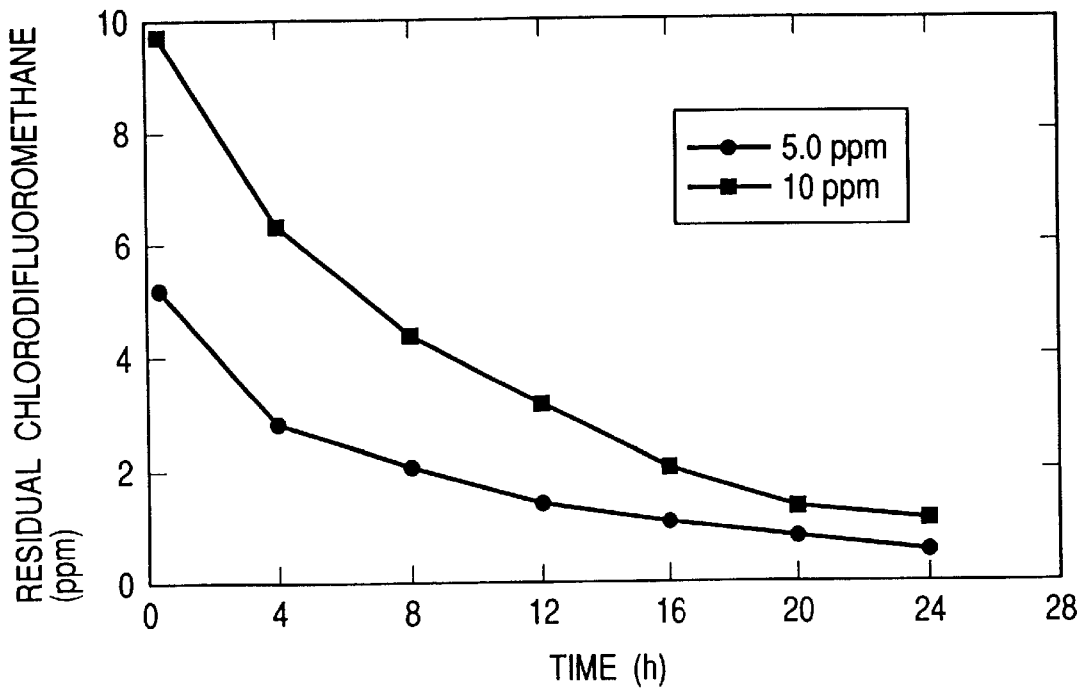
FIG. 18 is a graph showing the changes of the residual chlorodifluoromethane concentrations with time in Example 12.

EXAMPLE 12
Decomposition of Chlorodifluoromethane by Functional Electrolytic Water and Light Irradiation The procedure of Example 11 was followed except that chlorodifluoromethane in an initial concentration of 5 ppm was used in place of dichlororfluoromethane to evaluate the decomposition properties of functional water. FIG. 18 shows the obtained result. Thus, it was proved that functional water can decompose chlorodifluoromethane under light irradiation. Additionally, chlorodifluoromethane-decomposing effect was evaluated with various functional water different in pH, oxidation-reduction potential and residual chlorine concentration, to confirm that the chlorodifluoromethane concentration is reduced by treating with functional water in combination with light irradiation.

Figure 19:
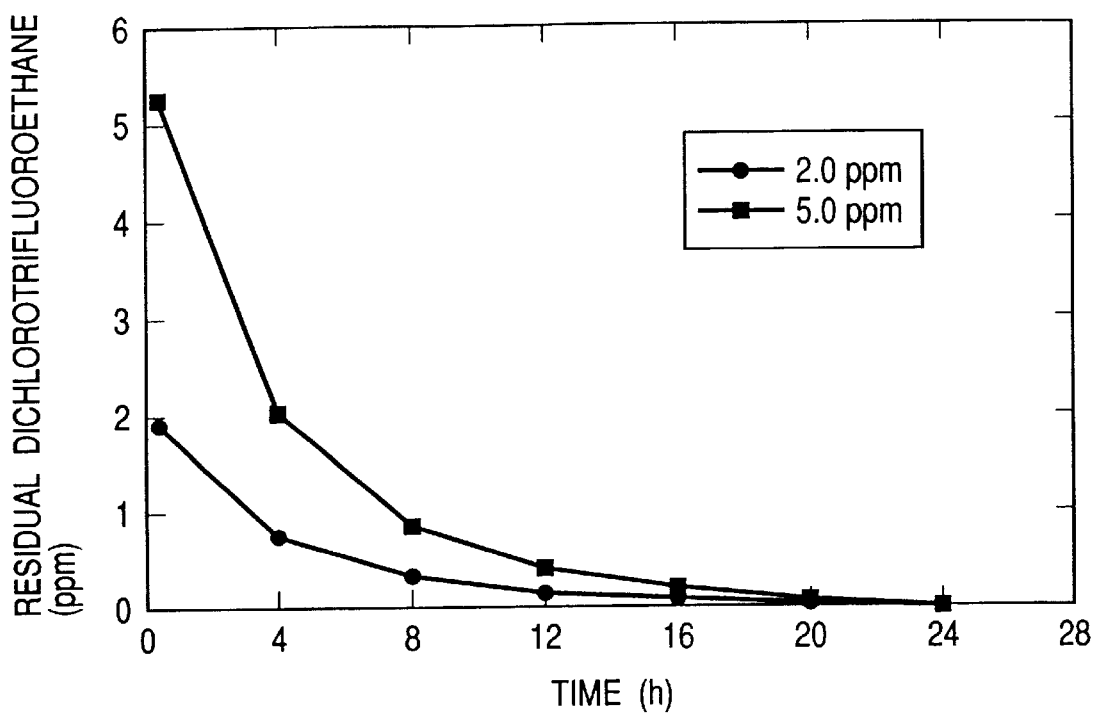
FIG. 19 is a graph showing the changes of the residual dichlorotrifluoromethane concentrations with time in Example 13.

EXAMPLE 13
Decomposition of 2,2-dichloro-1,1,1-trifluoromethane by Functional Electrolytic Water and Light Irradiation The procedure of Example 11 was followed except that dichlorofluoromethane was replaced by 2,2-dichloro-1,1,1-trifluoromethane, to evaluate the decomposition properties of functional water 2 used in combination with light irradiation. Initial concentrations of 2,2-dichloro-1,1,1-trifluoromethane concentrations were 2.0 ppm and 5.0 ppm. FIG. 19 shows the obtained result. It was shown that functional water can decompose 2,2-dichloro-1,1,1-trifluoromethane under light irradiation. Additionally, 2,2-dichloro-1,1,1-trifluoromethane-decomposing effect was evaluated with various functional water different in pH, oxidation-reduction potential and residual chlorine concentration, to confirm that 2,2-dichloro-1,1,1-trifluoromethane is reduced in concentration by treating with functional water in combination with light irradiation.

Figure 20:
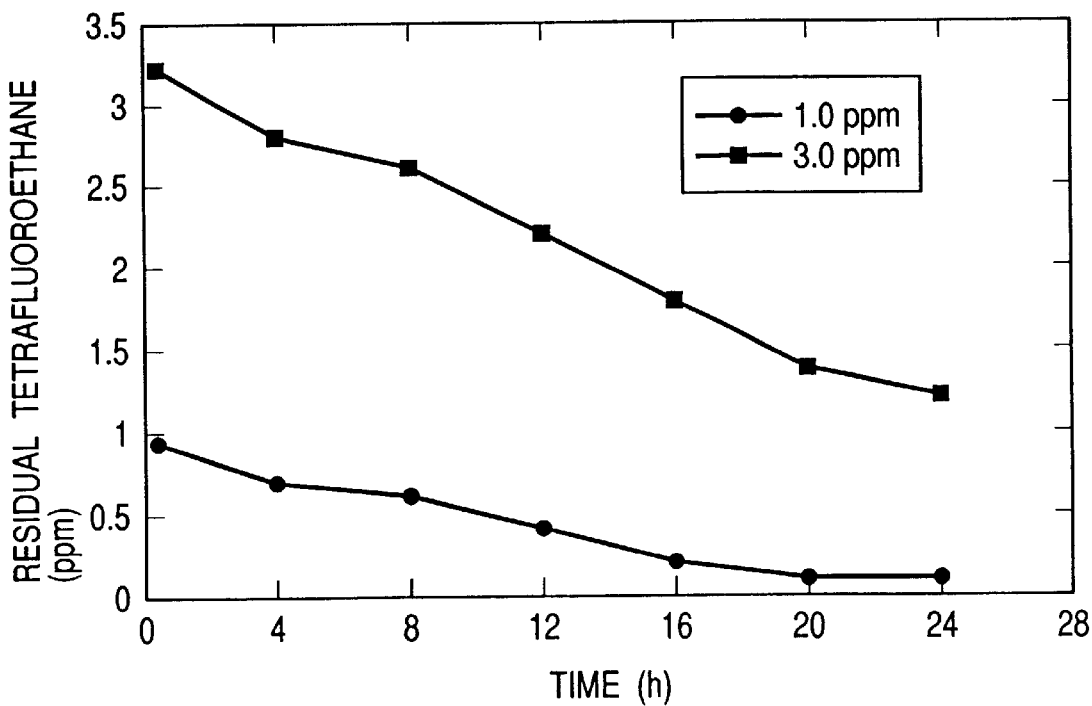
FIG. 20 is a graph showing the changes of the residual tetrafluoroethane concentrations with time in Example 14.

EXAMPLE 14
Decomposition of Tetrafluoroethane by Functional Electrolytic Water and Light Irradiation The procedure of Example 11 was followed except that tetrafluoroethane was used in place of to evaluate the decomposition characteristics of functional water in combination with light irradiation. Initial concentration of tetrafluoroethane was set to 1.0 ppm and 3.0 ppm. FIG. 20 shows the obtained result. It was shown that functional water can decompose tetrafluoroethane under light irradiation. Additionally, the tetrafluoroethane-decomposing effect was evaluated with various functional water different in pH, oxidation-reduction potential and residual chlorine concentration, to confirm that tetrafluoroethane concentration is reduced by treating with functional water in combination with light irradiation.

EXAMPLE 15
Decomposition of Biphenyl by Functional Electrolytic Water and Light Irradiation The procedure of Example 1 was followed except that biphenyl in an initial concentration of 20 ppm was used in place of TCE, to evaluate the decomposition properties of functional water 2 in combination with light irradiation. In this example, the concentration of residual biphenyl in the vial was determined spectrophotometrically by measuring the absorption peak at 230 to 270 nm which indicates the existence of benzene ring by using a spectrophotometer (UV310OS: tradename, Shimadzu Seisakusho). The absorption peak of biphenyl in the vial disappeared after the light irradiation, to show that biphenyl can be decomposed by functional water in combination with light irradiation. Additionally, biphenyl-decomposing effect was evaluated with various functional water different in pH, oxidation-reduction potential and residual chlorine concentration, to confirm that biphenyl is decomposed by treating with functional water in combination with light irradiation. In a control experiment using pure water instead of functional water, no decomposition of biphenyl was observed, to show the decomposition of biphenyl by functional water and light irradiation.

EXAMPLE 16
Decomposition of DDVA by Functional Electrolytic Water and Light Irradiation The procedure of Example 15 was followed except that dehydrodivanillic acid (DDVA) in an initial concentration of 10 ppm was used in place of TCE, to evaluate the decomposition properties of functional water 2 in combination with light irradiation. DDVA is a compound having biphenyl bonde represented by the following formula:

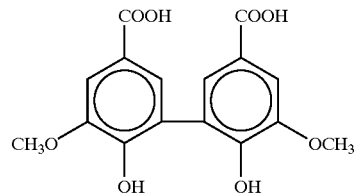

In this example, the concentration of residual DDVA in the vial was determined spectrophotometrically by measuring the absorption peak at 230 to 270 nm which indicates the existence of benzene ring by using a spectrophotometer (UV3100S: tradename, Shimadzu Seisakusho). The absorption peak of DDVA in the vial disappeared after the light irradiation, to show that DDVA can be decomposed by functional water in combination with light irradiation. Additionally, DDVA-decomposing effect was evaluated with various functional water different in pH, oxidation-reduction potential and residual chlorine concentration, to confirm that DDVA is decomposed by treating with functional water in combination with light irradiation. In a control experiment using pure water instead of functional water, no decomposition of DDVA was observed, to show the decomposition of DDVA by functional water and light irradiation.

EXAMPLE 17
Decomposition of PCBs by Functional Electrolytic Water and Light Irradiation The procedure of Example 15 was followed except that PCBs (Kanechlor KC-300: tradename, a product of Kanegafuchi Chemical Industry) in an initial concentration of 15 ppm was used in place of biphenyl to evaluate the decomposition properties of functional water 2 in combination with light irradiation. In this Example, the concentration of residual PCBs in the vial was determined by gas chromatography. The peak attributable to residual PCBs in the vial disappeared after the light irradiation, showing that PCBs can be decomposed by means of functional water in combination with light irradiation. Additionally, the PCB decomposing effect was evaluated with various functional water different in pH, oxidation-reduction potential and residual chlorine concentration, to confirm PCBs are decomposed by treating with functional water in combination with light irradiation. In a control experiment using a control sample of pure water in stead of functional water, no decomposition of PCBs was observed, to confirm that PCBs are decomposed by functional water in combination with light irradiation.

EXAMPLE 18
Decomposition of Waste PCB by Functional Electrolytic Water and Light Irradiation The procedure of Example 17 was followed except that waste PCB in an initial concentration of 10 ppm was used in place of PCBs, to evaluate the decomposition properties of functional water 2 in combination with light irradiation. The concentration of residual PCB in the vial of this example was determined by gas chromatography after shaking the vial at 120 rpm for 1 hour at 15° C. As a result, 93%–97% PCB was decomposed. Thus, it was proved that waste PCB can be decomposed within several hours by functional water in combination with light irradiation. In a control experiment using pure water instead of functional water, no decomposition of waste PCB solution was observed to show that waste PCB is decomposed by the functional water in combination with light irradiation. Additionally, waste PCB-decomposing effect was evaluated with various functional water different in pH, oxidation-reduction potential and residual chlorine concentration, and with any functional water the concentration of waste PCB solution was reduced with time and the decomposition of waste PCB by functional water in combination with light irradiation was confirmed.

EXAMPLE 19
Decomposition of Trichloroethylene by Functional Electrolytic Water and Light Irradiation In this example, solubilized trichloroethylene was directly contacted with functional water to evaluate the TCE-decomposing effect. First, into a 27.5 ml vial, 18 ml of the same functional water 2 as used in Example 1 was added, to which 2.0 ml of a 200 ppm TCE solution was added and the vial was hermetically sealed with a teflon-lined butyl rubber cap and an aluminum seal. Then, the vial was irradiated with light as in Example 1 and the decomposition of TCE was observed. More specifically, the vial was shaken at 120 rpm for 3 hours at 15° C., and then an aliquot (0.5 ml) of the content was sampled. The sample solution was immediately put into a container containing 5 ml n-hexane and stirred for 3 minutes. Thereafter, the n-hexane layer was collected to determine the TCE concentration by EDC gas chromatography. As a result, the concentration was less than 0.03 ppm. In a control experiment using pure water in place of functional water, no decomposition of TCE was observed. It was confirmed that when solubilized TCE is brought into contact with functional water, TCE is also decomposed by functional water in combination with light irradiation.

EXAMPLE 20
Apparatus for Decomposing Gaseous Trichloroethylene

An apparatus as illustrated in FIG. 2 was prepared. A gas inlet pipe 125 was provided to introduce gaseous TCE into the anode side of a strongly acidic functional water generating apparatus 123 (Strong Functional Water Generator (Model FW200): a product of Amano). Then, the inlet pipe 125 was connected to a gas supply unit 127 (standard gas generator, Gastec PD-18: tradename) for providing air containing TCE. A set of a pump 131 and a pipe 133 was installed to supply an aqueous electrolyte solution from tank 129 storing the solution to the apparatus 123. Then, a water tank 101 of the apparatus 123 was filled with the electrolyte solution of sodium chloride 1 g/l. Subsequently, air containing 3,000 ppm TCE was continuously fed into the apparatus 123 at a flow rate of 50 ml/min, while the apparatus was being running. It was confirmed that functional water having a pH value of 2.1, an oxidation-reduction potential of 1,150 mV and a residual chlorine concentration of 54 mg/l was produced around the anode. The inside of the water tank 101 was irradiated with light emitted from a light irradiation means 166 (black light fluorescent lamp FL10BLB: a product of Toshiba, 10 W). The treated water discharged from the discharge port 118 at the anode side 105 of the apparatus 123 was stored in a waste solution tank 119, from which TCE was extracted with hexane and the TCE concentration of the waste solution was determined by gas chromatography with an ECD detector (GC-14B: a product of Shimadzu Seisakusho). It was less than 0.03 ppm.

The TCE concentration of the gas discharged through the discharge pipe 135 was also determined by gas chromatography with an FID detector (GC-14B: a product of Shimadzu Seisakusho; DB-624 column: a product of J&W Inc.). The TCE concentration in the exhaust gas was less than 1 ppm. Thus, the apparatus according to the invention can decompose TCE very effectively.

EXAMPLE 21
Apparatus for Decomposing Synthetic Contaminated Solution

In this example, an apparatus as shown in FIG. 3 was assembled incorporating a strongly acidic functional water-generating apparatus 123 (Strong Electrolytic Water Generator (Model FW200): a product of Amano). A set of a pipe 139 and a pump 141 was arranged in such a way that a synthetic contaminated solution was supplied from a tank 137 to the anode side 105 of the water tank 101 of the apparatus 123. An aqueous electrolyte solution was supplied to the water tank 101 from a storage tank 129 by way of a set of a feed pump 131 and a pipe 133. A synthetic contaminated solution of a composition shown below was put into the tank 137.

Composition of Contaminated Synthetic Solution
TCE 1,200 mg
PCE 1,000 mg
chloroform 40 mg
water 1 liter After filling the water tank 101 with the synthetic contaminated solution and the aqueous electrolyte solution, the apparatus 123 was operated under conditions to produce functional water having a pH value of 2.1, an oxidation-reduction potential of 1,100 mV and a residual chlorine concentration of 50 mg/l, by electrolyzing for 11 minutes an electrolyte solution of 1000 mg/l, while the inside of the water tank 101 was irradiated with light emitted from a light irradiation means 166 (black light fluorescent lamp FL10BLB: a product of Toshiba, 10 W). After one hour operation, the waste solution discharged from the discharge port 118 of the water tank 101 was stored in a waste tank 119 and the concentrations of TCE, PCE and chloroform of the waste solution were measured. As a result, they were all less than 0.1 ppm. Thus, chlorinated aliphatic hydrocarbon compounds can be decomposed very effectively by using the apparatus.

EXAMPLE 22
Continuous Decomposition of Trichloroethylene by Functional Water In this example, an apparatus as shown in FIG. 6 was used for the experiment of decomposing TCE. The same strongly acidic functional water generating apparatus 123 as used in Example 1 was used to produce functional water having a pH value of 2.1, an oxidation-reduction potential of 1,100 mV and a residual chlorine concentration of 50 mg/l at the anode side thereof, which functional water was then continuously supplied to decomposition column 151-1 at a flow rate of 100 ml/min by means of a pump 145. A decomposition column 151 comprised of 5 columns connected in series to provide a prolonged average retention time for TCE gas. Each column had a capacity of about 1,200 ml. Black light fluorescent lamps (FL10BLB: tradename, a product of Toshiba, 10 W) were used as light irradiation means 166-1 through 166-5 to irradiate the respective decomposition columns. The inside of each column was irradiated with light at an intensity of 1.2 mW/cm$^2$. The decomposition column 151 was filled with a filler (Biscopal: tradename, a product of Rengo) to a density of 0.1 g/cm$^3$ in order to promote the contact between TCE gas and functional water. Air containing gaseous TCE by 2,500 ppm was supplied continuously from a gas supply unit 127 (Standard Gas Generator, Gastec PD-1B: tradename) to the bottom of the decomposition column 151-1 at a flow rate of 100 ml/min. The functional water discharged from the outlet port 118 of the column 151-5 was stored in a waste tank 119. The TCE concentration of the gas discharged from a gas discharge port 121 was determined by gas chromatography. The TCE concentration in the discharged gas was less than 0.1 ppm, thus the apparatus can continuously decompose TCE very efficiently.

EXAMPLE 23

Continuous Decomposition of Synthetic Contaminated Solution by Functional Water

In this example, an experiment of decomposing halogenated aliphatic hydrocarbon compounds or aromatic compounds was conducted by using a decomposition apparatus as shown in FIG. 5. A strongly acidic functional water generating apparatus 123 (OASYS Bio HALF: tradename, a product of Asahi Glass Engineering) was used to produce functional water having a pH value of 2.1, an oxidation-reduction potential of 1,150 mV and a residual chlorine concentration of 50 mg/l at the anode side thereof, which functional water was then continuously supplied to a decomposition container 143 at a flow rate of 45 ml/min by means of a pump 145. Synthetic contaminated solution having a composition as shown below was put into a contaminated solution tank 137, from which the solution was continuously fed to a decomposition container 143. The inside of the container 143 was irradiated with light emitted from light irradiation means 166 (Black Light Fluorescent Lamp (FL10BLB: tradename, a product of Toshiba, 10 W)) at an intensity of 1.2 mW/cm$^2$.

Composition of Contaminated Synthetic Solution

TCE . . . 600 mg

PCE . . . 600 mg chloroform . . . 30 mg water . . . 1 liter

The decomposition container 143 had a capacity of about 6,000 ml and the average residence time of TCE was 2 hours. An agitator 149 was arranged within the container 143 in order to promote the contact between the synthetic contaminated solution and functional water. The functional water discharged from the outlet port 118 of the container 143 was stored in a waste tank 119 and the concentrations of TCE, PCE and chloroform contained in the waste solution were determined by gas chromatography. As a result, they were less than 0.1 ppm. Thus, it was shown that the apparatus using functional water can continuously decompose chlorinated aliphatic hydrocarbon compounds very efficiently.

[Neutral Water]

EXAMPLE 24

Decomposition of Trichloroethylene by Functional Water and Light Irradiation

To begin with, a variety of functional water was prepared by means of a strongly acidic functional water generating apparatus (Strong Electrolytic Water Generator (Model FW-200): tradename, a product of Amano) provided with a diaphragm between the anode and the cathode. Using this apparatus and changing the electrolyte concentration of water to be electrolyzed and the time of electrolysis, functional water was produced. With functional water obtained at the anode side, the pH value and the oxidation-reduction potential were determined by a pH meter (TCX-90i and KP900-2N: tradename, a product of Toko Chemical Laboratoris) and an electroconductivity meter (TCX-90i and KM900-2N: tradename, a product of Toko Chemical Laboratories) respectively, whereas the chlorine concentration of the functional water was observed by means of a chlorine test paper (Advantec). As a result, the pH value was between 1.0 and 4.0, the oxidation-reduction potential was between 800 mV and 1,500 mV respectively, and the chlorine concentration was between 5 mg/l and 150 mg/l, depending on the electrolyte concentration (sodium chloride, standard concentration: 1000 mg/l), electrolytic current and time of electrolysis. On the other hand, the alkaline functional water obtained at the cathode side showed a pH value between 10 and 13, an oxidation-reduction potential between −1,000 and 800 mV and a chlorine concentration of 5 mg/l.

In this example, two types of functional water were prepared for decomposition of halogenated aliphatic hydrocarbon compounds or aromatic compounds; one with a pH value of 5, an oxidation-reduction potential of 400 mV and a residual chlorine concentration of 20 mg/l (hereinafter referred to as functional water 1) and the other with a pH value of 10, an oxidation-reduction potential of 620 mV and a residual chlorine concentration of 20 mg/l (hereinafter referred to as functional water 2). Functional water 1 was prepared by mixing functional water produced at the anode side and functional water produced at the cathode side to a ratio of 1:0.1. Functional water 2 was prepared by mixing acidic water and alkaline water to a ratio of 1:1.

Figure 21:
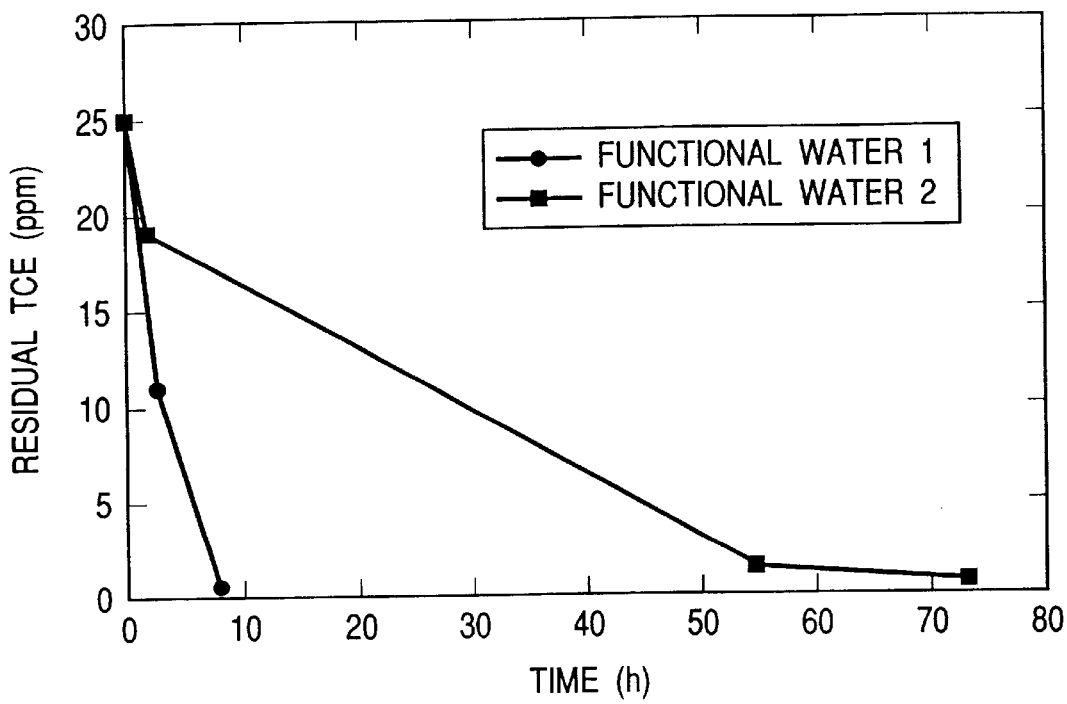
FIG. 21 is a graph showing the changes of the residual TCE concentrations with time in Example 24.

Then, a plurality of 27.5 ml vials were prepared and divided into two groups (Group 1 and Group 2) and 10 ml of functional water 1 was put into each vial of Group 1, while 10 ml of functional water 2 was put into each vial of Group 2. All the vials were then hermetically sealed with a teflon-lined butyl rubber cap and an aluminum seal. Subsequently, TCE gas was fed into each vial through the butyl rubber cap by means of a gas tight syringe to a TCE concentration of 25 ppm in the vial assuming that TCE was completely dissolved into the functional water therein. Thereafter, the vials of the two groups were irradiated with light emitted from a black light fluorescent lamp (FL10BLB: tradename, a product of Toshiba, 10 W), while being shaken at a rate of 120 rpm at 15° C. The change with time of the TCE concentration in the gas phase of each vial of the two groups was determined. The intensity of irradiation of light was 0.4 mW/cm$^2$. The TCE concentration when all TCE was completely dissolved into the functional water in the vial was calculated from the gas phase TCE concentration. FIG. 21 shows the obtained results.

Thus, it was found that the decomposition of TCE proceeds as the functional water containing the TCE is irradiated with light. It was also found that TCE can be decomposed by different types of functional water, i.e., different in terms of pH, oxidation-reduction potential and residual chlorine concentration.

EXAMPLE 25

Decomposition of Tetrachloroethylene by Functional Water and Light Irradiation

Figure 22:
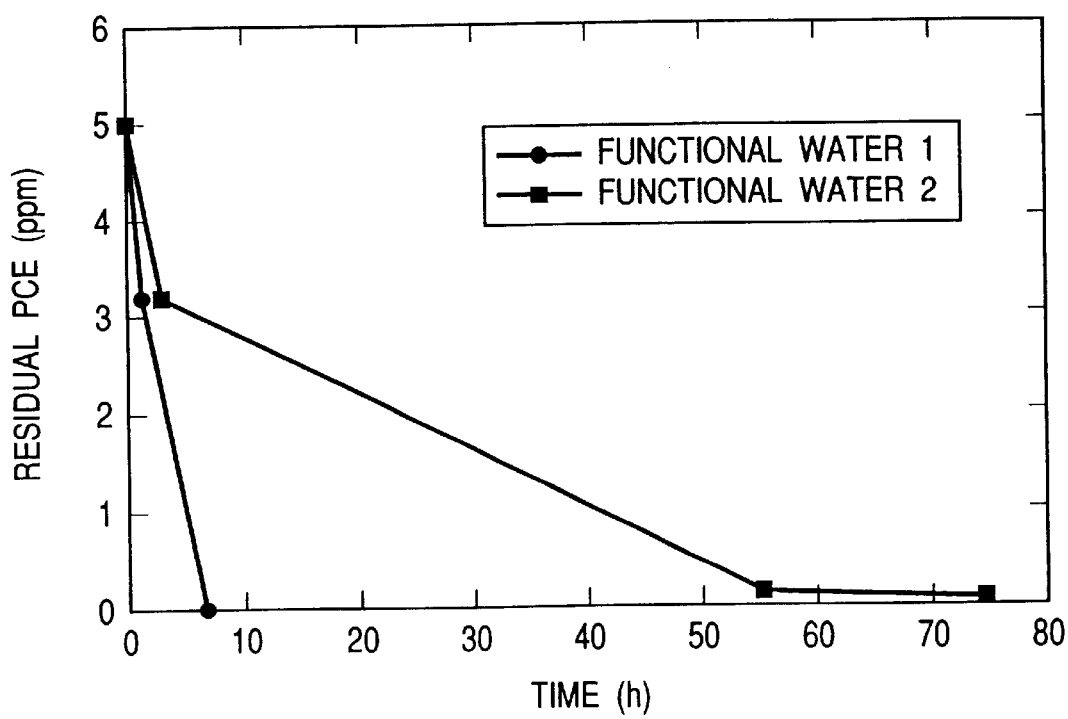
FIG. 22 is a graph showing the changes of the residual PCE concentrations with time in Example 25.

The procedure of Example 24 was followed except that TCE was replaced by tetrachloroethylene (PCE) of an initial concentration of 5 ppm, to evaluate the decomposition properties of functional water 1 and functional water 2 for decomposing PCE under light irradiation. FIG. 22 shows the remarkable reduction of the PCE concentration in the experiment. Thus, it was proved that the decomposition of PCE is promoted by irradiation with light, and that with functional water of different types (pH, oxidation-reduction potential and residual chlorine concentration) the PCE concentration was reduced with time by irradiation.

EXAMPLE 26

Decomposition of Trichloroethylene by Light Irradiation and Functional Water Obtained by Electrolysis without Diaphragm Strong Electrolytic Water Generator (Model FW-200): tradename, a product of Amano) not provided with a diaphragm between the anode and the cathode was used, changing the electrolyte concentration of water to be electrolyzed and the time of electrolysis, to produce functional water. With acidic functional water obtained at the anode side, the pH value and the oxidation-reduction potential were determined by a pH meter (TCX-90i and KP900-2N: tradename, a product of Toko Chemical Laboratories) and an electroconductivity meter (TCX-90i and KM900-2N: tradename, a product of Toko Chemical Laboratories) respectively, whereas the chlorine concentration of the functional water was observed by means of a chlorine test paper (Advantec). As a result, the pH value was between 4.0 and 10.0, the oxidation-reduction potential was between 300–800 mV respectively, and the chlorine concentration was between 2 mg/l and 70 mg/l, depending on the electrolyte concentration (sodium chloride, standard concentration: 1000 mg/l), electrolytic current and time of electrolysis. Therefore, functional water with a pH value of 7.9, an oxidation-reduction potential of 570 mV and a residual chlorine concentration of 15 mg/l was prepared as the functional water for decomposing halogenated aliphatic hydrocarbon compounds or aromatic compounds in this example. The functional water was obtained by running the Strong Electrolytic Water Generator for 11 minutes, at an electrolyte concentration of 1,000 mg/l. Then, a plurality of 27 ml vials were prepared and 10 ml of functional water was put into each vial. All the vials were then hermetically sealed with a teflon-lined butyl rubber cap and an aluminum seal. Vials containing only 10 ml of pure water were also prepared to confirm the effect of functional water. Subsequently, TCE gas was introduced into each vial through the butyl rubber cap by means of a gas tight syringe to a TCE concentration of 5 ppm in the vial assuming TCE was completely dissolved into the functional water therein. After slowly agitating the content for 3 to 4 times, all the vials were left under direct sun light for two hours. The intensity of irradiation of light was between 0.4 and 1.2 mW/cm$^2$. The TCE concentration in the gas phase of each vial was determined by sampling the gas phase in the vial by means of a gas tight syringe and subjecting it to gas chromatography (GC-14B: tradename, a product of Shimadzu Seisakusho (with an FID detector); DB-624 column: tradename, a product of J&W Inc.). The TCE concentration when all TCE was assumed completely dissolved into the functional water in the vial was calculated from the gas phase TCE concentration. As a result, the TCE concentration of each vial containing functional water obtained by electrolysis without a diaphragm fell below the environmental standard value in four hours, whereas no TCE decomposition was observed in the vials containing only pure water.

Thus, it was confirmed that functional water obtained in an electrolytic apparatus having no diaphragm could completely decompose TCE in combination with light irradiation, and that functional water, different in pH, oxidation-reduction potential and residual chlorine concentration, could decompose TCE in combination with light irradiation.

EXAMPLE 27

Decomposition of Tetrachloroethylene by Light Irradiation and Functional Water Obtained by Electrolysis without Diaphragm The procedure of Example 26 was followed except that TCE was replaced by tetrachloroethylene (PCE) of an initial concentration of 2.5 ppm, to evaluate the PCE-decomposition properties of functional water obtained by electrolysis without a diaphragm. As a result, the PCE concentration fell below 0.1 ppm within 5 hours, whereas no decomposition occurred in a control sample containing only water but not functional water. Thus, it was proved that functional water produced by an electrolyzing apparatus having no diaphragm can decompose PCE within a few hours under irradiation with light. Using functional water of different pH, oxidation-reduction potential and residual chlorine concentration for functional water, the PCE concentration was also found to fall with time to confirm the effect of functional water obtained through electrolysis without using a diaphragm, in combination with light irradiation.

EXAMPLE 28

Decomposition of Chloroform by Light Irradiation and Functional Water Obtained by Electrolysis without Diaphragm The procedure of Example 26 was followed except that TCE was replaced by chloroform of an initial concentration of 10 ppm, to evaluate the chloroform-decomposing properties of functional water obtained by electrolysis without using a diaphragm. As a result, the chloroform concentration fell below 0.1 ppm after 24 hours, whereas no decomposition occurred in a control sample containing only water but not functional water. Thus, it was proved that chloroform is decomposed by light irradiation with functional water obtained by electrolysis without using a diaphragm. When functional water of different pH, oxidation-reduction potential and residual chlorine concentration for functional water was used, the PCE concentration also fell with time to confirm the effect of functional water obtained by electrolysis without using a diaphragm, in combination with light irradiation.

EXAMPLE 29

Decomposition of Waste PCB Solution by Light Irradiation and Functional Water Obtained by Electrolysis without Diaphragm The procedure of Example 26 was followed except that TCE was replaced by waste PCB of an initial concentration of 5 ppm, to evaluate the waste PCB-decomposing properties of functional water obtained by electrolysis without using a diaphragm, in combination of light irradiation. As a result, the waste PCB concentration fell below 0.5 ppm after 3.5 hours, whereas no decomposition occurred in a control containing water instead of functional water. Thus, it was proved that waste PCB solution is decomposed within several hours by functional water and light irradiation. When functional water different in pH, oxidation-reduction potential and residual chlorine concentration for functional water was evaluated for its PCB decomposing properties, the waste PCB solution concentration also fell with time, to confirm the effect of functional water obtained through electrolysis without using a diaphragm and light irradiation on PCB decomposition.

EXAMPLE 30
Effect of Light Wavelength on TCE Decomposition by Functional Electrolytic Water Functional water was prepared by using a Strong Electrolytic Water Generator (Model FW-200: tradename, a product of Amano) from which a diaphragm separating the electrodes was removed. In this example, functional water having a pH value of 7.9, an oxidation-reduction potential of 750 mV and a residual chlorine concentration of 15 mg/l was prepared by electrolyzing an electrolyte solution of 1,000 mg/l for 11 minutes by using the generator.

Then, a plurality of 27 ml glass vials were prepared and 10 ml of functional water was put in each vial, which was then hermetically sealed with a teflon-lined butyl rubber cap and an aluminum seal. Then, TCE gas was introduced into each vial through the butyl rubber cap by means of a gas tight syringe to a concentration of 10 ppm assuming that TCE was completely dissolved into the water therein. After slowly agitating the content three to four times, vials were covered with optical filters of which filtering characteristics were in 280 nm, 370 nm, 440 nm and 540 nm (UTF-50S-28U, SCF-50-37L, SCF-50-44L, SCF-50-54: products of Siguma Koki Kabushiki Kaisha) and left under direct sun light. The glass of these vials would not transmit the light of a wavelength shorter than 300 nm. After two hours, the TCE concentration of the gas phase in each vial was measured. More specifically, the gas phase in each vial was sampled by means of a gas tight syringe and subjected to gas chromatography (GC-14B with an FID detector: products of Shimadzu Seisakusho; column was DB-624 a product of J&W Inc.). The decomposed amount of TCE and the decomposition ratio was determined for each wavelength range. Table 2 shows the obtained results.

TABLE 2

| wavelength range | decomposition ratio |
| --- | --- |
| 280 nm–370 nm | 20.5% |
| 370 nm–440 nm | 92.2% |
| 440 nm–540 nm | 30.7% |
| 540 nm– | 6.7% |

As clearly seen from the above table, irradiation of light with a wavelength range between 300 nm and 550 nm, more particularly, between 350 nm and 450 nm, is effective for decomposing TCE.

[Decomposition of Halogenated Aliphatic Hydrocarbon Compounds by Synthetic Functional Water and Irradiation of Light]

Figure 23:
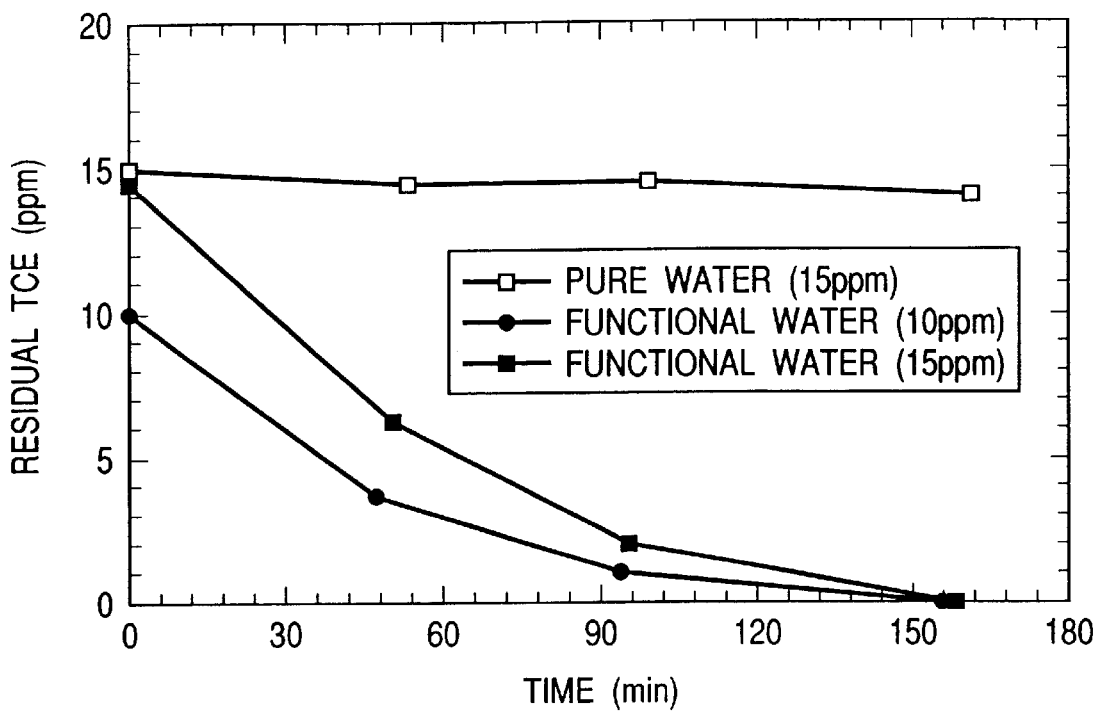
FIG. 23 is a graph showing the changes of the residual TCE concentrations with time in Example 31.

EXAMPLE 31
Decomposition of Trichloroethylene by Light Irradiation and Functional Water Prepared by Using Hydrochloric Acid, Sodium Chloride and Sodium Hypochlorite Aqueous solutions were prepared by dissolving hydrochloric acid to 0.001–0.1 N, sodium chloride to 0.005–0.02 N, and sodium hypochlorite to 0.0001–0.01 M into pure water. The pH, oxidation-reduction potential and residual chlorine concentration varied within 1.0–4.0, 800–1,500 mV and 5–150 mg/l, respectively. Thus, the aqueous solutions were substantially the same as the functional water used in Example 1. When a solution containing 0.006 N HCl, 0.014 N NaCl, 0.002 M hypochlorite was prepared, pH was 2.3, the oxidation-reduction potential was 1,180 mV and the residual chlorine concentration was 105 mg/l. This solution was used as synthetic functional water in the experiment of this example. For the experiment, the procedure of Example 1 was followed except that the initial TCE concentrations were 10 ppm and 15 ppm. FIG. 23 shows the results.

This shows that TCE can be completely decomposed by light irradiation in synthetic functional water prepared by dissolving hydrochloric acid, sodium chloride and sodium hypochlorite in water. When various synthetic functional water different in pH, oxidation-reduction potential and residual chlorine concentration was used for decomposing TCE, TCE was also decomposed under light irradiation. On the contrary, TCE was not decomposed in a control experiment using pure water, to confirm that decomposition of TCE is due to the functional water and light irradiation.

Figure 24:
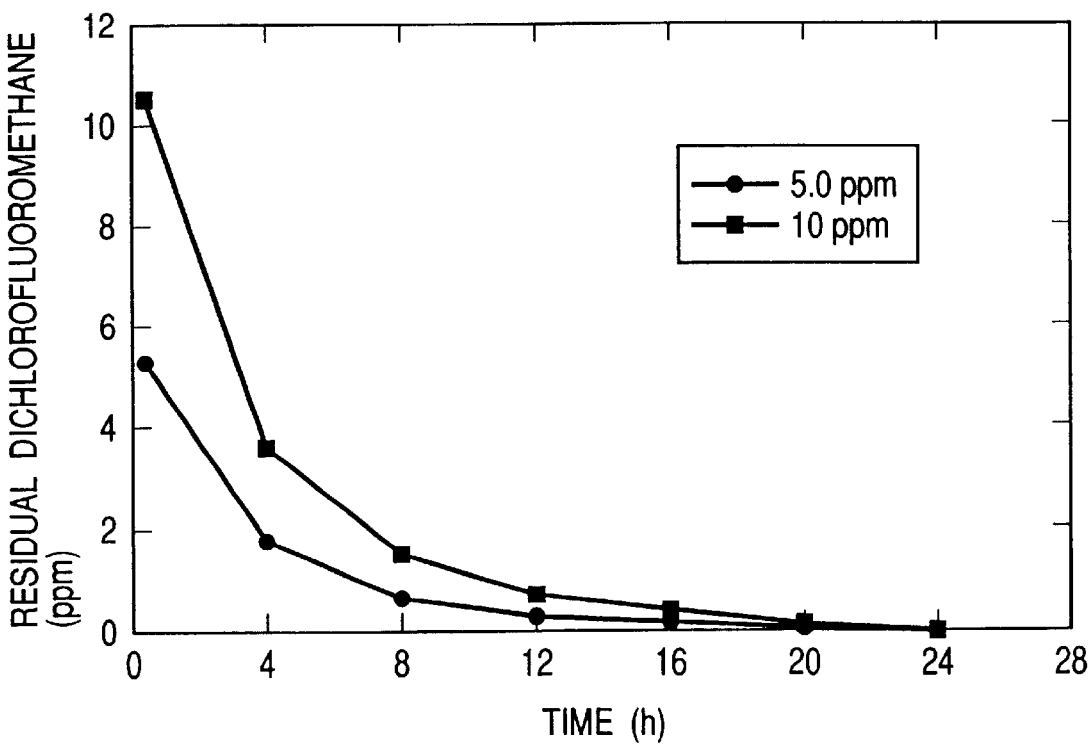
FIG. 24 is a graph showing the changes of the residual dichlorofluoromethane concentrations with time in Example 32.

EXAMPLE 32
Decomposition of Dichlorofluoromethane by Light Irradiation in Functional Water Prepared by Using Hydrochloric Acid, Sodium Chloride and Sodium Hypochlorite In this example, the procedure of Example 31 was followed except that trichloroethylene was replaced by dichlorofluoromethane of an initial dichlorofluoromethane concentrations of 5.0 ppm or 10 ppm, to evaluate the decomposition properties of synthetic functional water. FIG. 24 shows the results. It shows that dichlorofluoromethane can be completely decomposed by light irradiation in synthetic functional water prepared by dissolving hydrochloric acid, sodium chloride and sodium hypochlorite. When various synthetic functional water different in pH, oxidation-reduction potential and residual chlorine concentration was used for decomposing dichlorofluoromethane, the latter was also decomposed under light irradiation. On the contrary, dichlorofluoromethane was not decomposed in a control experiment using pure water, to confirm that decomposition of dichlorofluoromethane is due to the functional water and light irradiation.

Figure 25:
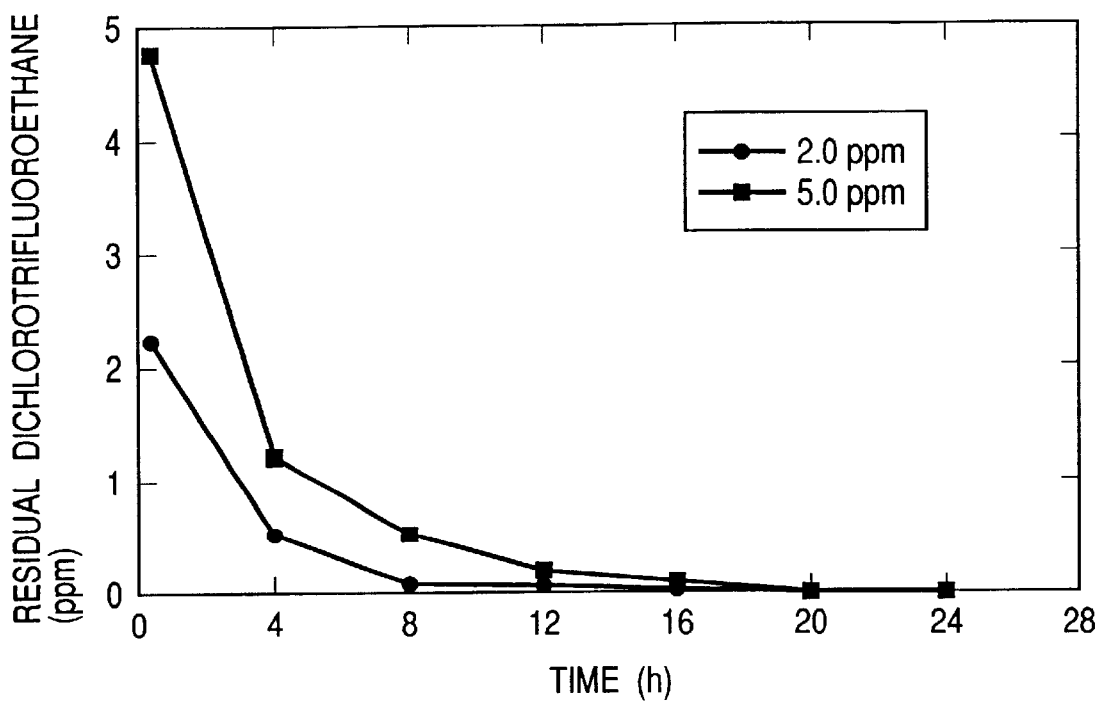
FIG. 25 is a graph showing the changes of the residual dichlorotrifluoromethane concentrations with time in Example 33.

EXAMPLE 33
Decomposition of 2,2-dichloro-1,1,1-trifluoroethane by Light Irradiation in Synthetic Functional Water Prepared by Using Hydrochloric Acid, Sodium Chloride and Sodium Hypochlorite In this example, the procedure of Example 31 was followed except that TCE was replaced by 2,2-dichloro-1,1,1-trifluoroethane of an initial concentration of 2.0 ppm or 5.0 ppm, to evaluate the decomposing properties of synthetic functional water in combination with light irradiation. FIG. 25 shows the result. It is shown that 2,2-dichloro-1,1,1-trifluoroethane is decomposed within scores of hours by light irradiation and synthetic functional water. On the contrary, it was not decomposed in a control experiment using pure water, to confirm that decomposition of 2,2-dichloro-1,1,1-trifluoroethane is due to the functional water and light irradiation. Further, when various synthetic functional water different in pH, oxidation-reduction potential and residual chlorine concentration was used for decomposing 2,2-dichloro-1,1,1-trifluoroethane, the latter was also decomposed under light irradiation.

EXAMPLE 34
Decomposition of Biphenyl by Light Irradiation in Synthetic Functional Water Prepared by Using Hydrochloric Acid, Sodium Chloride and Sodium Hypochlorite In this example, the procedure of Example 31 was followed except that TCE was replaced by biphenyl of an initial concentration of 15 ppm, to evaluate the decomposing effect of synthetic functional water. Biphenyl was not decomposed in a control experiment using pure water. On the other hand, when biphenyl in synthetic functional water prepared with hydrochloric acid, sodium chloride and sodium hypochlorite was irradiated with light emitted from black fluorescent lamp (FL10BLB: tradename, a product of Toshiba, 10 W), the absorption peak attributable to biphenyl in the vials disappeared. This result shows that light irradiation in synthetic functional water prepared by dissolving HCl, NaCl, and hypochlorite can decompose biphenyl. It was confirmed that biphenyl was also decomposed with various synthetic functional water different in pH, oxidation-reduction potential and residual chlorine concentration.

EXAMPLE 35
Decomposition of PCBs by Light Irradiation in Synthetic Functional Water Prepared by Using Hydrochloric Acid, Sodium Chloride and Sodium Hypochlorite In this example, the procedure of Example 34 was followed except that biphenyl was replaced by PCBs of an initial concentration of 15 ppm, to evaluate the decomposing effect of synthetic functional water. PCBs were not decomposed in a control experiment using pure water. On the other hand, when PCBs in synthetic functional water prepared with hydrochloric acid, sodium chloride and sodium hypochlorite in vials were irradiated with light emitted from black fluorescent lamp (FL10BLB: tradename, a product of Toshiba, 10 W), the absorption peak attributable to PCBs disappeared. This result shows that PCBs can be decomposed by light irradiation in synthetic functional water. Further, when various synthetic functional water different in pH, oxidation-reduction potential and residual chlorine concentration was used for decomposing PCBs, the reduction of PCB concentration with time was observed, to confirm PCB decomposition by light irradiation and functional water.

Figure 26:
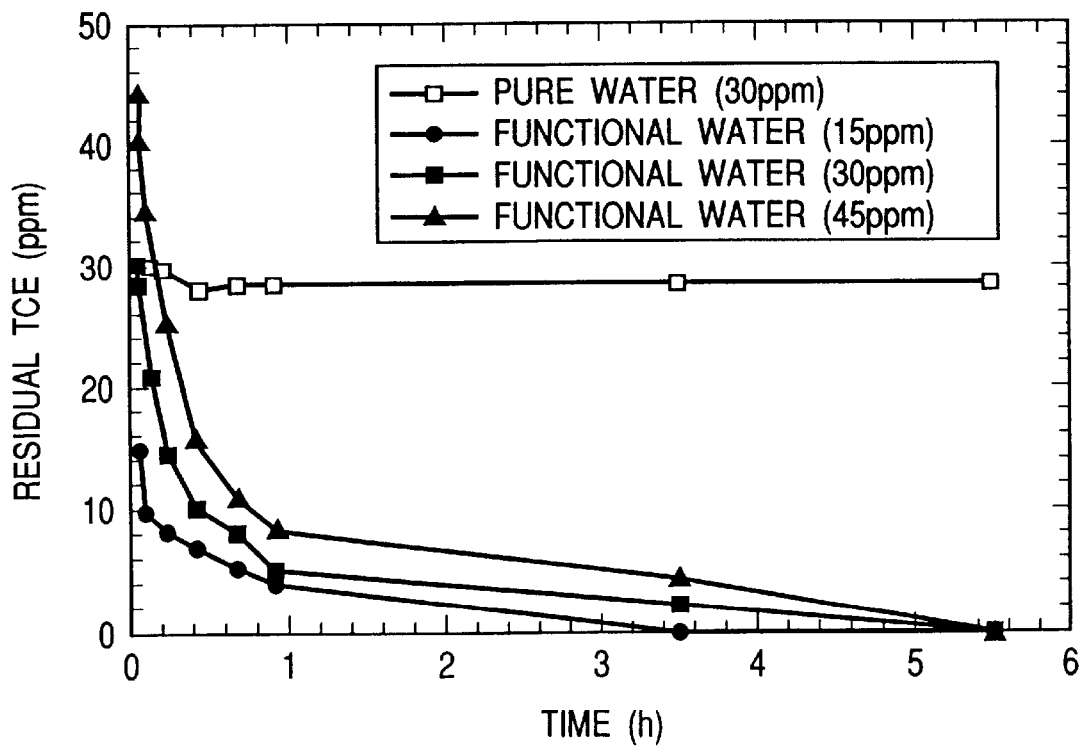
FIG. 26 is a graph showing the changes of the residual TCE concentrations with time in Example 36.

EXAMPLE 36
Decomposition of Trichloroethylene by Light Irradiation in Functional Water Prepared by Using Sulfuric and Sodium Hypochlorite An aqueous solution was prepared by dissolving sulfuric acid to. 0.006 N, and sodium hypochlorite to 0.002 M into pure water. The pH, oxidation-reduction potential and residual chlorine concentration were 2.0, 1,200 mV and 120 mg/l, respectively. Thus, the aqueous solution was substantially the same as the functional water used in Example 1. This solution was used as synthetic functional water in the experiment of this example. For the experiment, the procedure of Example 1 was followed except that the initial TCE concentrations were 10 ppm, 30 ppm and 45 ppm. FIG. 26 shows the results.

This shows that TCE can be completely decomposed by light irradiation in synthetic functional water prepared by dissolving sulfuric acid and sodium hypochlorite in water. When various synthetic functional water, different in pH, oxidation-reduction potential and residual chlorine concentration, was used for decomposing TCE, TCE was also decomposed under light irradiation. On the contrary, TCE was not decomposed in a control experiment using pure water, to confirm that decomposition of TCE is due to the functional water prepared with sulfuric acid and sodium hypochlorite, and light irradiation.

Figure 27:
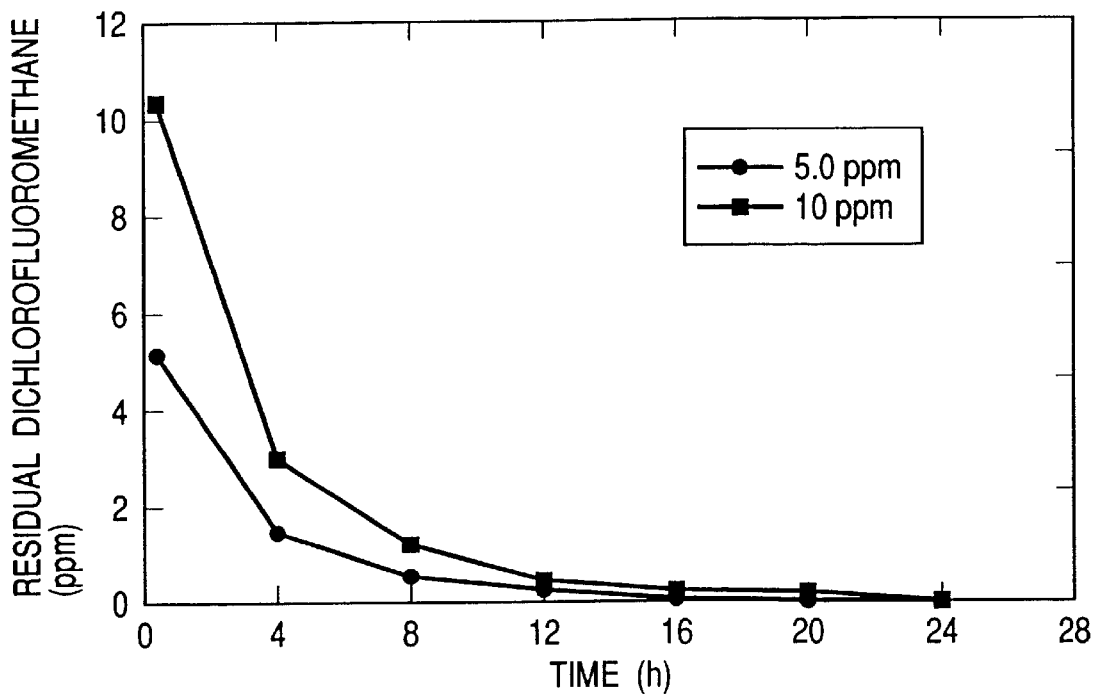
FIG. 27 is a graph showing the changes of the residual dichlorofluoromethane concentrations with time in Example 37.

EXAMPLE 37
Decomposition of Dichlorofluoromethane by Light Irradiation in Functional Water Prepared by Using Sulfuric Acid and Sodium Hypochlorite In this example, the procedure of Example 36 was followed except that trichloroethylene was replaced by dichlorofluoromethane of an initial concentrations of 5.0 ppm or 10 ppm, to evaluate the decomposing effect of synthetic functional water and light irradiation. FIG. 27 shows the result.

This shows that dichlorofluoromethane can be completely decomposed by light irradiation in synthetic functional water prepared by dissolving sulfuric acid and sodium hypochlorite in water. When various synthetic functional water different in pH, oxidation-reduction potential and residual chlorine concentration was used for decomposing dichlorofluoromethane, it was also decomposed under light irradiation. On the contrary, dichlorofluoromethane was not decomposed in a control experiment using pure water, to confirm that decomposition of dichlorofluoromethane is due to the functional water prepared with sulfuric acid and sodium hypochlorite, and light irradiation.

EXAMPLE 38
Decomposition of Biphenyl by Light Irradiation in Functional Water Prepared by Using Sulfuric Acid and Sodium Hypochlorite In this example, the procedure of Example 36 was followed except that TCE was replaced by biphenyl of an initial concentration of 10 ppm, to confirm the decomposing effect of synthetic functional water and light irradiation. As a result, the absorption peak attributable to biphenyl disappeared to prove that biphenyl is decomposed by functional water prepared from sulfuric acid and sodium hypochlorite when irradiated with light. When functional water having various pH, oxidation-reduction potential and residual chlorine concentration was used, biphenyl is decomposed by means of any such functional water and irradiation. On the other hand, biphenyl was not decomposed in a control experiment using pure water, to prove that the decomposition is due to synthetic functional water and irradiation.

EXAMPLE 39
Purification of Exhaust Gas Containing Halogenated Aliphatic Hydrocarbon Compounds or Aromatic Compounds by Functional Electrolytic Water and Light Irradiation An simulation experiment for purifying exhaust gas was conducted by using an apparatus for decomposing gaseous halogenated aliphatic hydrocarbon compounds or aromatic compounds by using functional water as shown in FIG. 7. Functional water prepared at the side of the anode 105 of a functional water generator 123 (OASYS Bio HALF: tradename, a product of Asahi Glass Engineering) was stored in a storage tank 153, from which functional water was sent by means of pump 155 at a flow rate of 100 ml/min to flow down in a reaction column 151. The reaction column 151 was 100 cm long and 10 cm in diameter, and filled with a filler (Biscopal: a product of Rengo, particle diameter: 2 mm) at a density of 0.1 g/cm$^3$. As a model exhaust gas, air containing soot particles, ethylene chloride, benzene, phenol, trichloroethylene and tetrachloroethylene to respective concentrations as listed in Table 3 (hereinafter referred to as "exhaust gas") was prepared in a tank 127 of FIG. 7. The reaction column 151 is provided at the top thereof with an inlet port for functional water and an inlet port for exhaust gas and at the bottom thereof with a gas discharge port and a water discharge port. The model exhaust gas was supplied to the reaction column 151 at a rate of 15 ml/min, while functional water was introduced at a rate of 100 ml/min. The functional water was obtained by electrolysis of water and of which pH value was 2.1, an oxidation-reduction potential was 1,000 mV with a working electrode of platinum and a reference electrode of silver-silver chloride, and a chlorine concentration was 45 mg/l. The functional water and the exhaust gas were brought into contact on the surface of the filler under irradiation with light emitted from a black fluorescent lamp (FL10BLB: tradename, a product of Toshiba, 10 W). The functional water flowed down to the bottom of the reaction column 151 was discharged from the water discharge port 118 as waste water. The hexane extract of the waste water was subjected to gas chromatography with an ECD detector to determine the concentrations of the various halogenated aliphatic hydrocarbon compounds or aromatic compounds contained in the waste water. As a result, concentrations of ethylene chloride, benzene, phenol, trichloroethylene and tetrachloroethylene were less than 0.03 ppm. The exhaust gas passed through the reaction column was discharged from the exhaust gas discharge port 121 at the bottom of the reaction column. The concentrations of the components of the exhaust gas after treatment are shown in Table 3 below.

TABLE 3

|  | Before treatment | After treatment |
| --- | --- | --- |
| Soot particles (g/Nm$^3$) | 15–25 | 0.1 or less |
| Ethylene chloride (ppm) | 0.3 | 0.006 or less |
| Benzene (ppm) | 0.8 | 0.007 or less |
| Phenol (ppm) | 0.5 | 0.006 or less |
| Trichloroethylene (ppm) | 12 | 0.05 or less |
| Tetrachloroethylene (ppm) | 4 | 0.05 or less |

Thus, the arrangement of this example is remarkably effective for purifying exhaust gas. Although functional water obtained by electrolysis was used in this example, it was also proved that a similar effect could be achieved by using functional water prepared by dissolving one or more appropriate agents into water.

EXAMPLE 40
Decomposition by Light and Functional Water Prepared by Using a Powdery Weakly Acidic Water Generating Agent A commercially available weakly acidic water-generating powder called Xinosan 21X (tradename, a product of Clean Chemical Kabushiki Kaisha) was used. Xinosan 21X is marketed as a sterilizer and contains $N_3C_3O_3NaCl_2$ as a principal ingredient. Xinosan 21X was dissolved into tap water at 175 ml/l to prepare functional water. The obtained functional water had a pH value of 4.9, an oxidation-reduction potential of 780 mV and a chlorine concentration of 65 mg/l.

Then, 10 ml of functional water was put into a 27.5 ml vial, which was then hermetically sealed with a teflon-lined butyl rubber cap and an aluminum seal. Then, TCE gas was fed into the vial through the butyl rubber cap by means of a gas tight syringe to a TCE concentration of 3 ppm assuming that all TCE in the vial would dissolve into the water therein. After slowly agitating the content three to four times, the vial was left under direct sunlight for two hours from noon. Then, the gas phase in the vial was sampled by means of a gas tight syringe and the obtained sample was subjected to gas chromatography (CG-14B(FID): tradename, a product of Shimadzu Seisakusho; DB-624 column: tradename, a product of J&W Inc.). As a result, the TCE concentration became below the environmental standard level.

Thus, it was shown that functional water prepared by using a weakly acidic water generating agent can completely decompose TCE in combination with light irradiation. When functional water of various pH, oxidation-reduction potential and residual chlorine concentration was prepared by changing the amount of Xinosan 21X and used for decomposing TCE, TCE was also decomposed. On the other hand, TCE was not decomposed in a control experiment using pure water. Thus, it was confirmed that decomposition is due to the functional water prepared by using a weakly acidic water generating powdery agent and light irradiation.

EXAMPLE 41
Decomposition by Light and Oxidizing Agent (Sodium Hypochlorite)

Functional water was prepared by dissolving sodium hypochlorite into tap water to a concentration of 2 mM. Of the obtained functional water, pH was 9.1, the oxidation-reduction potential was 543 mV and the chlorine concentration was 165 mg/l. This functional water is referred to as functional water a. Separately, sodium hypochlorite was dissolved into tap water to 0.13 mM, and then hydrochloric acid to 0.002 N, to obtain another functional water of pH 2.6, and chlorine concentration of 9 mg/l. This functional water is referred to as functional water b.

Then, 27.5 ml vials were prepared, and one group of vials were fed with 10 ml of functional water a and the other group with 10 ml of functional water b. Then the vials were hermetically sealed with a teflon-lined butyl rubber cap and an aluminum seal. Then, TCE gas was fed into each of the vials through the butyl rubber cap by means of a gas tight syringe to a TCE concentration of 10 ppm assuming that all TCE in the vial would dissolve into the water therein. After slowly agitating the content three to four times, the vials were left under direct sun light for two hours from noon. Then, the gas phase in each vial was sampled by means of a gas tight syringe and the obtained sample was subjected to gas chromatography (CG-14B with FID detector: tradename, a product of Shimadzu Seisakusho; DB-624 column: tradename, a product of J&W Inc.). As a result, the TCE concentration fell below 0.1 ppm in both groups.

EXAMPLE 42
Decomposition by Various Types of Functional Water

Functional water was prepared by dissolving sodium hypochlorite into tap water to a content level of 2 mM. The obtained functional water showed a pH value of 9.1, an oxidation-reduction potential of 543 mV and a chlorine concentration of 165 mg/l. The obtained functional water was diluted to a chlorine concentration of 10 mg/l. This sample is referred to as sample a, of which pH was 7.1. Then, functional water 2 of Example 1 was diluted to a chlorine concentration of 10 mg/l. This sample is referred to as sample b, of which pH was 2.9. Functional water prepared by using hydrochloric acid, sodium chloride and sodium hypochlorite in Example 6 was also diluted to a chlorine concentration of 10 mg/l. This sample is referred to as sample c, of which pH was 3.1. Then, vials with a capacity of 27.5 ml were prepared, and to each of which 10 ml of one of samples a, b and c was put. Then each vial was hermetically sealed with a teflon-lined butyl rubber cap and an aluminum seal. Then, TCE gas was fed into each of the vials through the butyl rubber cap by means of a gas tight syringe to a TCE concentration of 10 ppm assuming that all TCE in the vial would dissolve into the water therein. After slowly agitating the content three to four times, the vials were irradiated with light emitted from a black fluorescent lamp (FL10BLB: tradename, a product of Toshiba) for two hours. Then, the gas phase in each of the vials was sampled by means of a gas tight syringe and the obtained sample was subjected to gas chromatography (CG-14B with FID detector: tradename, a product of Shimadzu Seisakusho; DB-624 column: tradename, a product of J&W Inc.). As a result, the TCE concentration with sample a was 4.6 ppm, with sample b less than 0.05 ppm, and with sample c 3.3 ppm.

[Decomposition of Dichloromethane by Light and Functional Electrolytic Water]

Figure 28:
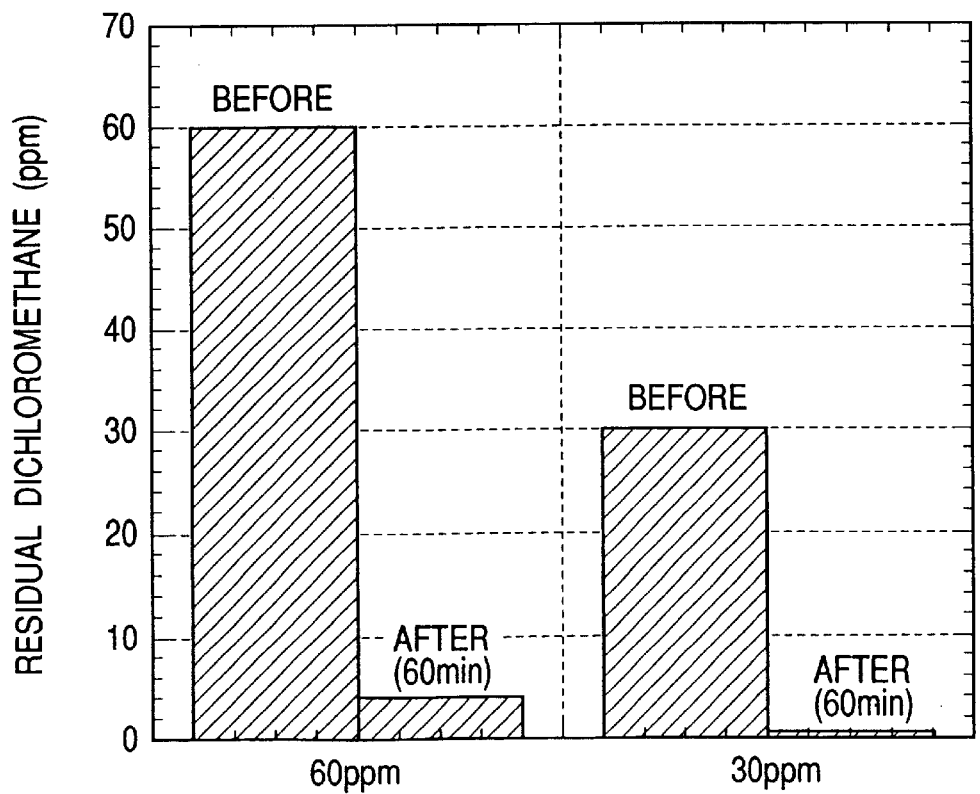
FIG. 28 is a graph showing the residual dichloromethane concentrations in Example 43.

EXAMPLE 43
Decomposition of Dichloromethane by Light Irradiation and Functional Electrolytic Water The procedure of Example 1 was followed except that the compound to be decomposed was dichloromethane and the intensity of irradiated light was between 0.8 mW/cm$^2$ and 1.2 mW/cm$^2$, to carry out an experiment on dichloromethane decomposition. FIG. 28 shows the results.

Next, an experiment was carried out in the same manner as above, except that the initial concentration was 60 ppm to evaluate dichloromethane decomposition properties of irradiation and functional water. FIG. 28 also shows the result. Further, functional water of various pH, oxidation-reduction potential and residual chlorine concentration was tested for dichloromethane decomposition. Decomposition was observed with every functional water, to confirm the dichloromethane decomposition by irradiation and functional water.

EXAMPLE 44
Decomposition of Dichloromethane by Functional Electrolytic Water and Light Irradiation Functional water was prepared as in Example 43. In this Example, function water having a pH value of 2.3, an oxidation-reduction potential of 1,050 mV and a residual chlorine concentration of 50 mg/l was prepared by electrolyzing water containing 1,000 mg/l of an electrolyte (sodium chloride) for 8 minutes.

Then, 50 ml of above functional water and then 100 ml of dichloromethane-containing water (5 ppm) were put into a 200 ml vial, which was hermetically sealed with a teflon-lined butyl rubber cap and an aluminum seal. After slowly agitating the content three to four times, the vial was left under direct sun light from noon for two hours. The intensity of irradiation was between 0.4 and 1.2 mW/cm$^2$ when determined by a UV intensity integrating meter (SUV300T, a product of TORAY). Then, the gas phase in the vial was sampled by means of a gas-tight syringe and subjected to gas chromatography (GC-14B with an FID detector: a product of Shimadzu Seisakusho; DB-624 column: tradename, a product of J&W Inc.). As a result, the dichloromethane concentration of the contaminated water was lower than the environmental standard level.

EXAMPLE 45
Decomposition of Dichloromethane by Functional Electrolytic Water and Light Irradiation By using a strongly acidic electrolytic water generator (OASYS Bio HALF: tradename, a product of Asahi Glass Engineering), functional water (pH 2.2, oxidation-reduction potential 1,100 mV, and residual chlorine concentration 50 mg/l) was prepared by electrolyzing water containing 1,000 mg/l of an electrolyte (sodium chloride). Then, a plurality of 27 ml vials were prepared, into each of which 10 ml of the functional water of 2- or 5-fold dilution was put. A vial containing pure water instead of functional water was also prepared as a control. The each vial was hermetically sealed with a teflon-lined butyl rubber cap and an aluminum seal. Then, dichloromethane gas was introduced into each vial through the butyl rubber cap by means of a gas tight syringe to a concentration of 10 ppm assuming that all dichloromethane in the vial was completely dissolved into the water therein. After slowly agitating the content three to four times, all the vials were left under direct sun light from noon for four hours. The intensity of irradiation of light was between 0.4 and 1.2 mW/cm$^2$. Then, the gas phase in each vial was sampled by means of a gas tight syringe and subjected to gas chromatography (GC-14B with an FID detector: product of Shimadzu Seisakusho; DB-624 column is a product of J&W Inc.). As a result, the dichloromethane concentration in the functional water of 2- and 5-fold dilution was undetectable after 4 hours. No dichloromethane decomposition was observed in the sample containing pure water instead of functional water.

EXAMPLE 46
Effect of the Wavelength of Light on Decomposition of Dichloromethane by Functional Electrolytic Water An experiment on the wavelength-dependency of dichloromethane decomposition by functional water and irradiation was carried out in the same manner as in Example 4, except that the compound to be decomposed was dichloromethane. Table 4 shows the result.

TABLE 4

| wavelength range | decomposition ratio |
|---|---|
| 280 nm–370 nm | 38.5% |
| 370 nm–440 nm | 91.4% |
| 440 nm–540 nm | 37.3% |
| 540 nm– | 4.3% |

As clearly seen from the above table, irradiation in a wavelength range between 300 nm and 550 nm, more particularly between 350 nm and 450 nm, is effective for decomposing dichloromethane.

EXAMPLE 47
Apparatus for Decomposing Gaseous Dichloromethane

The procedure of Example 20 was followed except that the compound to be decomposed was dichloromethane of an initial gas concentration of 1,000 ppm and a flow rate was 10 ml/min. As a result, the dichloromethane concentration in the waste solution was less than 0.1 ppm, and the dichloromethane concentration in the gas discharged from the discharge port 135 was less than 1 ppm, to prove that the apparatus according to the invention can decompose dichloromethane to a great extent.

EXAMPLE 48
Apparatus for Decomposing Dichloromethane-contaminated Solution

In this example, an apparatus as shown in FIG. 3 was assembled incorporating a strongly acidic functional water-generating apparatus 123 (Strong Electrolytic Water Generator Model FW200: a product of Amano). A set of a pipe 139 and a pump 141 was arranged in such a way that a synthetic contaminated solution was supplied from a tank 137 to the anode side 105 of the water tank 101 of the apparatus 123. An aqueous electrolyte solution was supplied to the water tank 101 from a storage tank 129 by way of a set of a feed pump 131 and a pipe 133. A synthetic contaminated solution of a composition shown below was put into the tank 137.

Composition of Contaminated Synthetic Solution
dichloromethane 1,200 mg
water 1 liter After filling the water tank 101 with the synthetic contaminated solution and the aqueous electrolyte solution, the apparatus 123 was operated under conditions to produce functional water having a pH value of 2.1, an oxidation-reduction potential of 1,100 mV and a residual chlorine concentration of 50 mg/l, by electrolyzing for 11 minutes an electrolyte solution of 1000 mg/l, while the inside of the water tank 101 was irradiated with light emitted from a light irradiation means 166 (black light fluorescent lamp FL10BLB: a product of Toshiba, 10 W). After one hour operation, the waste solution discharged from the discharge port 118 of the water tank 101 was stored in a waste tank 119 and the concentration of dichloromethane in the waste solution was measured. As a result, it was less than 0.1 ppm. Thus, dichloromethane can be decomposed very effectively by using the apparatus.

EXAMPLE 49
Continuous Decomposition of Dichloromethane by Functional Water

The procedure of Example 22 was followed except that the compound to be decomposed was dichloromethane and the initial gas phase dichloromethane concentration was 1,500 ppm, a flow rate was 75 ml/min, and the irradiation intensity was 0.8 to 1.2 mw/cm$^2$. As a result, the dichloromethane concentration in the exhaust gas was less than 0.1 ppm to prove the effectiveness of the above apparatus in continuous dichloromethane decomposition.

EXAMPLE 50
Decomposition of Dichloromethane by Neutral Functional Water and Light Irradiation The procedure of Example 24 was followed except that the compound to be decomposed was dichloromethane, the initial concentration was 10 ppm, the intensity of irradiated light was 0.4 to 1.2 mw/cm$^2$ and the irradiation period was 2 hours. As a result, dichloromethane was decomposed to a concentration of 7.3 ppm when functional water 1 was used, whereas the compound was decomposed to a concentration of 2.3 ppm when functional water 2 was used.

Thus, it was found that the decomposition of dichloromethane is promoted by irradiating neutral functional water. Further, with functional water of different pH, oxidation-reduction potential and residual chlorine concentration, dichloromethane is decomposed by light irradiation.

EXAMPLE 51
Decomposition of Dichloromethane by Light Irradiation in Functional Water Obtained by Electrolysis without Using Diaphragm The procedure of Example 26 was followed except that the compound to be decomposed was dichloromethane, the initial concentration was 5 ppm and the irradiation was carried out under direct sunlight (at an intensity between 0.4 to 0.8 mw/cm$^2$) for 2 hours.

As a result, the dichloromethane concentration of each vial containing functional water obtained by electrolysis without a diaphragm fell below the detection limit, whereas no decomposition was observed in the vials containing only pure water.

Thus, it was confirmed that functional water obtained in an electrolytic apparatus having no diaphragm could completely decompose dichloromethane in combination with light irradiation. Further, functional water, different in pH, oxidation-reduction potential and residual chlorine concentration, could decompose dichloromethane in combination with light irradiation.

EXAMPLE 52
Decomposition of Dichloromethane by Light Irradiation in Functional Water Prepared by Using Hydrochloric Acid, Sodium Chloride and Sodium Hypochlorite An experiment was carried out in the same manner as in Example 43, except that functional water (pH 2.3, oxidation-reduction potential: 1180 mV, and residual chlorine concentration: 75 mg/l) was prepared as in Example 31, the subject compound was dichloromethane of an initial concentration of 20 ppm and irradiation was carried out for 3 hours. As a result, the dichloromethane concentration fell below the detection limit.

This shows that dichloromethane can be completely decomposed by light irradiation in synthetic functional water prepared by dissolving hydrochloric acid, sodium chloride and sodium hypochlorite in water. When various synthetic functional water different in pH, oxidation-reduction potential and residual chlorine concentration was used, dichloromethane was also decomposed under light irradiation.

EXAMPLE 53
Decomposition of Dichloromethane by Light Irradiation in Functional Water Prepared by Using Sulfuric Acid and Sodium Hypochlorite In this example, functional water prepared as in Example 36 (pH 2.0, oxidation-reduction potential 1200 mV, and residual chlorine concentration 120 mg/l). The procedure of Example 52 was followed except that the initial concentration of dichloromethane was 10 ppm. As a result, the dichloromethane concentration fell below the detection limit.

Thus, functional water prepared with sulfuric acid and sodium hypochlorite can completely decompose dichloromethane when irradiated with light. Further, when various synthetic functional water, different in pH, oxidation-reduction potential and residual chlorine concentration, was used, dichloromethane was also decomposed under light irradiation. On the other hand, dichloromethane was not decomposed in a control experiment using pure water, to confirm that decomposition is due to the functional water prepared with sulfuric acid and sodium hypochlorite, and light irradiation.

EXAMPLE 54
Decomposition by Light Irradiation and Functional Water Prepared by Using a Powdery Weakly Acidic Water Generating Agent The procedure of Example 40 was followed except that the compound to be decomposed was dichloromethane and the initial dichloromethane concentration was 3 ppm in this example. As a result, the dichloromethane concentration fell below the detection limit.

Thus, functional water prepared by using a weakly acidic water generating powdery agent can completely decompose dichloromethane when irradiated with light. When functional water of various pH, oxidation-reduction potential and residual chlorine concentration prepared by changing the amount of Xinosan 21X was used, dichloromethane was also decomposed. On the other hand, dichloromethane was not decomposed in a control experiment using pure water. Thus, it was confirmed that decomposition is due to the functional water prepared by using a weakly acidic water generating powdery agent and light irradiation.

EXAMPLE 55
Decomposition by Light and Functional water Prepared Using an Oxidizing Agent (Sodium Hypochlorite)

Functional water was prepared by dissolving sodium hypochlorite into tap water to a concentration of 2 mM. Of the obtained functional water, pH was 9.1, the oxidation-reduction potential was 543 mV and the chlorine concentration was 165 mg/l. This functional water is referred to as functional water a. Separately, sodium hypochlorite was dissolved into tap water to 0.13 mM, and then hydrochloric acid to 0.002 N, to obtain another functional water of pH 2.6 and chlorine concentration of 9 mg/l. This functional water is referred to as functional water b.

Then, 27.5 ml vials were prepared, and one group of vials were fed with 10 ml of functional water a and the other group with 10 ml of functional water b. Then the vials were hermetically sealed with a teflon-lined butyl rubber cap and an aluminum seal. Then, dichloromethane gas was fed into each of the vials through the butyl rubber cap by means of a gas tight syringe to a dichloromethane concentration of 10 ppm assuming that all dichloromethane in the vial would dissolve into the water therein. After slowly agitating the content three to four times, the vials were left under direct sun light for two hours from noon. Then, the gas phase in each vial was sampled by means of a gas tight syringe and the obtained sample was subjected to gas chromatography (CG-14B with FID detector: tradename, a product of Shimadzu Seisakusho; DB-624 column: tradename, a product of J&W Inc.). As a result, the dichloromethane concentration fell below 0.1 ppm in both groups.

EXAMPLE 56
Decomposition of cis-1,2-dichloroethylene by Light Irradiation and Functional Electrolytic Water In this example, an decomposition experiment was carried out in the same manner as in Example 43, except that the compound to be decomposed was cis-1,2-dichloroethylene, the initial concentration was 1.0 ppm, and the irradiation conditions were 0.2–0.6 mW/cm$^2$ for one hour. After an hour, the average cis-1,2-dichloroethylene concentration of vials was 0.01 ppm. After 1.5 hour irradiation, the concentration fell below the detection limit. No decomposition of cis-1,2-dichloroethylene was observed in a control experiment using pure water, to confirm the decomposition is due to the functional water and light irradiation.

Next, a similar experiment was carried out except that a solution of cis-1,2-dichloroethylene at a concentration of 10 ppm was put into 27.5 ml vials to the neck without leaving space in the vials, to evaluate the cis-1,2-dichloroethylene decomposition by functional water and light irradiation. As a result, the concentration fell below 0.67 ppm after one hour irradiation. When functional water of various pH, oxidation-reduction potential and residual chlorine concentration was used, reduction of cis-1,2-dichloroethylene concentration with time was observed in any cases.

EXAMPLE 57
Decomposition of cis-1,2-dichloroethylene by Functional Electrolytic Water and Sun Light Functional water was prepared as in Example 56. In this Example, function water having a pH value of 2.3, an oxidation-reduction potential of 1,050 mV and a residual chlorine concentration of 50 mg/l was prepared by electrolyzing water containing 1,000 mg/l of an electrolyte (sodium chloride) for 8 minutes.

Then, 50 ml of above functional water was put into a 200 ml vial, and then cis-1,2-dichloroethylene was added to a concentration of 20 ppm. The vial was hermetically sealed with a teflon-lined butyl rubber cap and an aluminum seal. After slowly agitating the content three to four times, the vial was left under direct sun light from noon for two hours. The intensity of irradiation was between 0.4 and 1.2 mW/cm$^2$ when determined by a UV intensity integrating meter (SUV300T, a product of TORAY). Then, the gas phase in the vial was sampled by means of a gas-tight syringe and subjected to gas chromatography (GC-14B with an FID detector: a product of Shimadzu Seisakusho; DB-624 column: tradename, a product of J&W Inc.). As a result, the cis-1,2-dichloroethylene concentration fell to 0.03 ppm or less.

EXAMPLE 58
Decomposition of cis-1,2-dichloroethylene by Diluted Functional Electrolytic Water and Light Irradiation By using a strongly acidic electrolytic water generator (OASYS Bio HALF: tradename, a product of Asahi Glass Engineering), functional water (pH 2.2, oxidation-reduction potential 1,100 mV, and residual chlorine concentration 50 mg/l) was prepared by electrolyzing water containing 0.1% electrolyte (sodium chloride). The functional water was diluted with tap water to make 70% and 50% functional water. Then, 10 ml of diluted functional water or pure water as a control was added to a 27 ml vial. Each vial was hermetically sealed with a teflon-lined butyl rubber cap and an aluminum seal. Then, cis-1,2-dichloroethylene gas was introduced into each vial through the butyl rubber cap by means of a gas tight syringe to a concentration of 1.0 ppm assuming that all cis-1,2-dichloroethylene in the vial was completely dissolved into the water therein. After slowly agitating the content three to four times, all the vials were left under direct sun light for four hours. The intensity of irradiation of light was between 0.4 and 1.2 mW/cm$^2$. Then, the gas phase in each vial was sampled by means of a gas tight syringe and subjected to gas chromatography (GC-14B with an FID detector: product of Shimadzu Seisakusho; DB-624 column is a product of J&W Inc.) to determine cis-1,2-dichloroethylene concentration. As a result, the concentration in the 70% and 50% functional water was undetectable. No decomposition was observed in the sample containing pure water instead of functional water.

EXAMPLE 59
Effect of Light Wavelength on Decomposition of cis-1,2-dichloroethylene by Functional Electrolytic Water An experiment was carried out in the same manner as in Example 46 except that the compound to be decomposed was cis-1,2-dichloroethylene, the initial concentration was 10 ppm, and irradiation was carried out for 0.5 hours. Decomposed amount in each wavelength range was calculated from the results to obtain decomposition rate. The result is shown in Table 5.

TABLE 5

| wavelength range | decomposition ratio |
|---|---|
| 280 nm–370 nm | 45.1% |
| 370 nm–440 nm | 95.3% |
| 440 nm–540 nm | 31.1% |
| 540 nm– | 8.5% |

As clearly seen from the above table, irradiation with light in a wavelength range between 300 nm and 550 nm, more particularly between 350 nm and 450 nm, is effective for decomposing cis-1,2-dichloroethylene.

EXAMPLE 60
Apparatus for Decomposing Gaseous cis-1,2-dichloroethylene

In this example, the procedure of Example 47 was followed except that the compound to be decomposed was cis-1,2-dichloroethylene, the initial gas concentration was 1,000 ppm and a flow rate was 10 ml/min.

As a result, the cis-1,2-dichloroethylene concentration in the waste solution was less than the detection limit, and the cis-1,2-dichloroethylene concentration in the discharge gas discharged from the discharge port 135 was less than 20 ppm, to prove that an apparatus according to the invention can decompose cis-1,2-dichloroethylene to a large extent.

EXAMPLE 61

Decomposition of cis-1,2-dichloroethylene by Neutral Functional Water and Light Irradiation The procedure of Example 50 was followed except that the compound to be decomposed was replaced by cis-1,2-dichloroethylene and an initial cis-1,2-dichloroethylene concentration of 1.0 ppm was selected in this example. As a result, cis-1,2-dichloroethylene was decomposed to a concentration of 0.28 ppm when functional water 1 was used, whereas the compound was decomposed to a concentration of 0.16 ppm when functional water 2 was used.

Thus, it was found that the decomposition of cis-1,2-dichlororethylene is promoted by irradiating neutral functional water. Further, with functional water of different pH, oxidation-reduction potential and residual chlorine concentration, cis-1,2-dichloroethylene was decomposed by light irradiation.

EXAMPLE 62

Decomposition of cis-1,2-dichloroethylene by Light Irradiation and Functional Electrolytic Water Obtained by Using No Diaphragm and Irradiation of Light The procedure of Example 51 was followed except that the compound to be decomposed was cis-1,2-dichloroethylene and the initial cis-1,2-dichloroethylene concentration was 10 ppm. As a result, in functional water obtained by electrolysis without using a diaphragm, the cis-1,2-dichloroethylene concentration fell below 3.7 ppm, whereas no decomposition was observed when no functional water but water was present.

Thus, functional water prepared by electrolysis without using a diaphragm can completely decompose cis-1,2-dichloroethylene when irradiated with light. Further, with functional water of different pH, oxidation-reduction potential and residual chlorine concentration, cis-1,2-dichloroethylene was decomposed by light irradiation.

EXAMPLE 63

Decomposition of cis-1,2-dichloroethylene by Light Irradiation and Functional Water Prepared by Using Hydrochloric Acid, Sodium Chloride and Sodium Hypochlorite In this example, the procedure of Example 52 was followed except that the compound to be decomposed was cis-1,2-dichloroethylene and the initial concentration was 20 ppm and irradiation was carried out for 2 hours. As a result, the cis-1,2-dichloroethylene concentration fell to 0.05 ppm or less.

Thus, functional water prepared by using hydrochloric acid, sodium chloride and sodium hypochlorite can completely decompose cis-1,2-dichloroethylene when irradiated with light. Further, with functional water of different pH, oxidation-reduction potential and residual chlorine concentration prepared in the similar way, cis-1,2-dichloroethylene was also decomposed by light irradiation.

EXAMPLE 64

Decomposition of cis-1,2-dichloroethylene by Light Irradiation and Functional Water Prepared by Using Sulfuric Acid and Sodium Hypochlorite In this example, a solution was prepared by dissolving sulfuric acid to 0.006 N, and sodium hypochlorite to 0.002 M into pure water. The pH, oxidation-reduction potential and residual chlorine concentration were 2.0, 1,200 mV and 120 mg/l, respectively. The procedure of Example 63 was followed except that the initial concentration of cis-1,2-dichloroethylene was 5 ppm. As a result, the cis-1,2-dichloroethylene concentration fell below the detection limit.

Thus, functional water prepared with sulfuric acid and sodium hypochlorite can completely decompose cis-1,2-dichloroethylene when irradiated with light. Further, when various such synthetic functional water, different in pH, oxidation-reduction potential and residual chlorine concentration, was used, cis-1,2-dichloroethylene was also decomposed under light irradiation. On the other hand, decomposition was not observed in a control experiment using pure water, to confirm that decomposition is due to the functional water prepared with sulfuric acid and sodium hypochlorite, and light irradiation.

EXAMPLE 65

Decomposition by Light and Functional Water Prepared with a Powdery Weakly Acidic Water Generating Agent In this example, the procedure of Example 40 was followed except that the compound to be decomposed was cis-1,2-dichloroethylene at the initial concentration was 1.0 ppm, and irradiation was carried out under direct sunlight from 10 a.m. for four hours. As a result, the cis-1,2-dichloroethylene concentration fell below the detection limit.

Thus, functional water prepared by using a weakly acidic water generating agent can completely decompose cis-1,2-dichloroethylene when irradiated with light. When functional water of various pH, oxidation-reduction potential and residual chlorine concentration prepared by changing the amount of Xinosan 21X was used, cis-1,2-dichloroethylene was also decomposed. On the other hand, cis-1,2-dichloroethylene was not decomposed in a control experiment using pure water. Thus, it was confirmed that decomposition is due to the functional water prepared by using a weakly acidic water generating agent and light irradiation.

EXAMPLE 66

Decomposition of trans-1,2-dichloroethylene by Light Irradiation in Functional Electrolytic Water In this example, the procedure of Example 56 was followed except that the compound to be decomposed was trans-1,2-dichloroethylene at the initial concentration of 15 ppm. As a result, the concentration of trans-1,2-dichloroethylene fell to 0.03 ppm or less.

Thus, it was found that light irradiation in functional water can decompose trans-1,2-dichloroethylene. When functional water of various pH, oxidation-reduction potential and residual chlorine concentration was used, trans-1,2-dichloroethylene was also decomposed. On the other hand, trans-1,2-dichloroethylene was not decomposed in a control experiment using pure water. Thus, it was confirmed that decomposition is due to the functional water and light irradiation.

Additionally, it was confirmed that trans-1,2-dichloroethylene is decomposed by functional water prepared by electrolysis without using a diaphragm as in Example 62 or by functional water prepared with hydrochloric acid, sodium chloride and sodium hypochlorite as in Example 63.

EXAMPLE 67
Decomposition of 1,1-dichloroethylene by Functional Electrolytic Water and Light Irradiation In this example, the procedure of Example 65 was followed except that the compound to be decomposed was 1,1-dichloroethylene at an initial concentration of 65 ppm. As a result, the concentration of 1,1-dichloroethylene fell to 0.03 ppm or less.

Thus, it was found that 1,1-dichloroethylene can be decomposed by combination of functional water and irradiation. When functional water of various pH, oxidation-reduction potential and residual chlorine concentration was used, 1,1-dichloroethylene was also decomposed. On the other hand, 1,1-dichloroethylene was not decomposed in a control experiment using pure water. Thus, it was confirmed that decomposition is due to the functional water and light irradiation.

Additionally, it was confirmed that 1,1-dichloroethylene is decomposed by functional water prepared by electrolysis without using a diaphragm as in Example 62 and also by means of functional water prepared with hydrochloric acid, sodium chloride and sodium hypochlorite as in Example 63.

EXAMPLE 68
Decomposition of Chlorobenzene by Functional Electrolytic Water and Light Irradiation In this example, the procedure of Example 43 was followed except that the compound to be decomposed was chlorobenzene at an initial concentration of 0.6 ppm, and irradiation was carried out at an light intensity of 0.2–0.6 mW/cm$^2$ for 2 hours. As a result, the chlorobenzene concentration fell to 0.03 ppm, an average of vials. After irradiating the vials for another 1.5 hours in the similar conditions, concentration fell below the detection limit. No decomposition of chlorobenzene was observed in a control experiment using pure water. Thus, the decomposition of chlorobenzene is due to functional water and light irradiation.

Further, the same experiment was carried out except that the initial concentration of 6 ppm was used. After 2 hours, the concentration fell to 0.58 ppm. In addition, when functional water of various pH, oxidation-reduction potential and residual chlorine concentration was used, chlorobenzene was also decomposed.

EXAMPLE 69
Decomposition of Chlorobenzene by Functional Electrolytic Water and Sunlight Functional water was prepared as in Example 68. In this Example, function water having a pH value of 2.3, an oxidation-reduction potential of 1,050 mV and a residual chlorine concentration of 50 mg/l was prepared by electrolyzing water containing 1,000 mg/l of an electrolyte (sodium chloride) for 8 minutes.

Then, 50 ml of above functional water was put into a 200 ml vial, and then chlorobenzene was added to a concentration of 50 ppm. The vial was hermetically sealed with a teflon-lined butyl rubber cap and an aluminum seal. After slowly agitating the content three to four times, the vial was left under direct sun light from noon for two hours. The intensity of irradiation was between 0.4 and 0.8 mW/cm$^2$ when determined by a UV intensity integrating meter (SUV300T, a product of TORAY). Then, the gas phase in the vial was sampled by means of a gas-tight syringe and subjected to gas chromatography (GC-14B with an FID detector: a product of Shimadzu Seisakusho; DB-624 column: tradename, a product of J&W Inc.). As a result, the chlorobenzene concentration fell to 26.5 ppm.

EXAMPLE 70
Decomposition of Chlorobenzene by Diluted Functional Electrolytic Water and Light Irradiation By using a strongly acidic electrolytic water generator (OASYS Bio HALF: tradename, a product of Asahi Glass Engineering), functional water (pH 2.2, oxidation-reduction potential 1,100 mV, and residual chlorine concentration 50 mg/l) was prepared by electrolyzing water containing 0.1% electrolyte (sodium chloride). The functional water was diluted with tap water to make 70% and 50% functional water. Then, 10 ml of diluted functional water or pure water as a control was added to a 27 ml vial. Each vial was hermetically sealed with a teflon-lined butyl rubber cap and an aluminum seal. Then, chlorobenzene gas was introduced into each vial through the butyl rubber cap by means of a gas tight syringe to a concentration of 0.5 ppm assuming that all chlorobenzene in the vial was completely dissolved into the water therein. After slowly agitating the content three to four times, all the vials were left under direct sunlight for four hours. The intensity of irradiation of light was between 0.4 and 1.2 mW/cm$^2$. Then, the gas phase in each vial was sampled by means of a gas tight syringe and subjected to gas chromatography (GC-14B with an FID detector: product of Shimadzu Seisakusho; DB-624 column is a product of J&W Inc.) to determine chlorobenzene concentration. As a result, the concentration in the 70% or 50% functional water was undetectable after four hours. No decomposition was observed in the sample containing pure water instead of functional water.

EXAMPLE 71
Effect of Light Wavelength on Decomposition of Chlorobenzene by Functional Electrolytic Water An experiment was carried out in the same manner as in Example 46 except that the compound to be decomposed was chlorobenzene, and the initial concentration was 10 ppm. The result is shown in Table 6.

TABLE 6

| wavelength range | decomposition ratio |
| --- | --- |
| 280 nm–370 nm | 41.1% |
| 370 nm–440 nm | 92.4% |
| 440 nm–540 nm | 33.2% |
| 540 nm– | 7.3% |

As clearly seen from the above table, irradiation with light in a wavelength range between 300 nm and 550 nm, more particularly between 350 nm and 450 nm, is effective for decomposing chlorobenzene.

EXAMPLE 72
Apparatus for Decomposing Gaseous Chlorobenzene

In this example, the procedure of Example 47 was followed except that the compound to be decomposed was chlorobenzene and the initial concentration was 100 ppm and a flow rate was 10 ml/min.

As a result, the chlorobenzene concentration in the waste solution was less than the detection limit, and the chlorobenzene concentration in the gas discharged from the discharge port 135 was less than 5 ppm, to prove that an apparatus according to the invention can decompose chlorobenzene to a large extent.

EXAMPLE 73
Decomposition of Chlorobenzene by Neutral Functional Water and Light Irradiation The procedure of Example 50 was followed except that the compound to be decomposed was replaced by chlorobenzene and an initial chlorobenzene concentration of 1.0 ppm. As a result, chlorobenzene was decomposed to a concentration of 0.78 ppm when functional water 1 was used, whereas the compound was decomposed to a concentration of 0.21 ppm when functional water 2 was used.

Thus, it was found that the decomposition of chlorobenzene is promoted by irradiating neutral functional water. Further, with functional water of different pH, oxidation-reduction potential and residual chlorine concentration, chlorobenzene was decomposed by light irradiation.

EXAMPLE 74

Decomposition of Chlorobenzene by Light Irradiation and Functional Electrolytic Water Obtained by Using No Diaphragm and Irradiation of Light The procedure of Example 51 was followed except that the compound to be decomposed was chlorobenzene and the initial chlorobenzene concentration was 10 ppm. As a result, in functional water obtained by electrolysis without using a diaphragm, the chlorobenzene concentration fell below 1.8 ppm, whereas no decomposition was observed when no functional water but water was present.

Thus, functional water prepared by electrolysis without using a diaphragm can completely decompose chlorobenzene when irradiated with light. Further, with functional water of different pH, oxidation-reduction potential and residual chlorine concentration, chlorobenzene was decomposed by light irradiation.

EXAMPLE 75

Decomposition of Chlorobenzene by Light Irradiation and Functional Water Prepared by Using Hydrochloric Acid, Sodium Chloride and Sodium Hypochlorite In this example, the procedure of Example 52 was followed except that the compound to be decomposed was chlorobenzene and the initial concentration was 5 ppm. As a result, the chlorobenzene concentration fell to 0.5 ppm or less.

Thus, functional water prepared by using hydrochloric acid, sodium chloride and sodium hypochlorite can completely decompose chlorobenzene when irradiated with light. Further, with functional water of different pH, oxidation-reduction potential and residual chlorine concentration prepared in the similar way, chlorobenzene was also decomposed by light irradiation.

EXAMPLE 76

Decomposition of Chlorobenzene by Light Irradiation and Functional Water Prepared by Using Sulfuric Acid and Sodium Hypochlorite In this example, a solution was prepared by dissolving sulfuric acid to 0.006 N, and sodium hypochlorite to 0.002 M into pure water. The pH, oxidation-reduction potential and residual chlorine concentration were 2.0, 1,200 mV and 120 mg/l, respectively. The procedure of Example 75 was followed except that the initial concentration of chlorobenzene was 1.0 ppm. As a result, the chlorobenzene concentration fell below the detection limit.

Thus, functional water prepared with sulfuric acid and sodium hypochlorite can completely decompose chlorobenzene when irradiated with light. Further, when various such synthetic functional water, different in pH, oxidation-reduction potential and residual chlorine concentration, was used, chlorobenzene was also decomposed under light irradiation. On the other hand, decomposition was not observed in a control experiment using pure water, to confirm that decomposition is due to the functional water prepared with sulfuric acid and sodium hypochlorite, and light irradiation.

EXAMPLE 77

Decomposition of Chlorobenzene by Light and Functional Water Prepared with a Powdery Weakly Acidic Water Generating Agent In this example, the procedure of Example 65 was followed except that the compound to be decomposed was chlorobenzene at the initial concentration was 0.5 ppm. As a result, the chlorobenzene concentration fell below the detection limit.

Thus, functional water prepared by using a weakly acidic water generating agent can completely decompose chlorobenzene when irradiated with light. When functional water of various pH, oxidation-reduction potential and residual chlorine concentration prepared by changing the amount of Xinosan 21X was used, chlorobenzene was also decomposed. On the other hand, chlorobenzene was not decomposed in a control experiment using pure water. Thus, it was confirmed that decomposition is due to the functional water prepared by using a weakly acidic water generating agent and light irradiation.

EXAMPLE 78

Decomposition of 1,4-dichlorobenzene by Functional Electrolytic Water and Light Irradiation By using a strongly acidic electrolytic water generator (OASYS Bio HALF: tradename, a product of Asahi Glass Engineering), functional water (pH 2.3, oxidation-reduction potential 1,100 mV, and residual chlorine concentration 60 mg/l) was prepared by electrolyzing water containing 0.1% electrolyte (sodium chloride). Ten mililiter of functional water was indruduced into a 27 ml glass vial. Then, 1,4-dichlorobenzene to a concentration of 15 ppm. Then the vial was irradiated with light emitted from a black light fluorescent lamp (FL10BLB: a product of Toshiba, 10 W). Irradiation intensity was 0.2–0.6 mW/cm$^2$. The concentration of residual 1,4-dichlorobenzene in the vial was determined spectrophotometrically by measuring the absorption peak at 230 to 270 nm which indicates the existence of benzene ring by using a spectrophotometer (UV310OS: tradename, Shimadzu Seisakusho). The absorption peak of 1,4-dichlorobenzene in the vial declined, and after two hours of irradiation, it fell to 40% of the peak before irradiation.

Thus, functional water and light irradiation can completely decompose 1,4-dichlorobenzene. When functional water of various pH, oxidation-reduction potential and residual chlorine concentration was used, 1,4-dichlorobenzene was also decomposed. On the other hand, 1,4-dichlorobenzene was not decomposed in a control experiment using pure water. Thus, it was confirmed that decomposition is due to the functional water and light irradiation.

Additionally, it was confirmed that 1,4-dichlorobenzene is decomposed by functional water prepared by electrolysis without using a diaphragm as in Example 74 and also by means of functional water prepared with hydrochloric acid, sodium chloride and sodium hypochlorite as in Example 75.

EXAMPLE 79

Figure 29:
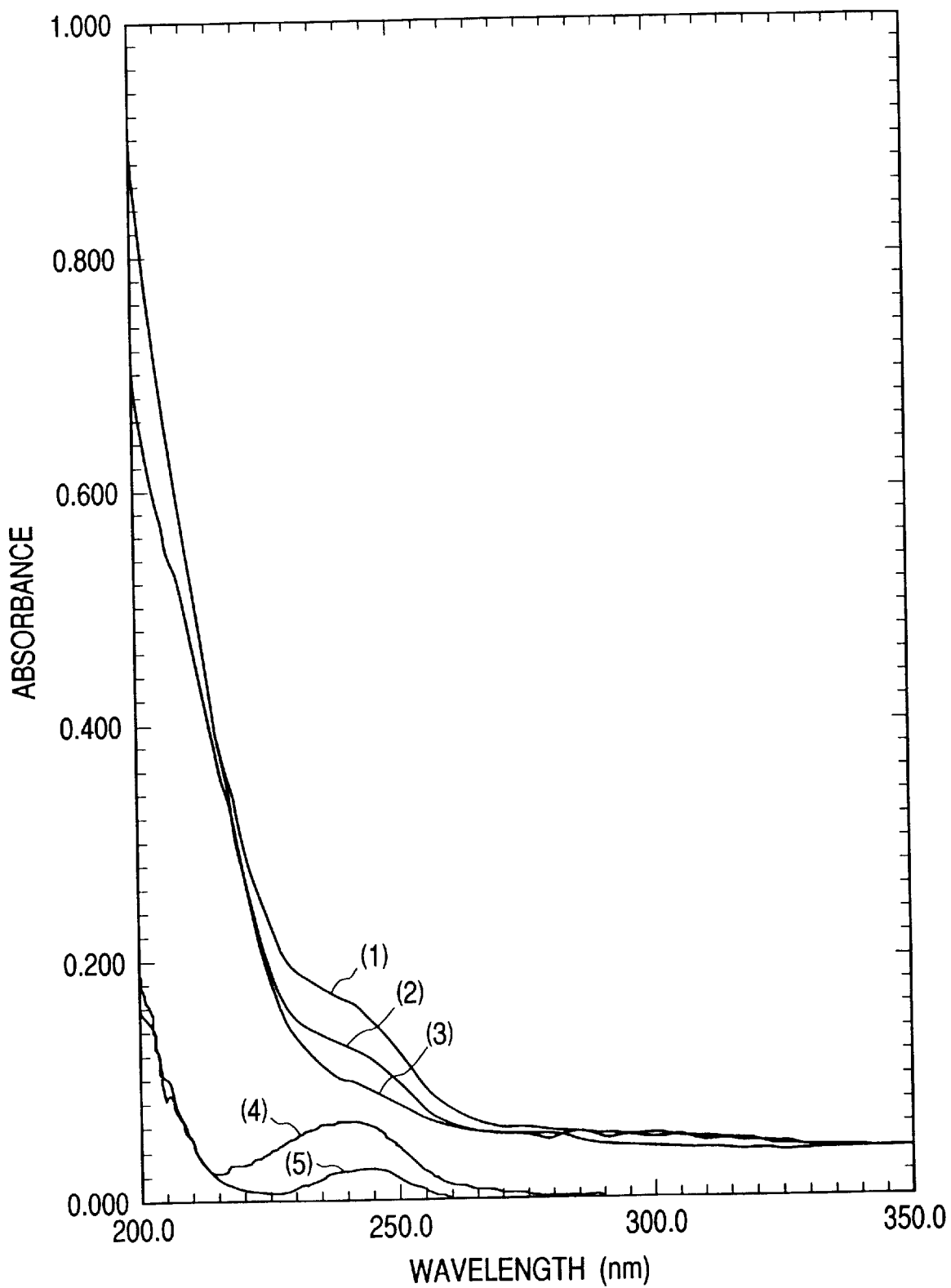
FIG. 29 is a graph showing the changes of the residual hexachlorobenzene concentrations in Example 79.

Decomposition of Hexachlorobenzene by Functional Electrolytic Water and Light Irradiation By using a strongly acidic electrolytic water generator (OASYS Bio HALF: tradename, a product of Asahi Glass Engineering), functional water (pH 2.3, oxidation-reduction potential 1,100 mV, and residual chlorine concentration 60 mg/l) was prepared by electrolyzing water containing 0.1% electrolyte (sodium chloride). Then, 5 ml of a hexachlorobenzene solution was introduced into a 27 ml glass vial to a concentration of 80 ppm, to which 3% ethyl alcohol was added to promote the solubility of hexachlorobenzene. Then 5 ml of the functional water was added to make the total 10 ml. Then the vial was irradiated with light emitted from a black light fluorescent lamp (FL10BLB: a product of Toshiba, 10 W). Irradiation intensity was 0.2-0.6 mW/cm$^2$. The concentration of residual hexachlorobenzene in the vial was determined spectrophotometrically by measuring the absorption peak at a 230 to 270 nm region which indicates the existence of benzene ring, by using a spectrophotometer (UV3100S: tradename, Shimadzu Seisakusho). The absorption peak of hexachlorobenzene in the vial declined, and after two hours of irradiation, it fell to 40% of the peak before irradiation. The result is shown in FIG. 29, in which curve 1 indicates the absorbance of a sample without irradiation, curve 2 that of an irradiated sample, curve 3 that of a sample containing only 50% functional water (background). Curve 4 represents a difference between curves 1 and 3, corresponding to hexachlorobenzene in a sample without irradiation, curve 5 is a difference between curves 2 and 3 corresponding to hexachlorobenzene in an irradiated sample.

Thus, functional water and light irradiation can completely decompose hexachlorobenzene. When functional water of various pH, oxidation-reduction potential and residual chlorine concentration was used, hexachlorobenzene was also decomposed. On the other hand, hexachlorobenzene was not decomposed in a control experiment using pure water. Thus, it was confirmed that decomposition is due to the functional water and light irradiation.

Additionally, it was confirmed that hexachlorobenzene is decomposed by functional water prepared by electrolysis without using a diaphragm as in Example 74 and also by means of functional water prepared with hydrochloric acid, sodium chloride and sodium hypochlorite as in Example 75.

EXAMPLE 80

"Functional water 2" of Example 1 was used for the following experiment in this example.

Each of 27 ml vials was filled with functional water 2 and TCE was introduced into them to a TCE concentration of 25 ppm. After irradiating the samples with light for 3 hours in the same manner as described in Example 1, TCE in each sample was extracted with n-hexane and subjected to EDC gas chromatography. The TCE concentration was between 0.2 and 0.8 ppm.

EXAMPLE 81

Functional water used in Example 7 was used in this example.

Each of a plurality of vials with a capacity of 27 ml was filled with functional water and PCE was introduced into them to make them show a PCE concentration of 5.0 ppm. After irradiating the specimens with light for 1 hour in a manner as described in Example 7, they were subjected to EDC gas chromatography to find that the PCE concentration was between 0.2 and 0.4 ppm.

EXAMPLE 82

Functional water used in Example 43 was used in this example.

Each of a plurality of vials with a capacity of 27 ml was filled with functional water and dichloromethane was introduced into them to make them show a dichloromethane concentration of 30 ppm. After irradiating the specimens with light a manner as described in Example 43, they were subjected to EDC gas chromatography to find that the dichloromethane concentration was between 1.8 and 2.6 ppm.

EXAMPLE 83

Functional water 2 used in Example 56 was used in this example.

Each of a plurality of vials with a capacity of 27 ml was filled with functional water and cis-1,2-dichloroethylene was introduced into them to make them show a cis-1,2-dichloroethylene concentration of 1.0 ppm. After irradiating the specimens with light a manner as described in Example 43, they were subjected to EDC gas chromatography to find that the cis-1,2-dichloroethylene concentration was between 0.1 and 0.26 ppm.

EXAMPLE 84

Functional water used in Example 68 was used in this example.

Each of a plurality of vials with a capacity of 27 ml was filled with functional water and chlorobenzene was introduced into them to make them show a chlorobenzene concentration of 6 ppm. After irradiating the specimens with light a manner as described in Example 68, they were subjected to EDC gas chromatography to find that the chlorobenzene concentration was between 1.2 and 1.4 ppm.

EXAMPLE 85

Functional water 2 used in Example 1 was used in this example.

Each of a plurality of vials with a capacity of 27 ml was filled with functional water and 1,1,1-trichloroethylene was introduced into them to make them show a 1,1,1-trichloroethylene concentration of 5.0 ppm. After irradiating the specimens with light a manner as described in Example 1 for 1 hour, they were subjected to EDC gas chromatography to find that the 1,1,1-trichloroethylene concentration was between 0.2 and 0.3 ppm.

What is claimed is:

1. A method of decomposing a halogenated aliphatic hydrocarbon compound or a halogenated aromatic compound comprising the steps of:

contacting a water with a pH value between 1 and 4 containing hypochlorous acid with a gaseous medium containing at least one of the halogenated aliphatic hydrocarbon compound and the halogenated aromatic compound under irradiation by light of a wavelength not less than 300 nm, wherein chlorine radicals are generated from the hypochlorous acid under said light irradiation, and the gaseous medium is introduced into the water during said light irradiation.

2. A decomposition method according to claim 1, wherein said water is an aqueous solution of hypochlorite.

3. A decomposition method according to claim 2, wherein said hypochlorite is at least one of sodium hypochlorite and potassium hypochlorite.

4. A decomposition method according to claim 2, wherein said aqueous solution further contains an inorganic acid or an organic acid.

5. A decomposition method according to claim 4, wherein said inorganic acid or organic acid includes at least hydrochloric acid, oxalic acid, sulfuric acid, phosphoric acid, boric acid, acetic acid, formic acid, malic acid or citric acid.

6. A decomposition method according to claim 1, wherein the chlorine concentration of said water is between 2 and 2,000 mg/l.

7. A decomposition method according to claim 1, wherein said water is characterized by a pH between 1 and 4, an oxidation-reduction potential between 800 and 1,500 mV, and a chlorine concentration between 5 and 150 mg/l.

8. A decomposition method according to claim 1, wherein said light includes light in a wavelength range between 300 and 500 nm.

9. A decomposition method according to claim 8, wherein said light includes light in a wavelength range between 350 and 450 nm.

10. A decomposition method according to claim 1, wherein an intensity of irradiation is between 10 $\mu W/cm^2$ and 10 $mW/cm^2$.

11. A decomposition method according to claim 10, wherein the intensity of irradiation is between 50 $\mu W/cm^2$ and 5 $mW/cm^2$.

12. A decomposition method according to claim 1, wherein said halogenated aliphatic hydrocarbon compound is a halogenated aliphatic hydrocarbon compound substituted with at least one of chlorine and fluorine.

13. A decomposition method according to claim 12, wherein said halogenated aliphatic hydrocarbon compound is at least one of:
trichloromethane, dichloromethane, trichlorofluoromethane, dichlorodifluoromethane, chlorotrifluoromethane, dichlorofluoromethane, chlorodifluoromethane, trifluoromethane, 1,1,1-trichloroethane, 1,2-difluoro-1,1,2,2-tetrachloroethane, 1,1,2-trichloro-1,2,2-trifluoroethane, 1,2-dichloro-1,1,2,2-tetrafluoroethane, 2, 2-dichloro-1,1,1-trifluoroethane, chlorodifluoroethane, 1,1-difluoroethane, tetrafluoroethane, chloropentafluoroethane, hexafluoroethane, chloroethylene, dichloroethylene (1,1-dichloroethylene, cis-1,2-dichloroethylene, trans-1,2-dichloroethylene), trichloroethylene and tetrachloroethylene.

14. A decomposition method according to claim 1, wherein said aromatic compound is chlorinated benzene.

15. A decomposition method according to claim 14, wherein said chlorinated benzene is at least one of chlorobenzene, 1,4-dichlorobenzene (p-dichlorobenzene), 1,2,3-trichlorobenzene, 1,2,4-trichlorobenzene, 1,3,5-trichlorobenzene, tetrachlorobenzene and hexachlorobenzene.

16. A decomposition method according to claim 1, wherein said halogenated aromatic compound has a biphenyl bond or a biphenyl skeleton.

17. A decomposition method according to claim 16, wherein said halogenated aromatic compound having a biphenyl bond or a biphenyl skeleton is selected from a group consisting of 2-chlorobiphenyl, 3-chlorobiphenyl, 4-chlorobiphenyl, 2,2'-dichlorobiphenyl, 3,3'-dichlorobiphenyl, 4,4'-dichlorobiphenyl, 2,4'-dichlorobiphenyl, 2,3-dichlorobiphenyl, 2,4-dichlorobiphenyl, 2,5-dichlorobiphenyl, 2,6-dichlorobiphenyl, 3,4-dichlorobiphenyl, 3,5-dichlorobiphenyl, 2,4,4'-trichlorobiphenyl, 2,2',5-trichlorobiphenyl, 2,3',5-trichlorobiphenyl, 2,4',5-trichlorobiphenyl, 2',3,4-trichlorobiphenyl, 2,3,4-trichlorobiphenyl, 2,3,6-trichlorobiphenyl, 2,4,5-trichlorobiphenyl, 2,4,6-trichlorobiphenyl and compounds having a biphenyl bond and derivatives thereof where at least one chlorine atoms is substituted by a fluorine or bromine atom.

18. A method for purifying a gas, comprising:
contacting the gas containing at least one of a halogenated aliphatic hydrocarbon compound and a halogenated aromatic compound with water with a pH value of 1 to 4 containing hypochlorous acid under irradiation with light of a wavelength not less than 300 nm to decompose the halogenated aliphatic hydrocarbon compound or halogenated aromatic compound, wherein chlorine radicals are generated from the hypochlorous acid under said light irradiation.

19. A purifying method according to claim 18, wherein the chlorine concentration of said water is between 2 and 2,000 mg/l.

20. A purifying method according to claim 18, wherein said water is characterized by a pH of 1–4, an oxidation-reduction potential of 800–1500 mV and a chlorine concentration of 5–150 mg/l.

21. A purifying method according to claim 18, wherein said contacting step includes
directing the gas to pass through a reaction container filled with a filler, and
supplying the water to the reaction container.

22. A purifying method according to claim 18, wherein said halogenated aliphatic hydrocarbon compound or said halogenated aromatic compound is an organochlorinated compound.

* * * * *

UNITED STATES PATENT AND TRADEMARK OFFICE
CERTIFICATE OF CORRECTION

PATENT NO.    : 6,616,815 B2
DATED         : September 9, 2003
INVENTOR(S)   : Kinya Kato et al.

It is certified that error appears in the above-identified patent and that said Letters Patent is hereby corrected as shown below:

Title page,
Item [56], References Cited, FOREIGN PATENT DOCUMENTS,
"JP     49045027 A *   4/1974" should be deleted; and "51023467" should read
-- 51-23467 --.
OTHER PUBLICATIONS,
"K.L. Müller et al.," reference, "Phtochemische" should read -- Photochemische --.

Column 1,
Line 23, "causes" should read -- cause --.

Column 2,
Line 12, "al," should read -- al. --.

Column 9,
Line 64, "vessel" should read -- vessel, --.

Column 10,
Line 1, "are" should read -- is --; and
Line 37, 'restrain" should read -- restrains --.

Column 14,
Line 40, "Inside or outside provided" should be deleted; and
Line 55, "are" should read -- is --.

Column 15,
Line 67, "of" should be deleted.

Column 17,
Line 26, "The" should be deleted.

Column 18,
Line 29, "were" should read -- was --.

Column 22,
Line 18, "bonde" should read -- bond --; and
Line 65, "in stead" should read -- instead --.

UNITED STATES PATENT AND TRADEMARK OFFICE
CERTIFICATE OF CORRECTION

PATENT NO. : 6,616,815 B2
DATED : September 9, 2003
INVENTOR(S) : Kinya Kato et al.

It is certified that error appears in the above-identified patent and that said Letters Patent is hereby corrected as shown below:

Column 26,
Line 10, "Laboratoris)" should read -- Laboratories) --; and
Line 37, "were" should read -- was --.

Column 27,
Line 41, "were" should read -- was --.

Column 28,
Line 57, "of" should read -- with --.

Column 31,
Line 67, "concentrations" should read -- concentration --.

Column 32,
Line 39, "An" should read -- A --.

Column 35,
Line 56, "were" should read -- was --.

Column 39,
Line 26, "an" should read -- a --.

Column 46,
Line 30, "mililiter" should read -- mililiters --; and
Line 31, "inrudiced," should read -- introduced --.

Column 47,
Line 67, "light" should read -- light in --.

Column 48,
Line 12, "light" should read -- light in --.

UNITED STATES PATENT AND TRADEMARK OFFICE
CERTIFICATE OF CORRECTION

PATENT NO.    : 6,616,815 B2
DATED         : September 9, 2003
INVENTOR(S)   : Kinya Kato et al.

It is certified that error appears in the above-identified patent and that said Letters Patent is hereby corrected as shown below:

Column 50,
Line 17, "atoms" should read -- atom --; and
Line 37, "includes" should read -- includes: --.

Signed and Sealed this

Twenty-eighth Day of December, 2004

JON W. DUDAS
*Director of the United States Patent and Trademark Office*